United States Patent
Hemker et al.

(10) Patent No.: US 12,419,476 B2
(45) Date of Patent: Sep. 23, 2025

(54) TELESCOPING WAND ASSEMBLY FOR VACUUM CLEANER AND METHOD INCLUDING SAME

(71) Applicant: Emerson Electric Co., St. Louis, MO (US)

(72) Inventors: Christopher James Hemker, Bartelso, IL (US); Christopher Burch, St. Louis, MO (US); Vikas Mahadev Jadhav, Pune (IN); Vikrant Ganpat Kurude, Pune (IN)

(73) Assignee: Emerson Electric Co., St. Louis, MO (US)

( * ) Notice: Subject to any disclaimer, the term of this patent is extended or adjusted under 35 U.S.C. 154(b) by 30 days.

(21) Appl. No.: 18/185,724

(22) Filed: Mar. 17, 2023

(65) Prior Publication Data
US 2024/0306872 A1 Sep. 19, 2024

(51) Int. Cl.
*A47L 9/24* (2006.01)
*F16B 7/14* (2006.01)
*F16L 27/12* (2006.01)

(52) U.S. Cl.
CPC .......... *A47L 9/244* (2013.01); *A47L 9/248* (2013.01); *F16B 7/1427* (2013.01); *F16L 27/1273* (2019.08)

(58) Field of Classification Search
CPC ........ F16B 7/1427; A47L 9/244; A47L 9/248; F16L 37/10; F16L 37/18; F16L 37/133
(Continued)

(56) References Cited

U.S. PATENT DOCUMENTS

| 2,361,827 A | * | 10/1944 | Dowell | F16L 37/10 |
| | | | | 285/314 |
| 2,941,822 A | | 6/1960 | Moecker | |

(Continued)

FOREIGN PATENT DOCUMENTS

| DE | 102013105858 A1 | * | 12/2014 | ............. A47L 9/244 |
| EP | 0937435 A2 | * | 1/1999 | ............... A47L 9/24 |
| WO | WO-9935409 A1 | * | 7/1999 | ............. A47L 9/244 |

OTHER PUBLICATIONS

VideoPUP 1-1/4" Extension Wands Vacuum Cleaner Accessories, 32mm Vacuum Hose Chrome Wand Pipe Extent to 31inch (Hose); https://Sears.com/videopup-jp3sz6ft-eagles-1-4inch-extension-wands-vacuum/p-A069253742; 2 pgs.
(Continued)

Primary Examiner — Bryan R Muller
(74) Attorney, Agent, or Firm — Armstrong Teasdale LLP

(57) ABSTRACT

A wand assembly for a vacuum cleaner includes a first wand, a second wand telescopically arranged with the first wand, and a rotatable locking cuff including first and second locking ramps. The first wand includes a first plurality of grooves arranged in a first row and a second plurality of grooves arranged in a second row, with each row extending in a longitudinal direction. The second wand includes first and second locking teeth integrally formed with the second wand and engageable with the respective first and second pluralities of grooves. Rotation of the locking cuff relative to the wands causes the first locking ramp to deflect the first locking tooth into engagement with one of the first plurality of grooves, and causes the second locking ramp to deflect the second locking tooth into engagement with one of the second plurality of grooves to fix a length of the wand assembly.

20 Claims, 41 Drawing Sheets

(58) Field of Classification Search
USPC .............................. 285/303, 314, 302, 145.1
See application file for complete search history.

(56) References Cited

U.S. PATENT DOCUMENTS

| | | | | |
|---|---|---|---|---|
| 3,351,359 | A * | 11/1967 | Ferraris | A47L 9/244 |
| | | | | 285/314 |
| 4,108,202 | A * | 8/1978 | Schoepe | F16K 31/24 |
| | | | | 285/390 |
| 5,462,311 | A | 10/1995 | Cipolla | |
| 5,836,620 | A * | 11/1998 | Wang | F16L 27/1273 |
| | | | | 285/302 |
| 6,148,474 | A | 11/2000 | Ohara et al. | |
| 6,168,212 | B1 * | 1/2001 | Finley | F16B 7/1427 |
| | | | | 285/302 |
| 7,168,128 | B2 | 1/2007 | Evans | |
| 7,350,267 | B2 * | 4/2008 | Evans | F16L 27/1273 |
| | | | | 15/410 |
| 7,543,858 | B1 * | 6/2009 | Wang | F16L 37/0982 |
| | | | | 285/322 |
| 7,832,050 | B2 | 11/2010 | Pullins et al. | |
| 8,585,095 | B2 * | 11/2013 | Cordes | F16L 27/1273 |
| | | | | 285/308 |
| 8,943,646 | B2 | 2/2015 | Wills et al. | |
| 9,339,161 | B2 | 5/2016 | McLuckie et al. | |
| 2006/0026791 | A1 | 2/2006 | Fischer et al. | |
| 2007/0130724 | A1 | 6/2007 | Schiemann | |
| 2007/0180651 | A1 | 8/2007 | Muhlenkamp | |
| 2017/0127898 | A1 | 5/2017 | Lambert et al. | |
| 2017/0127899 | A1 | 5/2017 | Lambert et al. | |

OTHER PUBLICATIONS

Huiaway 1-1/4 inch 32mm Chrome Telescopic Hose Metal Vacuum Wands Hose Vacuum 1.25inch Extension Wand Extends to 31.9 inch long for Most Brand Vacuums; https://amazon.com/Huiaway-Telescopic-1-25inch-Extensin-31-65inch/dp/B079NWF39Z/ref=sr_1-5?keywords-telescoping%2Bvacuum%2Bwand&qid=1664457718&qu=eyJxc2MiOiI0LjE3IiwicXNhljoiMy40MilsInFzcCl6ljMuMDkifQ%3D%3D&sr=8-5&th=1; pp. 8.

2-1/2 in. Locking Extension Wand Accessory for RIDGID Wet/Dry Shop Vacuums; https://www.homedepot.com/p/RIDGID-2-1-2-in-Locking-Extension-Wand-Accessory-for-RIDGID-Wet-Dry-Shop-Vacuums-LA2508/304753709.

* cited by examiner

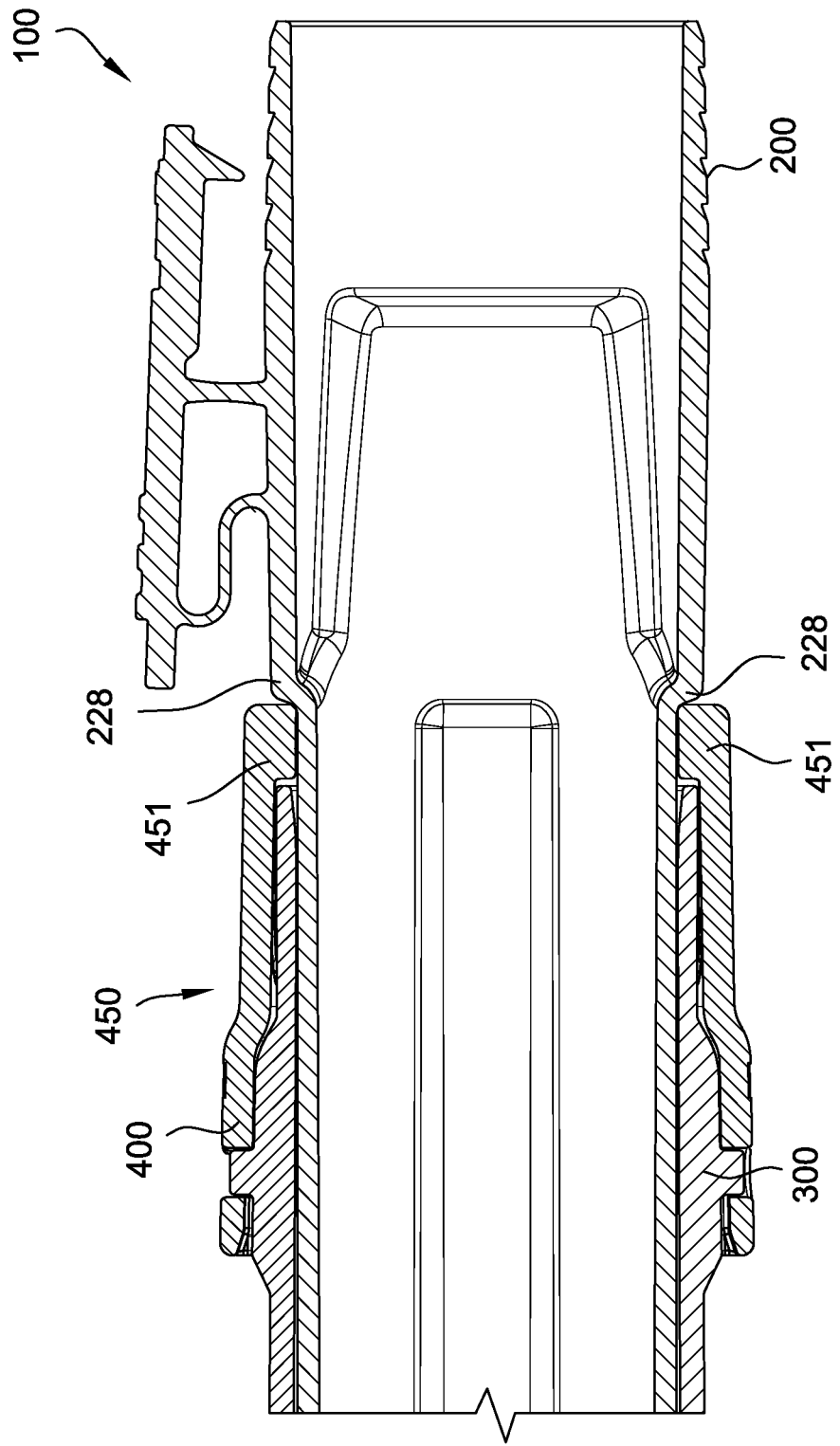

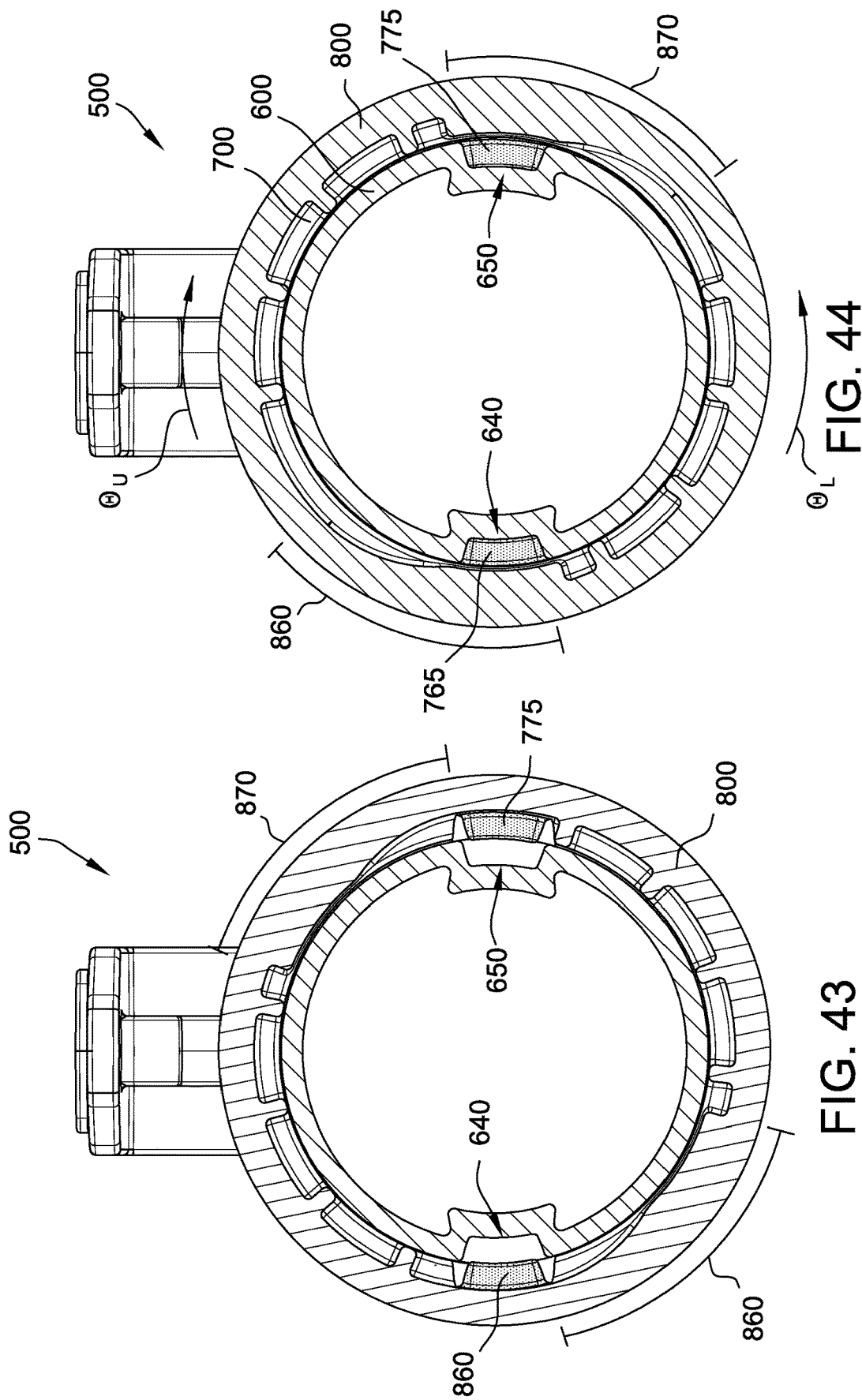

TELESCOPING WAND ASSEMBLY FOR VACUUM CLEANER AND METHOD INCLUDING SAME

FIELD

The field of the disclosure relates generally to vacuum cleaners, and in particular, to wand assemblies for use with vacuum cleaners.

BACKGROUND

Backpack vacuum cleaners are commonly used in commercial cleaning applications because of their convenience and versatility. Since backpack vacuum cleaners are designed for ease of movement around the space to be cleaned, they are often used with wands that extend the reach of the user and provide a larger area of use. However, users of different heights may require a different wand length for different cleaning tasks. While wands of different lengths may be used interchangeably, the use of multiple tools requires additional storage space and may cause interruptions and delays in the cleaning process.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a wand assembly for a vacuum cleaner includes a first wand, a second wand telescopically arranged with the first wand, and a rotatable locking cuff. The first wand includes a first plurality of grooves arranged in a first row and a second plurality of grooves arranged in a second row, with both the first and second rows extending in a longitudinal direction. The second wand includes a first locking tooth engageable with the first plurality of grooves and a second locking tooth engageable with the second plurality of grooves. Both the first and second locking teeth are integrally formed with the second wand. The locking cuff includes a first locking ramp and a second locking ramp. Rotation of the locking cuff relative to the first and second wands causes the first locking ramp to deflect the first locking tooth into engagement with a groove of the first plurality of grooves, and causes the second locking ramp to deflect the second locking tooth into engagement with a groove of the second plurality of grooves to fix a length of the wand assembly.

In another aspect, a wand assembly for a vacuum cleaner includes a first wand, a second wand telescopically engaged with the first wand, and a rotatable locking cuff. The first wand includes a plurality of grooves, and the second wand includes a locking tooth integrally formed with the second wand and engageable with the plurality of grooves. The locking cuff includes a locking ramp, and rotation of the locking cuff relative to the first and second wands causes the locking ramp to deflect the locking tooth into engagement with one of the grooves to fix a length of the wand assembly.

In yet another aspect, a method of assembling a wand assembly for a vacuum cleaner is provided, in which the vacuum cleaner includes a first wand having a plurality of grooves, a second wand including a locking tooth, and a locking cuff including a locking ramp. The method includes positioning the first wand telescopically within the second wand, translating the first wand relative to the second wand in a longitudinal direction, and rotating the locking cuff relative to the first and second wands such that the locking ramp deflects the locking tooth into engagement with one of the grooves to fix a length of the wand assembly.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 27 is a partial side cross-sectional view of the first example wand assembly shown in FIGS. 3-4, shown in the retracted configuration.

FIG. 43 is a front cross-sectional view of the second example wand assembly shown in FIGS. 31 and 32, shown in the unlocked configuration.

FIG. 44 is a front cross-sectional view of the second example wand assembly shown in FIGS. 31 and 32, shown in the locked configuration.

Corresponding reference characters indicate corresponding parts throughout the drawings.

DETAILED DESCRIPTION

Figure 1:
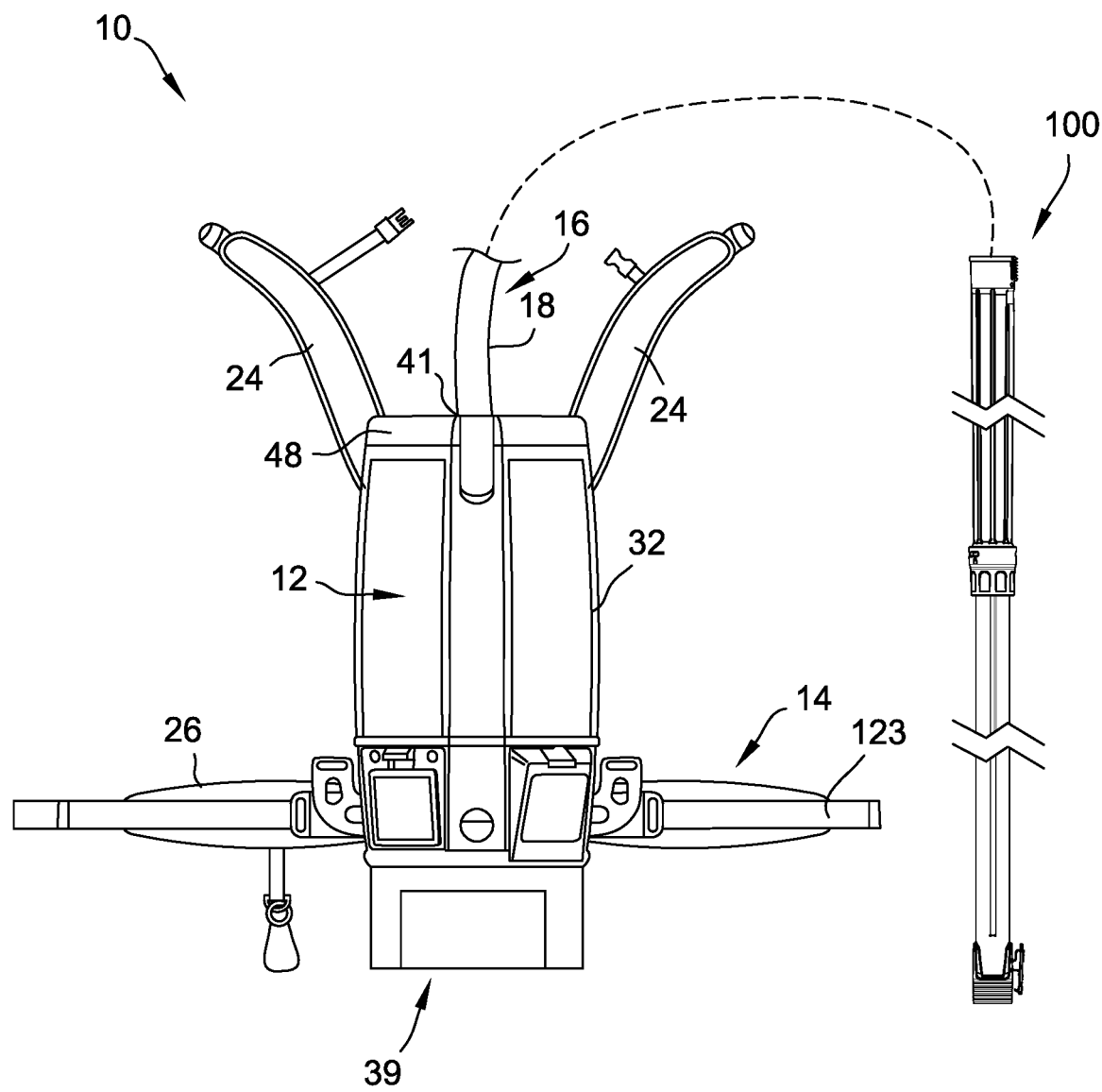
FIG. 1 is a perspective view of a vacuum cleaner, illustrated in the form of a backpack vacuum cleaner.

FIG. 1 is a perspective view of a vacuum cleaner 10, illustrated in the form of a backpack vacuum cleaner. Although the vacuum cleaner 10 is shown and described herein with reference to a backpack-mounted vacuum cleaner, systems consistent with this disclosure may be embodied in other types of vacuum cleaners or other electrical appliances and in other combinations including, for example and without limitation, wet/dry vacuum cleaners, canister vacuum cleaners, upright vacuum cleaners, blowers, sprayers, and power tools and equipment.

In the example embodiment, the vacuum cleaner 10 includes a vacuum cleaner assembly 12 that is carried on a user's back via a harness or backpack assembly 14, and a vacuum conduit 16 connected to the vacuum cleaner assembly 12. The vacuum conduit 16 can generally include any suitable conduit for directing suction and/or forced air generated by the vacuum cleaner 10, including, for example and without limitation, vacuum hoses, vacuum wands or tubes, surface cleaning tools, and combinations thereof. The vacuum conduit 16 includes a hose 18 extending from a top of the vacuum cleaner assembly 12, and a telescoping wand assembly 100 connected to the hose 18. The wand assembly 100 will be discussed in greater detail below. In further embodiments, the vacuum conduit 16 may additionally include a vacuum cleaner floor tool (not shown) connected to a distal end of the wand assembly 100.

The backpack assembly 14 is sized and shaped to be worn by a user of the vacuum cleaner 10 (e.g., on the user's back or shoulders) to facilitate carrying the vacuum cleaner 10 during use. The backpack assembly 14 includes two shoulder straps 24 and a waist belt 26 for securing the backpack assembly 14 and vacuum cleaner 10 to the torso of a user. In other embodiments, the backpack assembly 14 can have any suitable configuration that enables the vacuum cleaner 10 to function as described herein.

Figure 2:
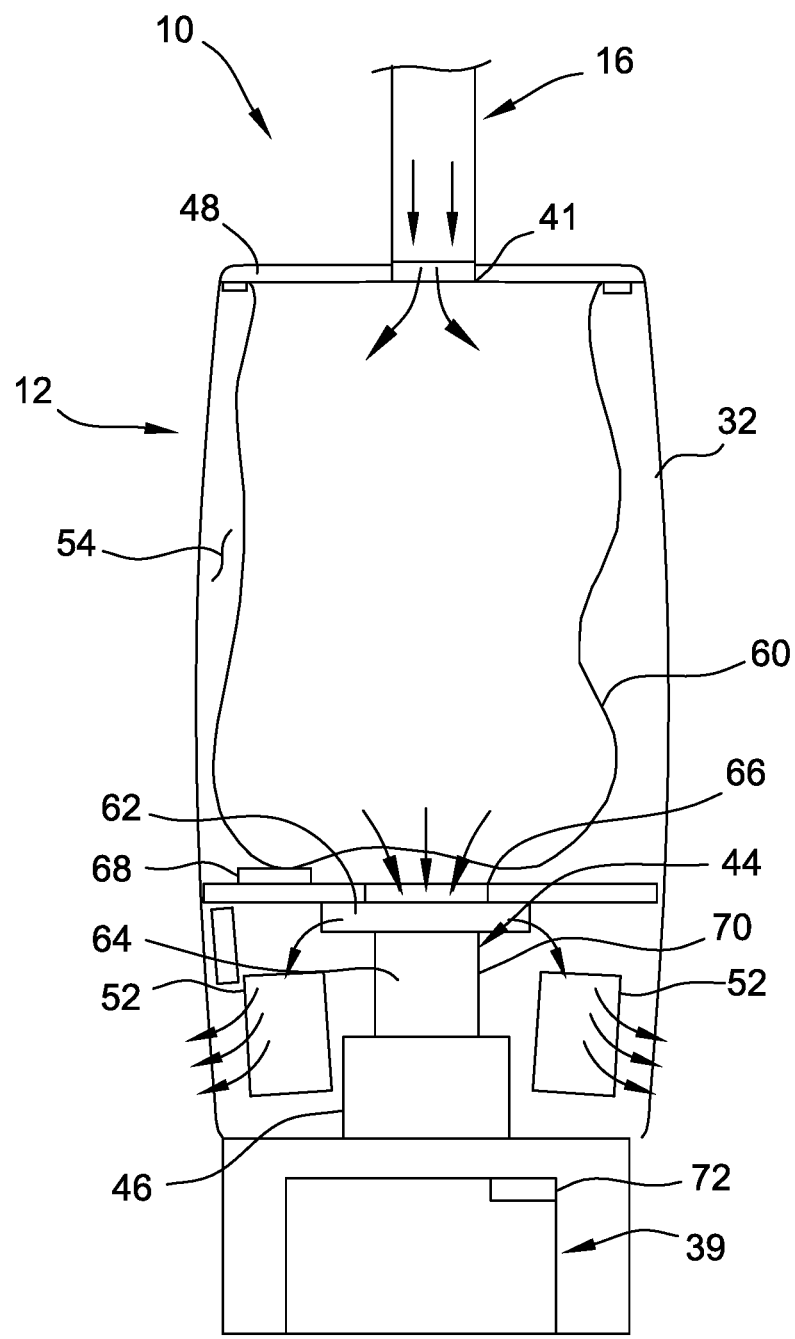
FIG. 2 is a side schematic view of the vacuum cleaner shown in FIG. 1.

With additional reference to FIG. 2, the vacuum cleaner assembly 12 includes a vacuum cleaner housing 32, a suction unit 44 enclosed within the vacuum cleaner housing 32, and a controller 46. The vacuum cleaner housing 32 defines an inlet 41, at least one exhaust or outlet 52, and a debris chamber 54 connected in fluid communication between the inlet 41 and the outlet 52. In the example embodiment, the inlet 41 is defined at a top of the vacuum cleaner housing 32, and the vacuum cleaner housing 32 includes two outlets 52 defined adjacent a bottom of the vacuum cleaner housing 32. In other embodiments, the inlet 41 and the outlet (s) 52 can be defined at any suitable portion of the vacuum cleaner 10 that enables the vacuum cleaner 10 to function as described herein. Further, the vacuum cleaner 10 can include more than or fewer than two outlets 52.

The vacuum cleaner housing 32 includes an access door or lid 48 that provides access to the debris chamber 54, for example, to empty debris collected within the debris chamber 54. The inlet 41 is defined in the lid 48 in the example embodiment. Further, the example vacuum cleaner housing 32 is sized and shaped to receive a filter 60 within the debris chamber 54 to filter out fine debris and small particles from the air flow through the vacuum cleaner housing 32. The filter 60 is suitably a bag filter, although the vacuum cleaner 10 can be operable with other types of filters, including, for example and without limitation, cartridge filters.

The suction unit 44 is operable to generate airflow (indicated by arrows in FIG. 2) through the vacuum cleaner housing 32 from the inlet 41 to the outlet 52 to draw debris into the debris chamber 54 through the inlet 41 by way of the vacuum conduit 16 (shown in FIG. 1). The suction unit 44 includes a fan or impeller 62 and a motor 64 operatively connected to the impeller 62 (collectively referred to herein as a "motor assembly") to drive the impeller 62 and generate airflow through the vacuum cleaner housing 32. The motor assembly is connected to the vacuum cleaner housing 32 and positioned adjacent the debris chamber 54 such that the impeller 62 receives airflow through an impeller inlet 66 defined by the vacuum cleaner housing 32. In certain embodiments, the motor assembly can also be adapted to operate in a "reverse" mode in which the motor assembly generates airflow from the outlet 52 to the inlet 41, to enable the vacuum cleaner 10 to operate as a blower.

A suitable power source supplies electrical power to components of the vacuum cleaner 10, such as the motor 64 and the controller 46, and can generally include any suitable power source that enables the vacuum cleaner 10 to operate as described herein. Suitable types of power sources include, for example and without limitation, DC power sources, such as battery packs, and AC power sources, such as mains AC electricity from a household or commercial wall outlet. In embodiments in which the vacuum cleaner 10 uses an AC power source provided by a wall outlet, the vacuum cleaner assembly 12 may include a power cord (not shown) with an electrical plug disposed on an end thereof for electrical connection to the wall outlet.

The vacuum cleaner 10 can also include an on-board or portable power source 39, such as a battery or battery pack. In such embodiments, a power cord can be used to supply AC power to the vacuum cleaner 10, which is converted to DC power to charge the battery, in addition to or as an alternative to supplying power to other components of the vacuum cleaner 10. In such embodiments, the vacuum cleaner 10 may be selectively operated in a cordless mode, in which the portable power source 39 is electrically connected to the vacuum cleaner 10, and a corded mode, in which a power cord is electrically connected to the vacuum cleaner 10 and supplies AC power to the vacuum cleaner 10 (e.g., from a wall outlet). Other embodiments may be operated only from a battery or only from AC power.

The illustrated vacuum cleaner 10 also includes a plurality of sensors 68, 70, 72 connected to the controller 46. The sensors 68, 70, 72 can provide feedback to the controller 46 regarding operation of the vacuum cleaner 10, and the controller 46 can control the vacuum cleaner 10 based on feedback received from the sensors 68, 70, 72. Sensors 68, 70, 72 can include, for example and without limitation, proximity sensors, pressure sensors, temperature sensors, voltage sensors, and active or passive current sensors.

Figure 3:
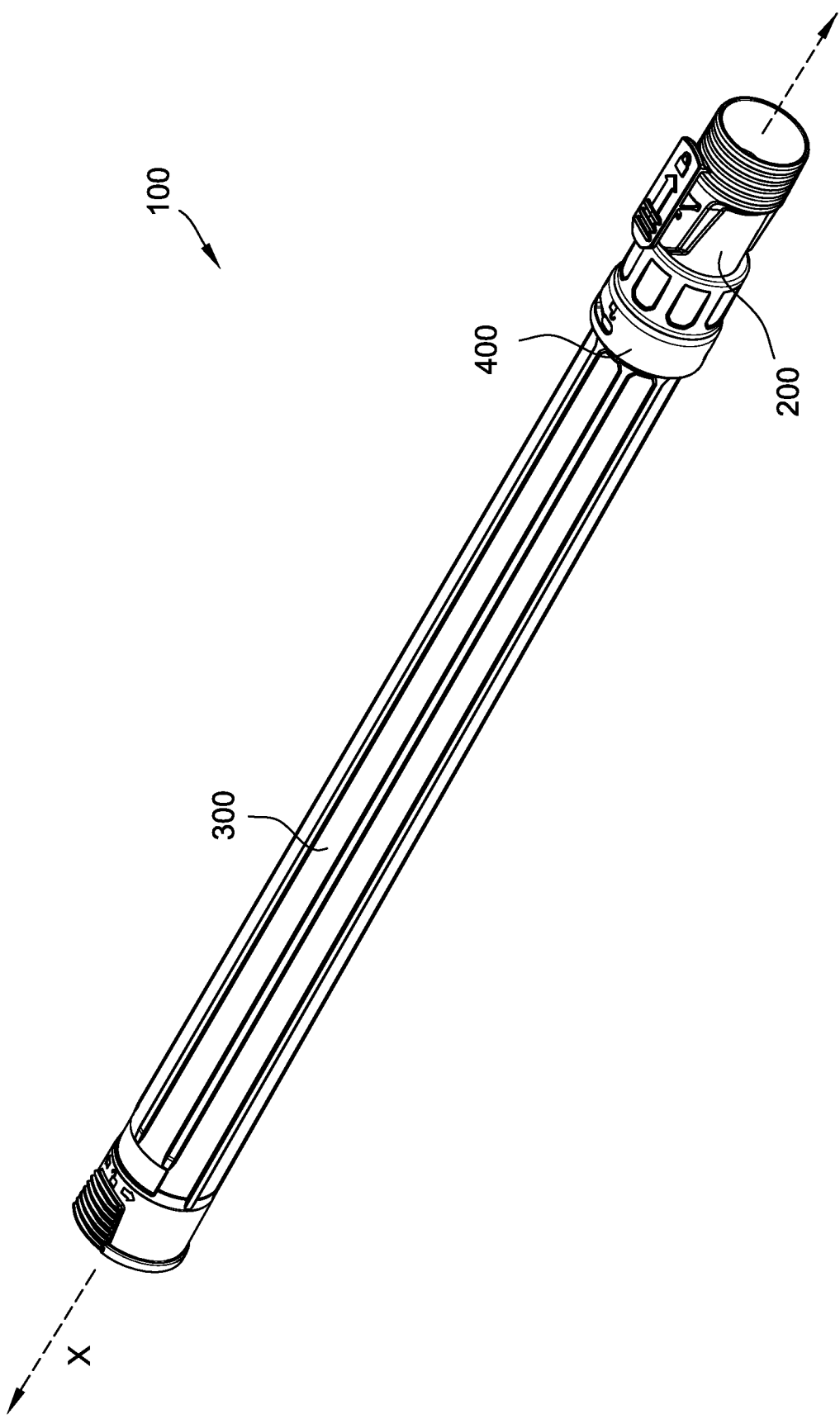
FIG. 3 is a perspective view of a first example embodiment of a wand assembly, illustrated in a retracted configuration.
Figure 4:
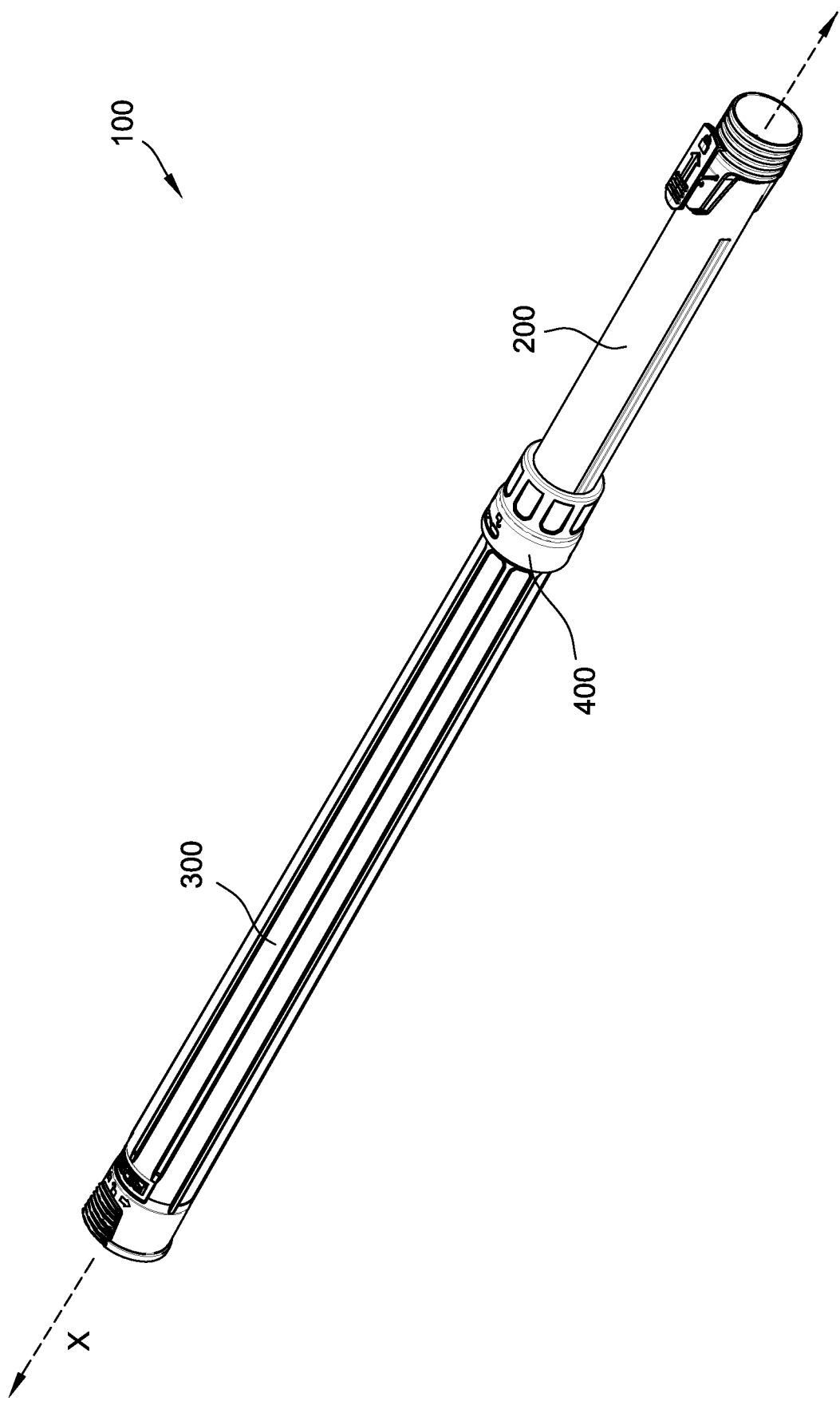
FIG. 4 is a perspective view of the first example wand assembly shown in FIG. 3, illustrated in an extended configuration.

With additional reference to FIGS. 3-4, the wand assembly 100 includes a first wand 200, a second wand 300, and a rotatable locking cuff 400. The first and second wands 200, 300 are telescopically arranged such that the second wand 300 is disposed radially outward from the first wand 200, and the locking cuff 400 is disposed radially outward from the second wand 300. In other words, the first wand 200, second wand 300, and locking cuff 400 are oriented concentrically about a longitudinal axis x of the wand assembly 100. The wand assembly 100 may be configured in a retracted configuration (FIG. 3) or an extended configuration (FIG. 4), both of which will be discussed in greater detail further herein.

Figure 5:
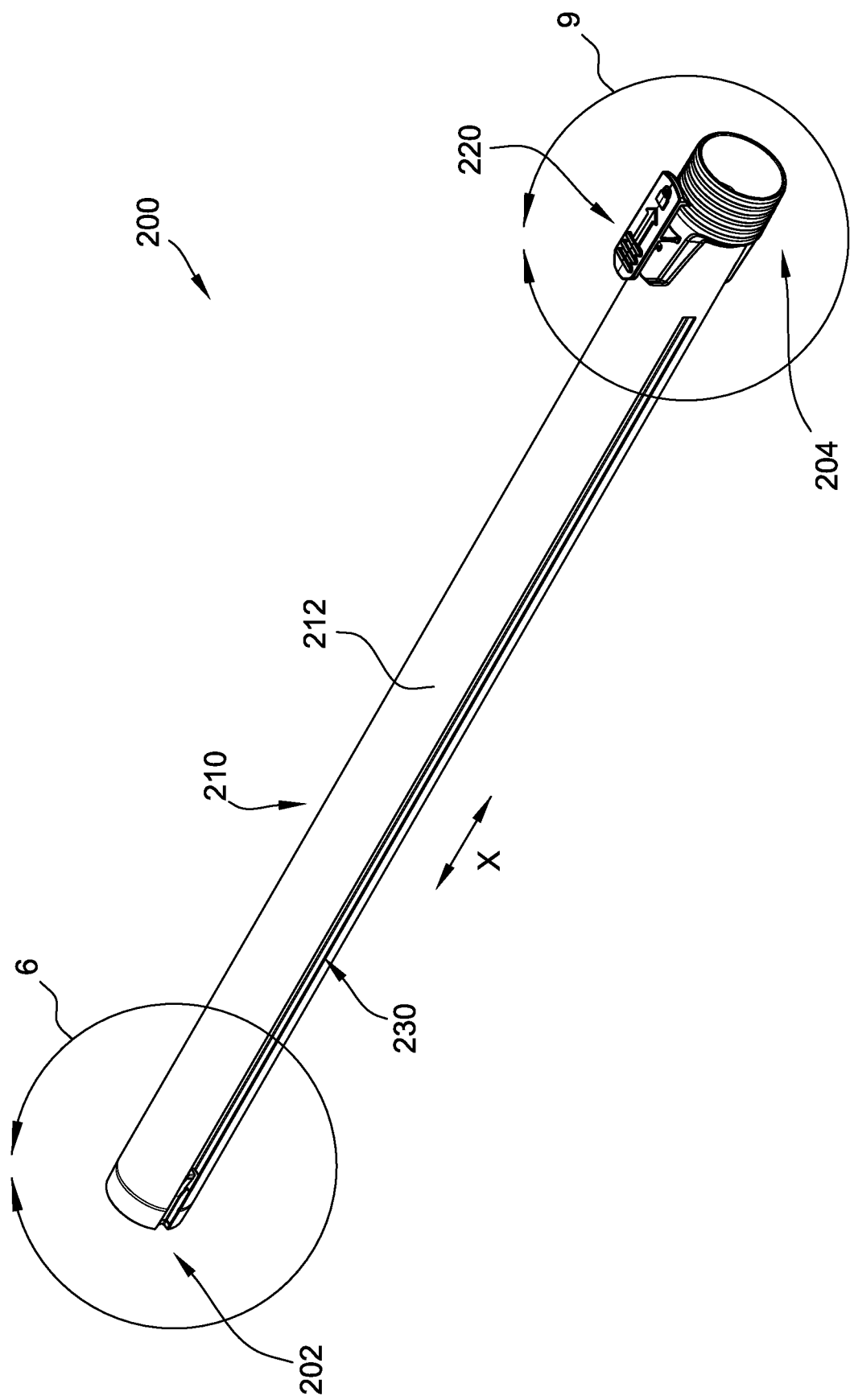
FIG. 5 is a perspective view of a first wand of the first example wand assembly shown in FIGS. 3 and 4.
Figure 6:
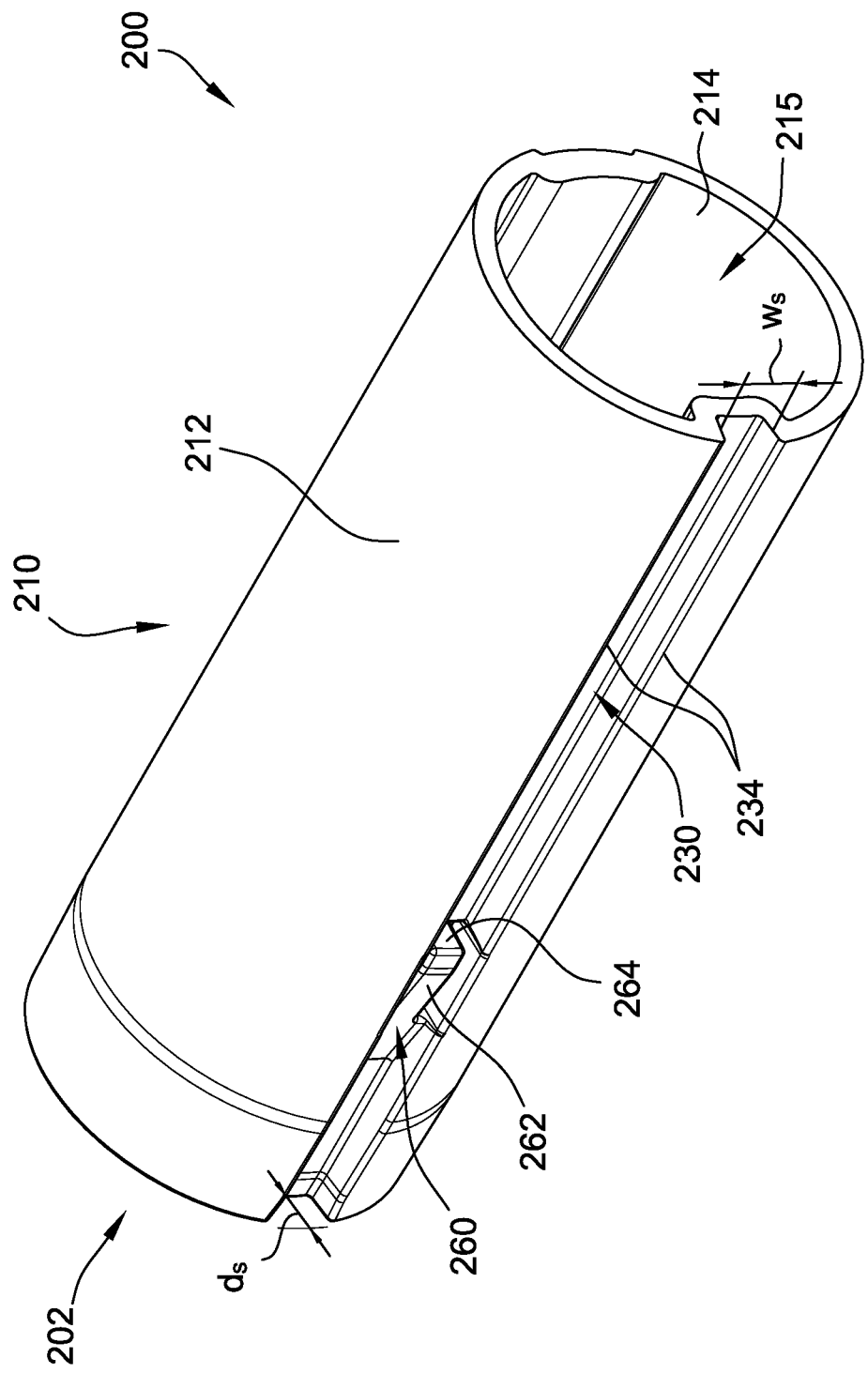
FIG. 6 is an enlarged perspective view of the first wand shown in FIG. 5.

With reference to FIG. 5-10, the first wand 200 extends from a first end 202 to a second end 204, and includes a first wand body 210 and an accessory attachment assembly 220. The first wand 200 has an outer surface 212 and an inner surface 214 (FIGS. 6 and 8), with the inner surface 214 defining a first wand cavity 215 that forms part of the vacuum conduit 16. The first wand body 210 includes an alignment slot 230 defined in the outer surface 212 that extends in a longitudinal direction substantially parallel to the longitudinal axis x of the wand assembly 100. With reference to FIGS. 5 and 6, the alignment slot 230 is defined by a slot base 232 recessed from the outer surface 212 and a pair of laterally opposed slot sidewalls 234 oriented substantially perpendicular to the slot base 232. In further embodiments, the alignment slot 230 may have any other suitable construction. For example, the alignment slot 230 may be defined by more or fewer base and sidewall surfaces, and/or may be defined by at least one continuous curved surface. In the illustrated embodiment, the alignment slot 230 has a depth $d_s$ and a width $w_s$.

The alignment slot 230 begins at the first end 202 of the first wand body 210 and terminates proximate the accessory attachment assembly 220. In further embodiments, the alignment slot 230 may have any other suitable configuration, for example and without limitation, extending along the entire length of the first wand body 210 or beginning at a point other than the first end 202. The first wand 200 further includes a stopper 260 positioned within the alignment slot 230. The stopper 260 extends from a first end connected to the slot base 232 to a second, free end. The stopper 260 includes an outer surface 262 extending between the first and second ends thereof, and an axial surface 264 that defines the second end thereof. The outer surface is angled obliquely relative to the slot base 232 such that the stopper 260 protrudes radially outward to create an obstruction in the alignment slot 230.

The stopper 260 has a suitably resilient construction such that the stopper 260 is capable of deflecting radially inward and/or outward in the presence of an applied force, and returning to an initial or undeflected position without undergoing permanent deformation when the force is removed. In the illustrated embodiment, for example, the stopper 260 is constructed from a resilient plastic and is connected or secured to the slot base 232 at only one end (i.e., at the first end of the stopper 260) such that the other end of the stopper 260 (i.e. the second end) is free to move or deflect radially inward and/or outward. For example, a force applied to the stopper 260 in a radially inward direction may deflect the outer surface 262 into a configuration in which it is substantially flush with the slot base 232.

Figure 7:
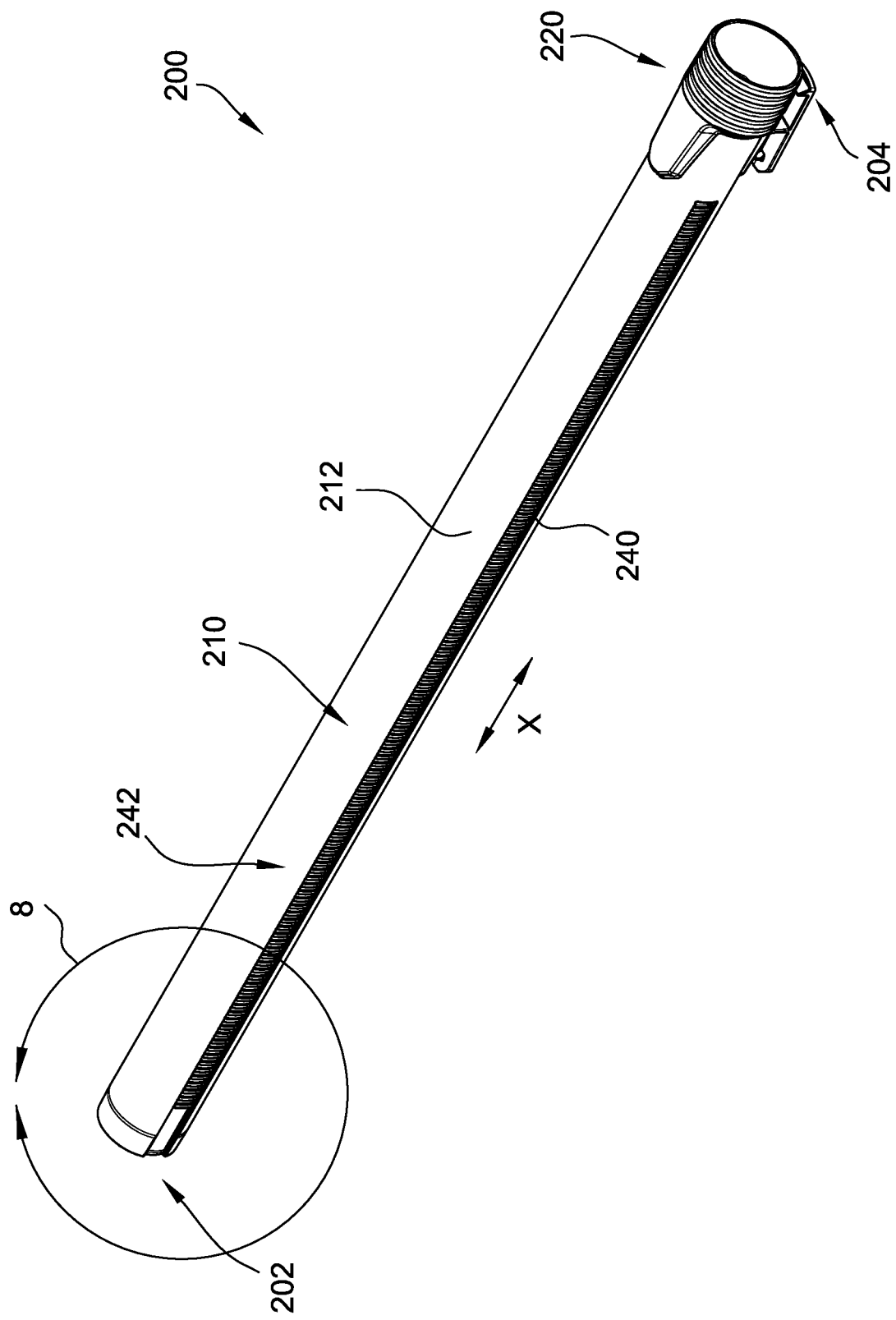
FIG. 7 is another perspective view of the first wand shown in FIG. 5.
Figure 8:
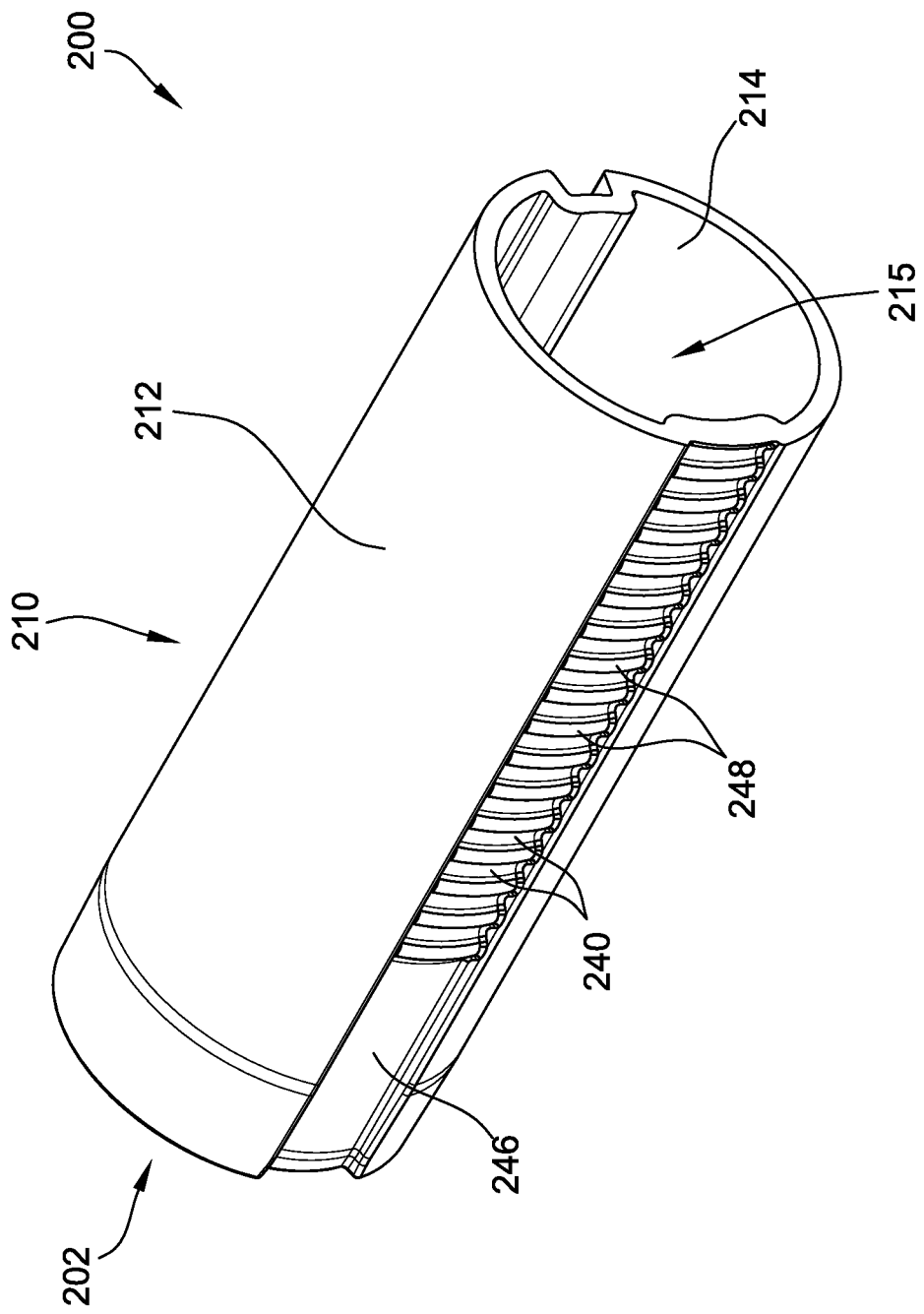
FIG. 8 is an enlarged perspective view of the first wand shown in FIG. 7.

With reference to FIGS. 7 and 8, the first wand 200 further includes a plurality of grooves 240 arranged in a row 242 extending in a longitudinal direction substantially parallel to the longitudinal axis x of the wand assembly 100. The row 242 of grooves 240 is positioned approximately 180 degrees from the alignment slot 230 relative to the longitudinal axis x of the wand assembly 100. In further embodiments, the row 242 of grooves 240 and alignment slot 230 may have any other suitable relative orientation.

The row 242 of grooves 240 is formed on a groove surface 246 (FIG. 8) recessed from the outer surface of the first wand body 210. A plurality of bumps 248 protrude from the groove surface 246 such that each adjacent pair of bumps 248 defines a groove 240 therebetween. The groove surface 246 begins at the first end 202 of the first wand body 210 and terminates proximate the accessory attachment assembly 220. The row 242 of grooves 240 terminates at the same location as the groove surface 246 but begins at a different point along the groove surface 246 such that a portion of the groove surface 246 does not include any bumps. In further embodiments, the groove surface 246 and row 242 of grooves 240 may have any other suitable configuration.

With reference to FIGS. 6 and 8, the first wand body 210 may have a substantially circular cross section, with the alignment slot 230 and groove surface 246 protruding radially inward into the first wand cavity 215. The first wand body's 210 cross-section is substantially constant in shape and size between the first and second ends 202, 204 of the first wand 200. In other embodiments, the cross-section may vary in shape or size, for example but without limitation, by tapering in diameter such that the cross-sectional area of the cavity 215 increases or decreases.

Figure 9:
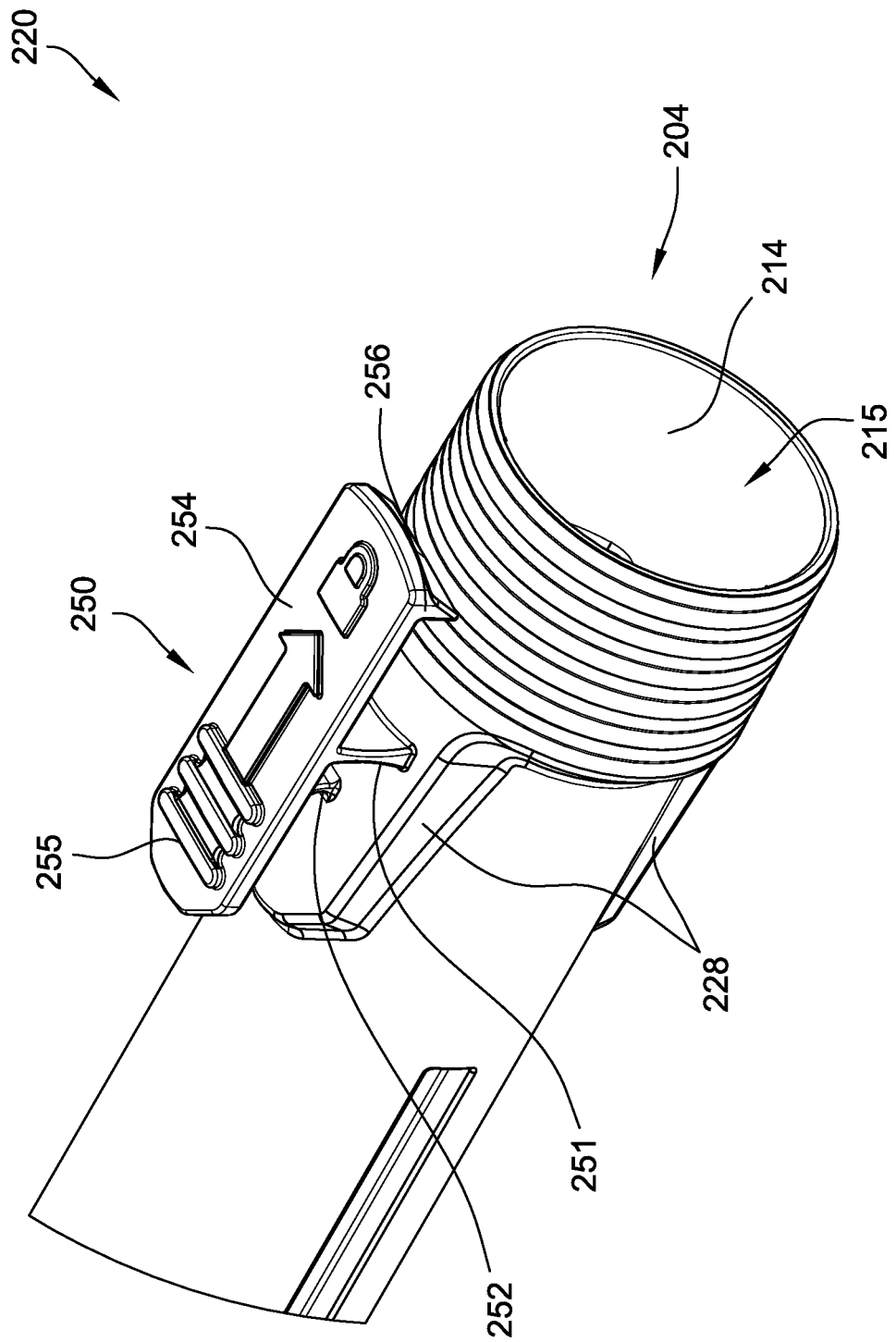
FIG. 9 is a perspective view of an accessory attachment assembly of the first wand shown in FIG. 5.
Figure 10:
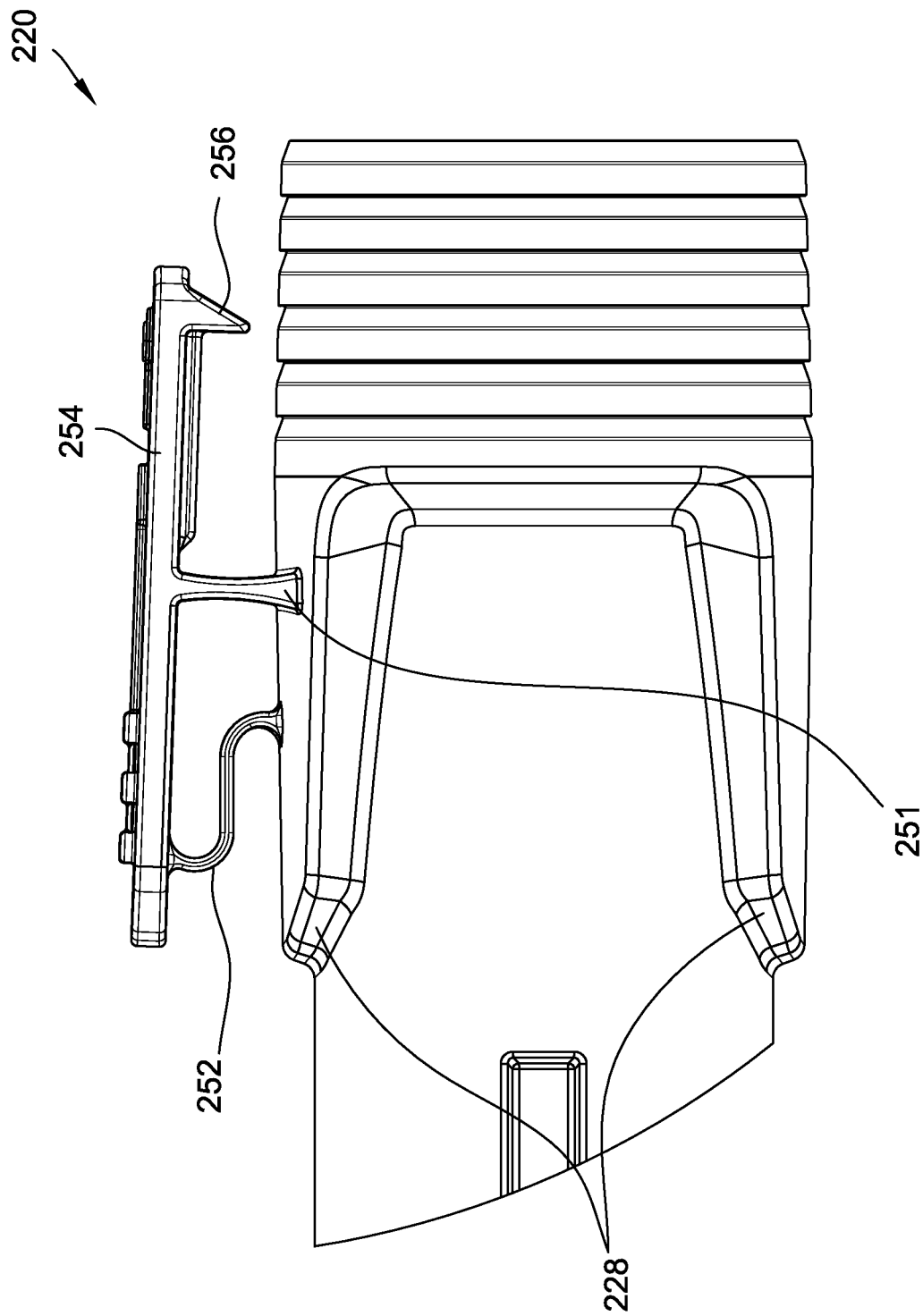
FIG. 10 is a side view of the accessory attachment assembly shown in FIG. 9.
Figure 11:
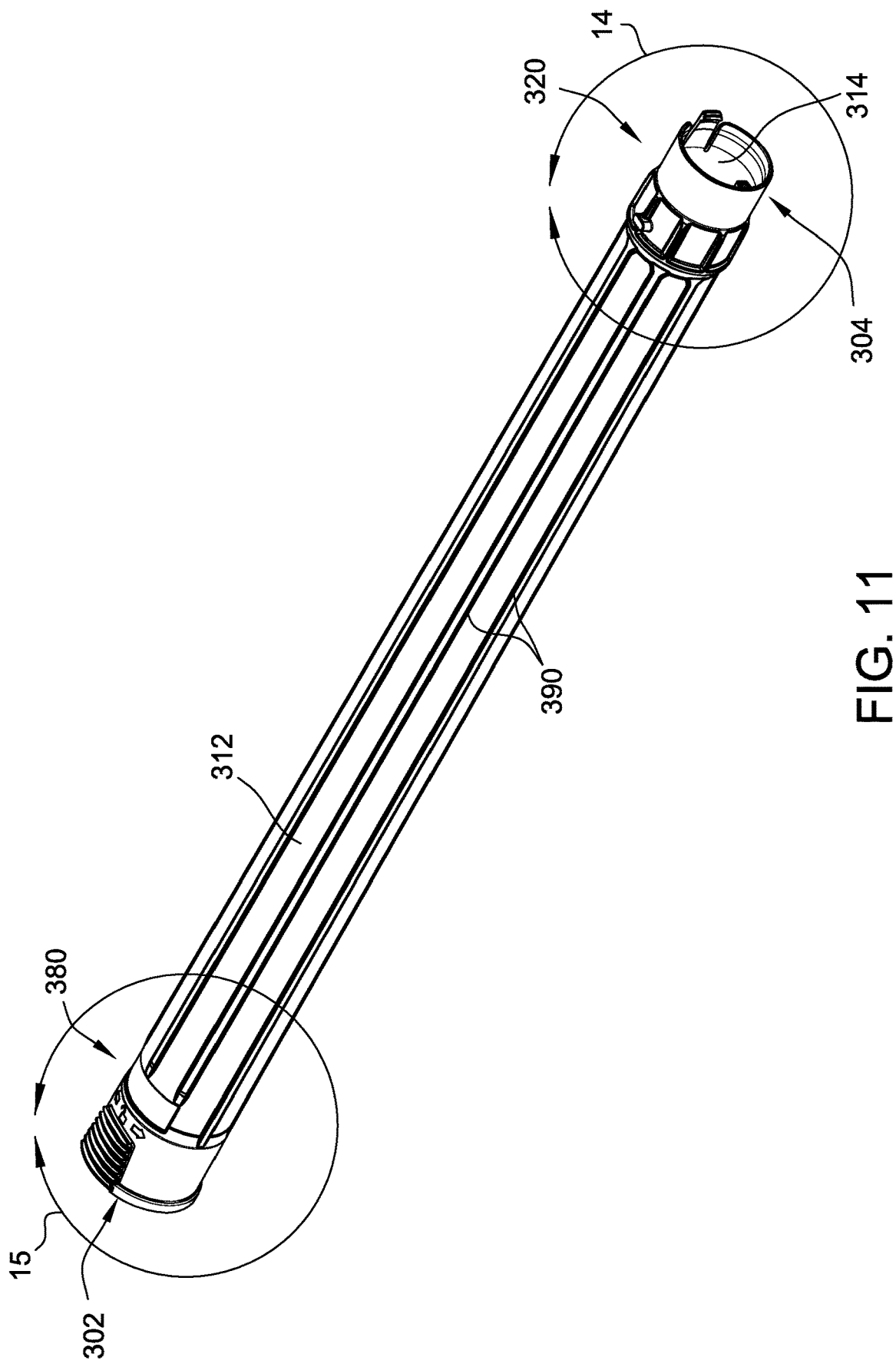
FIG. 11 is a perspective view of a second wand of the first example wand assembly shown in FIGS. 3 and 4.

With reference to FIGS. 9 and 10, the accessory attachment assembly 220 is formed on the outer surface 212 of the first wand body 210 and includes an accessory locking clip 250 and a pair of laterally opposed stopper bumps 228. The accessory locking clip 250 includes a tab 254 including a gripping portion 255 and a tooth 256 protruding radially inward from an end thereof. A base 251 and a flexible support member 252 connect the tab 254 to one of the stopper bumps 228. The base 251 and the flexible support member 252 have a suitably resilient construction such that the tab 254 is capable of being rotatably deflected about the base 251 in the presence of an applied force to the gripping portion 255, and returning to an initial, undeflected position without undergoing permanent deformation when the force is removed. In the illustrated embodiment, for example, the base 251 and the flexible support member 252 are constructed from a resilient plastic and can deflect to move the tab 254 such that it is angled obliquely relative to the first wand body 210. For example, a force applied to the gripping portion 255 of the tab 254 may deflect the tab 254 such that the tooth 256 is positioned radially outward of its undeflected position, allowing a cleaning tool (not shown) to be received by the accessory attachment assembly 220 and retained by the tooth 256.

With reference to FIG. 11-15, the second wand 300 extends from a first end 302 to a second end 304. The second wand 300 has an outer surface 312 and an inner surface 314, with the inner surface 314 defining a second wand cavity 315, at least a portion of which forms part of the vacuum conduit 16 when the wand assembly 100 is used in the extended configuration shown in FIG. 4. The outer surface 312 may be ergonomically shaped and/or textured to facilitate gripping the second wand 300. The outer surface 312 includes a plurality of tactile ridges 390 disposed circumferentially about the second wand 300 to facilitate gripping the second wand 300. Additionally or alternatively, the outer surface 312 may include stippling, knurling, abrasive surfaces, combinations thereof, or any other suitable ergonomic shape or texture that facilitates gripping the second wand 300.

Figure 12:
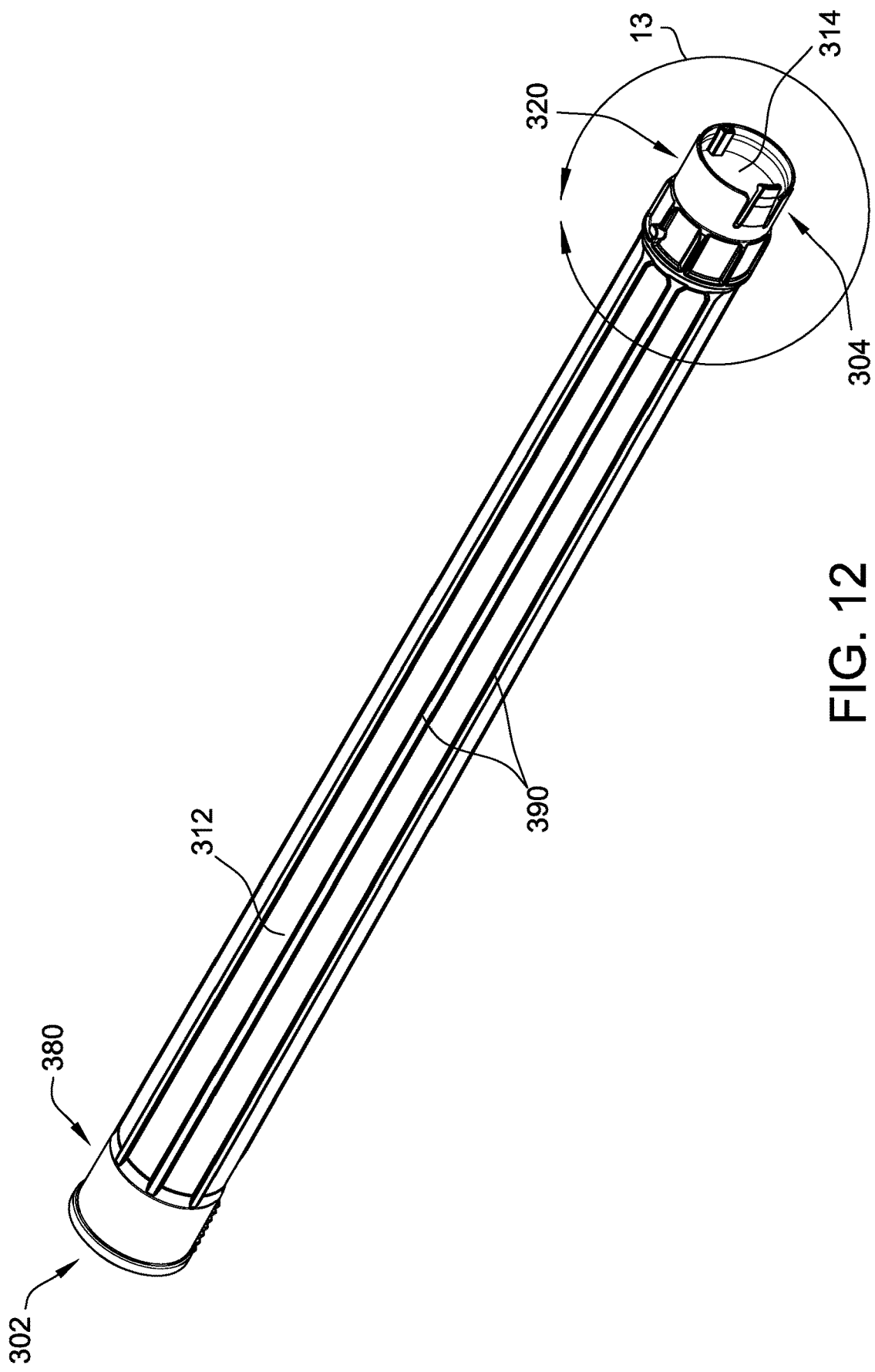
FIG. 12 is another perspective view of the second wand shown in FIG. 11.
Figure 13:
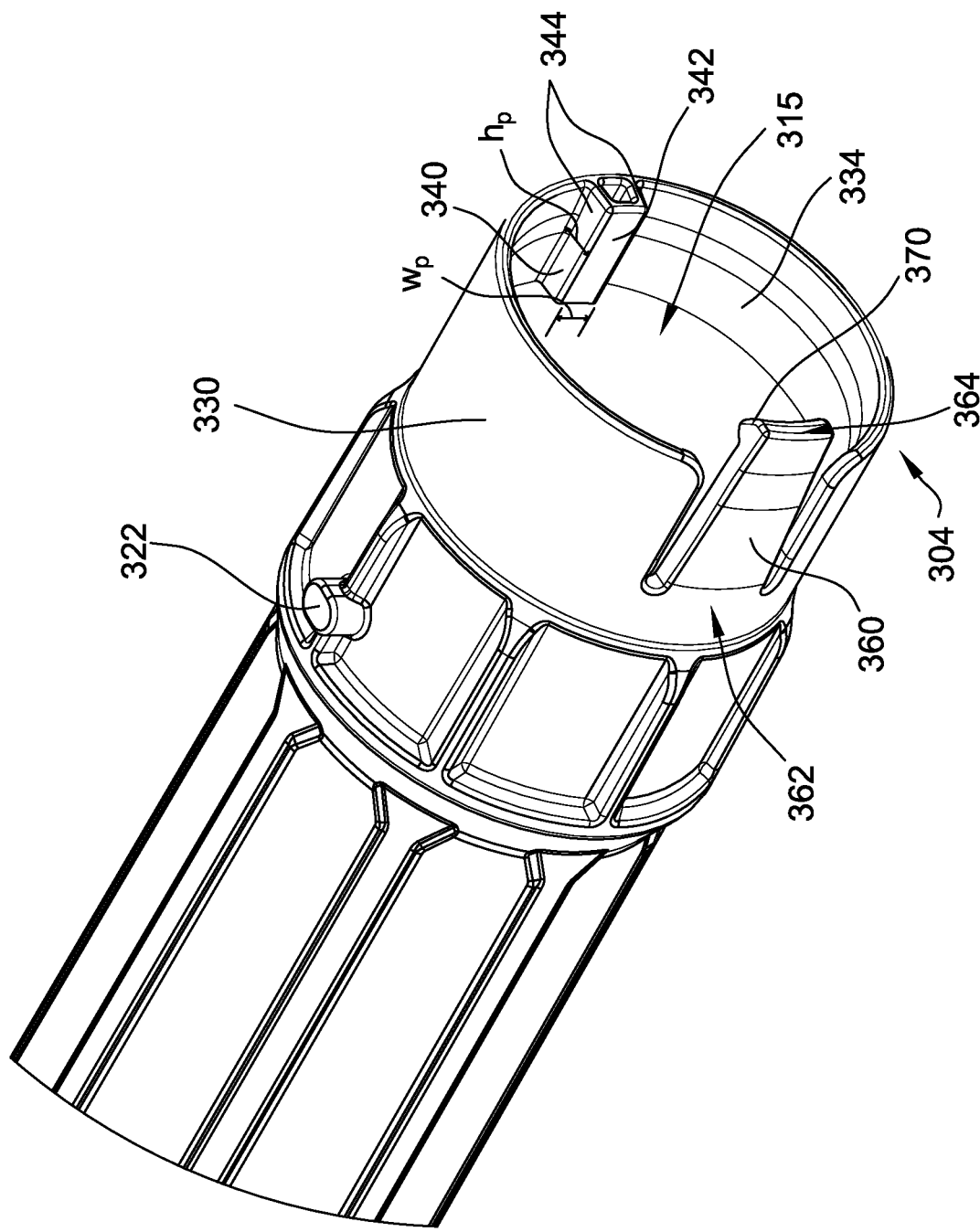
FIG. 13 is an enlarged view of a locking assembly of the second wand shown in FIG. 12.
Figure 14:
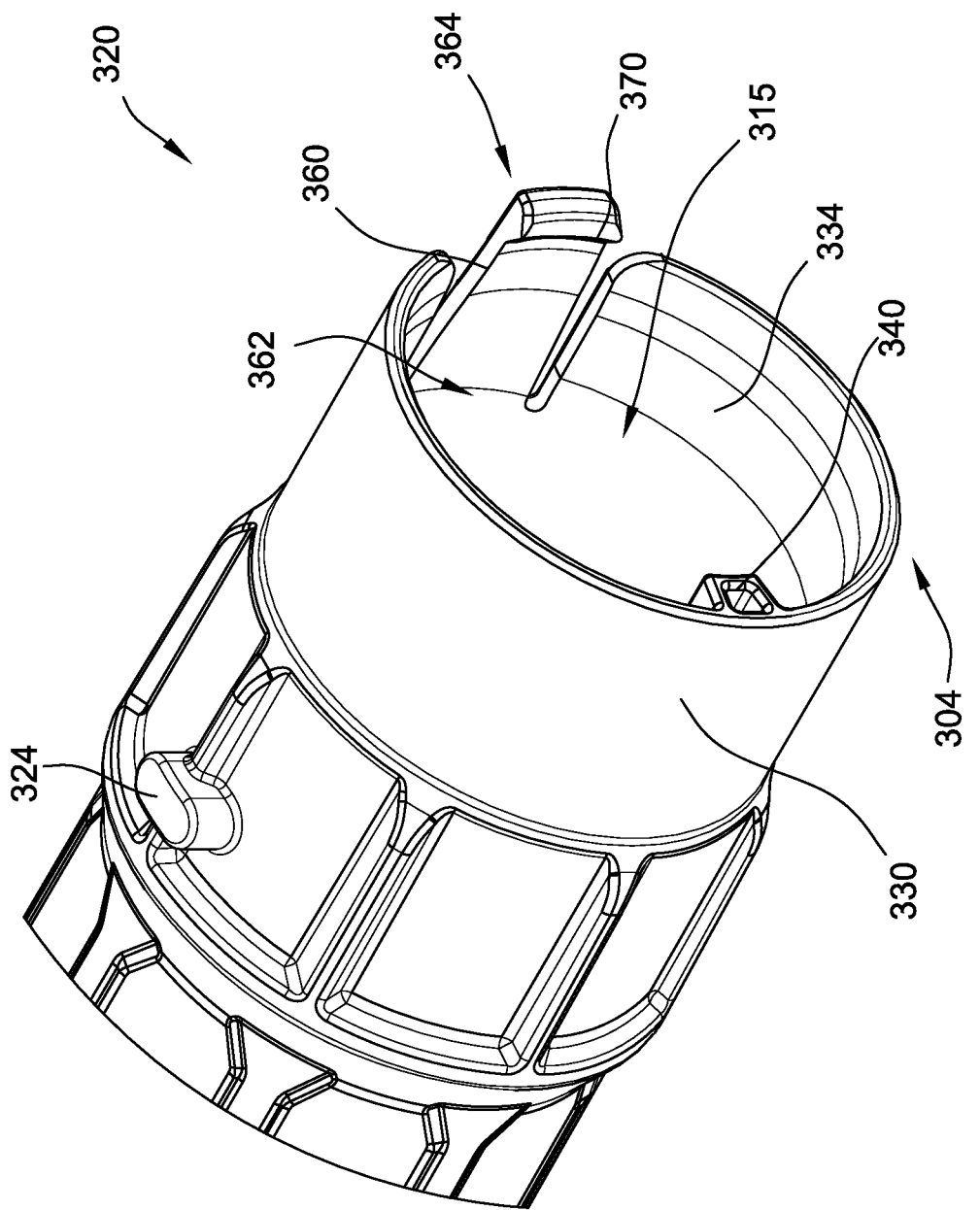
FIG. 14 is another enlarged view of the locking assembly of the second wand shown in FIG. 11.

The second wand 300 further includes a locking assembly 320 positioned at the second end 304 thereof. With reference to FIGS. 12-13, the locking assembly 320 includes a locking base 330, an alignment protrusion 340, and a locking tab 360. The alignment protrusion 340 protrudes radially inward from an inner surface 334 of the locking base 330, and is defined in part by a radial inner surface 342 and a pair of laterally opposed protrusion sidewalls 344 oriented substantially perpendicular to the radial inner surface 342. In further embodiments, the alignment protrusion 340 may have any other suitable construction. For example, the alignment protrusion may be defined by more or fewer inner and sidewall surfaces, and/or may be defined by at least one continuous curved surface.

The alignment protrusion has a height $h_p$ and a width $w_p$. The height $h_p$ may be greater than, less than, or substantially the same as the depth $d_s$ of the alignment slot 230. The width $w_p$ may be less than or substantially the same as the width $w_p$ of the alignment slot 230. The alignment protrusion 340 is shaped, sized, and positioned to be received within the alignment slot 230 defined in the first wand 200 when the first and second wands 200, 300 are telescopically arranged as shown in FIGS. 3 and 4.

The locking tab 360 is positioned approximately 180 degrees from the alignment protrusion 340 relative to the longitudinal axis x of the wand assembly 100. In further embodiments, the locking tab 360 and alignment protrusion 340 may have any other suitable relative orientation. The locking tab 360 extends from a first end 362 connected to the locking base 330 to a second, free end 364. The second end 364 of the locking tab 360 extends beyond the second end 304 of the second wand 300. In further embodiments, the second end 304 of the second wand 300 may extend beyond the second end 364 of the locking tab 360, or the second wand 300 and the locking tab 360 may terminate at the same point. The locking tab 360 further includes a locking tooth 370 integrally formed with the second wand 300 and protruding radially inward from a radial inner surface of the locking tab 360. The locking tooth 370 has a shape substantially similar to a shape of the plurality of grooves 240.

The locking tab 360 has a suitably resilient construction such that the locking tab 360 is capable of deflecting radially inward and/or outward in the presence of an applied force, and returning to an initial, undeflected position without undergoing permanent deformation when the force is removed. In the illustrated embodiment, for example, the locking tab 360 is constructed from a resilient plastic and is connected or secured to the locking base 330 at only one end (i.e., at the first end 362 of the locking tab 360) such that the other end of the locking tab 360 (i.e. the second end 364) is free to move or deflect radially inward and/or outward. For example, a force applied to the locking tab in the radially inward direction may deflect the locking tooth 370 into engagement with one of the plurality of grooves 240.

The locking assembly 320 further includes first and second lock indicators 322, 324 (FIGS. 13-14) protruding from an outer surface thereof. The lock indicators 322, 324 are positioned circumferentially opposite one another such that they are spaced approximately 180 degrees apart. Each lock indicator 322, 324 is additionally positioned approximately 90 degrees from both of the alignment protrusion and the locking tab 360. The first lock indicator 324 is smaller than the second lock indicator 322, but in further embodiments the first and second lock indicators 322, 324 may have substantially the same size and shape.

Figure 15:
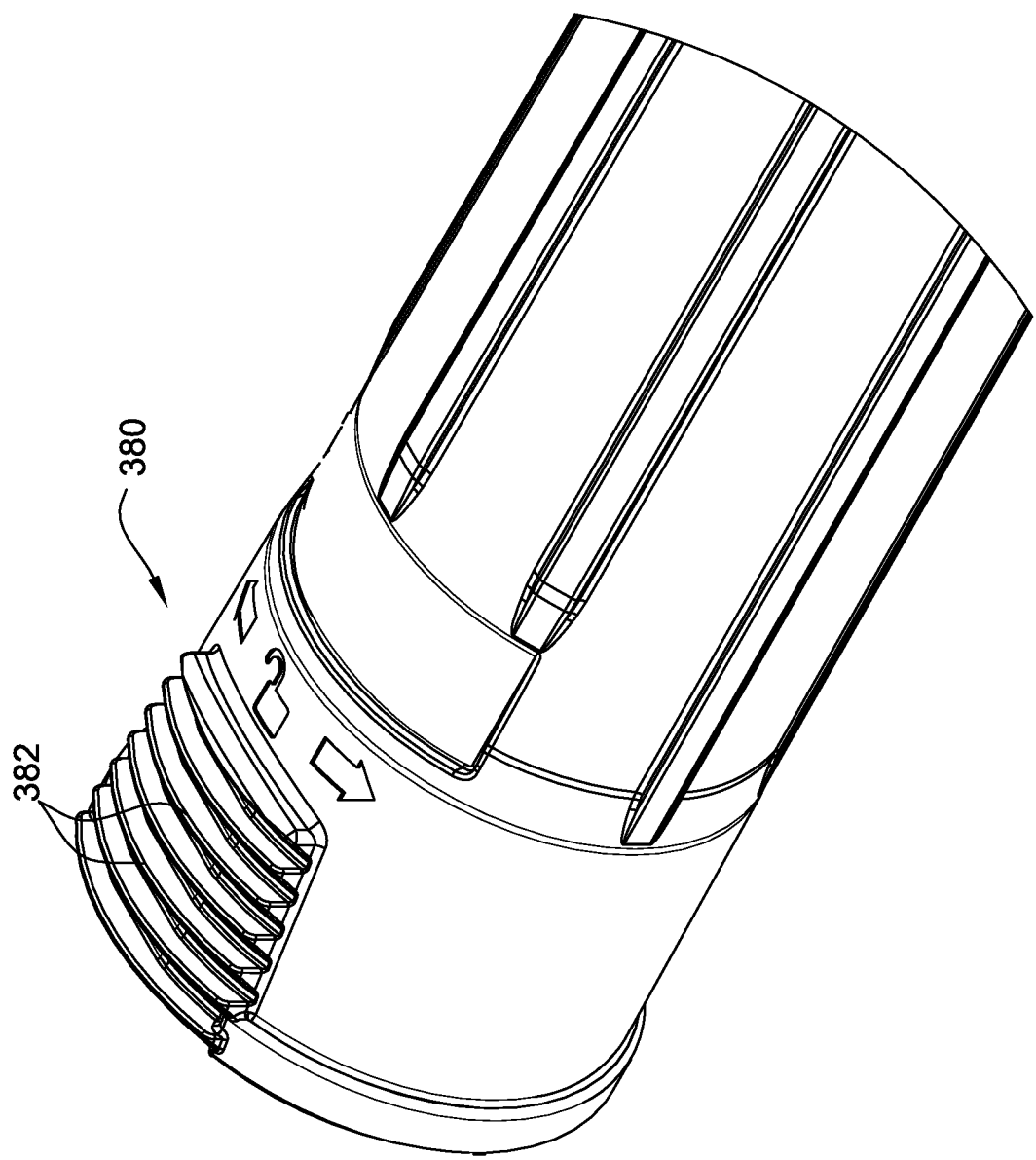
FIG. 15 is a perspective view of a hose attachment assembly of the second wand shown in FIG. 11.
Figure 16:
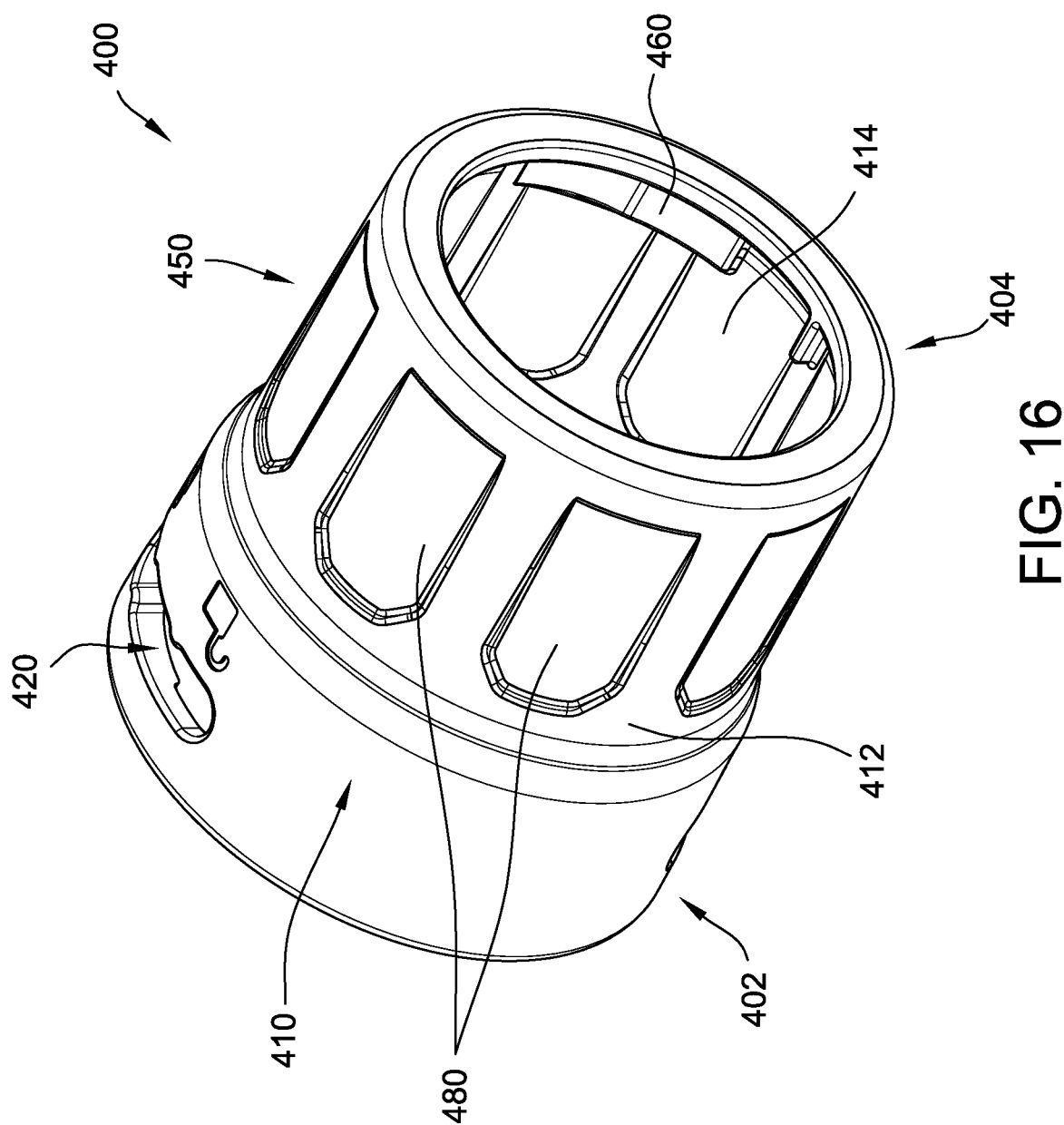
FIG. 16 is a perspective view of a locking cuff of the first example wand assembly shown in FIGS. 3-4.
Figure 17:
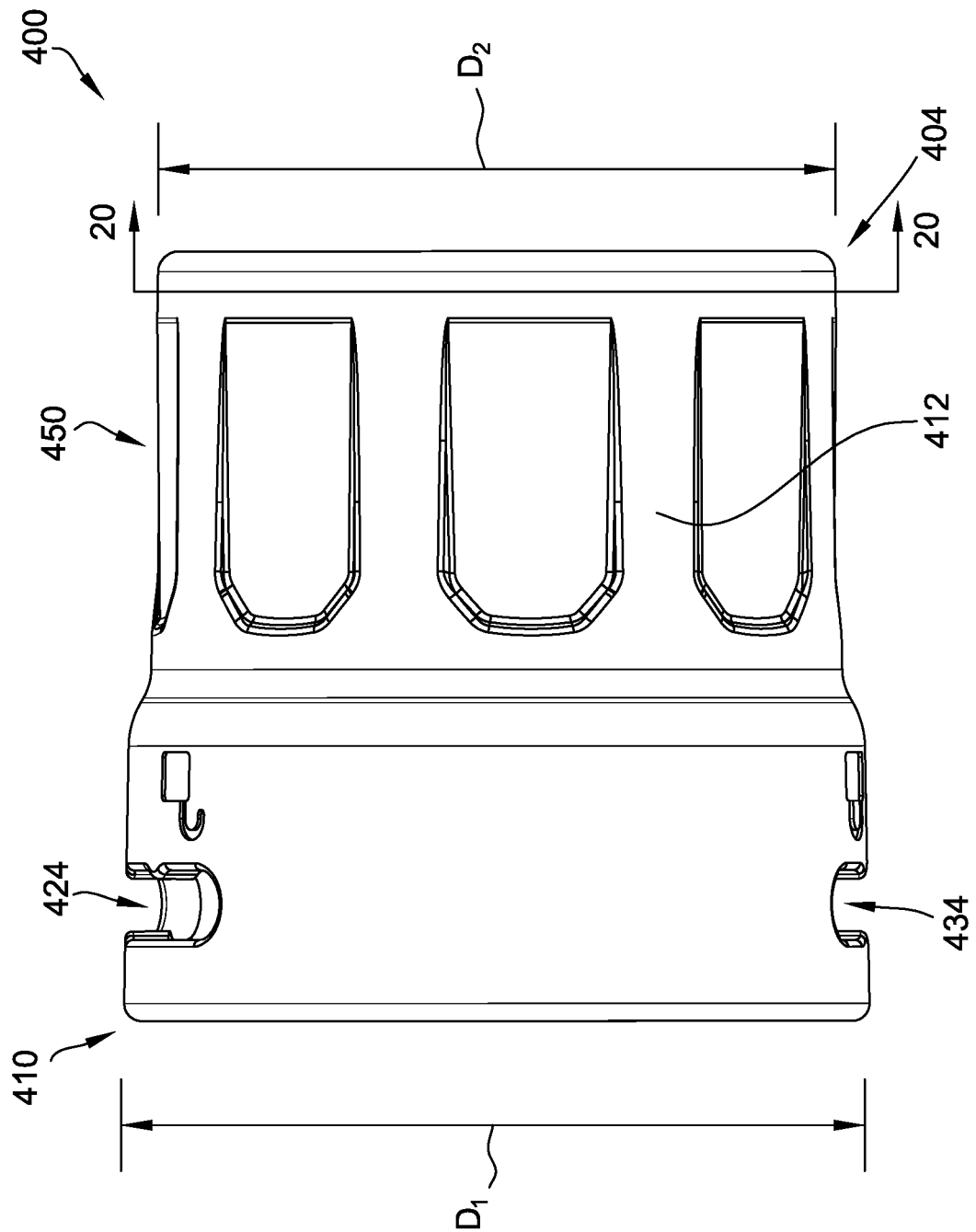
FIG. 17 is a side view of the locking cuff shown in FIG. 16.

With reference to FIG. 15, the second wand 300 further includes a hose attachment assembly 380 formed on the outer surface 312 of the second wand 300 proximate the first end 302 thereof. The hose attachment assembly 380 includes a plurality of locking ridges 382 arranged in a row such that each locking ridge 382 is substantially perpendicular to the longitudinal axis x of the wand assembly 100. The hose attachment assembly 380 is operable to connect the wand assembly 100 to the hose of the vacuum cleaner 10 to form the vacuum conduit 16. The hose attachment assembly 380 may be sized and shaped to receive a hose of a particular diameter, for example and without limitation, a hose with a diameter of 1⅞ inches or 2½ inches.

With reference to FIGS. 16-20, the locking cuff 400 extends from a first end 402 to a second end 404, and includes a first portion 410 having a diameter $D_1$ and a second portion 450 having a diameter $D_2$. In the illustrated embodiment, $D_1$ is greater than $D_2$, and the diameters $D_1$, $D_2$ of both the first and second portions 410, 450 are substantially constant from the first end 402 to the second end 404. In further embodiments, one or both of the first and second portions 410, 450 may taper in diameter such that $D_1$ and/or $D_2$ is not constant, or the locking cuff 400 may include more or fewer than two portions with either constant or tapering diameters.

The locking cuff 400 has an outer surface 412 and an inner surface 414. The outer surface 412 of the second portion 450 may be ergonomically shaped and/or textured to facilitate gripping the locking cuff 400. The outer surface 412 of the second portion 450 includes a plurality of recessed surfaces 480 spaced circumferentially about the locking cuff 400 to facilitate gripping the locking cuff 400. Additionally or alternatively, the outer surface 412 may include stippling, knurling, abrasive surfaces, combinations thereof, and/or any other suitable ergonomic shape or texture that facilitates gripping the locking cuff 400. The first portion 410 may additionally or alternatively include one or more of the above-listed features.

Figure 18:
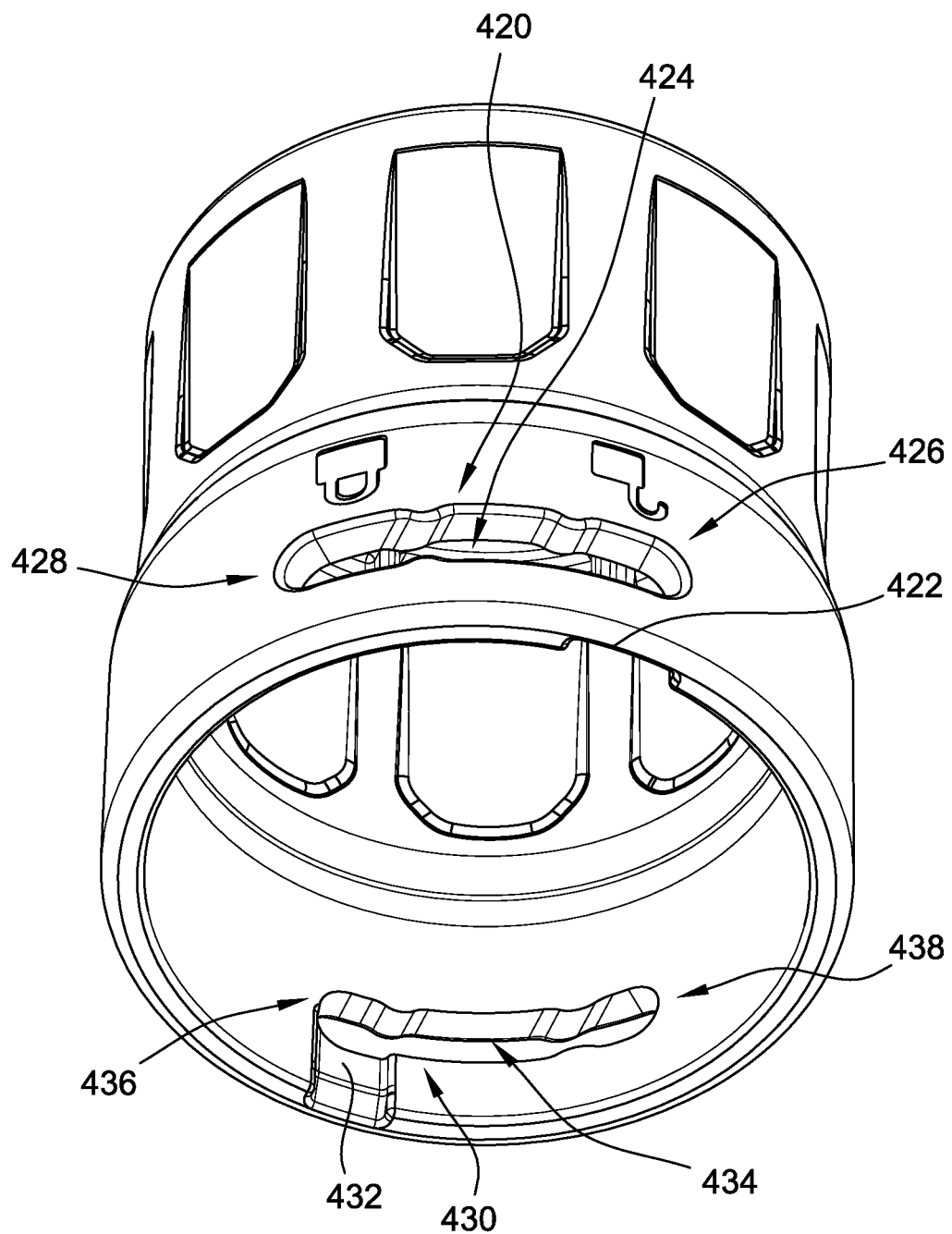
FIG. 18 is another perspective view of the locking cuff shown in FIG. 16.

With additional reference to FIG. 18, the first portion 410 defines a first L-shaped slot 420 and a second L-shaped slot 430. Each L-shaped slot 420, 430 includes a respective first or second recessed portion 422, 432 and a first or second lock indicator opening 424, 434. Each lock indicator opening 424, 434 extends from a first end 426, 436 proximate the recessed portion 422, 432 to a second end 428, 438. The first and second L-shaped slots 420, 430 are shaped, size, and positioned to receive the respective first and second lock indicators 322, 324 of the second wand 300 therein. The illustrated embodiment includes two lock indicators and two corresponding lock indicator openings, but further embodiments may include any suitable number of lock indicator openings, for example and without limitation, zero, one, three, or more.

A depth of each of the recessed portions 422, 432 is approximately equal to a height of each of the lock indicators 322, 324, such that the lock indicators 322, 324 can only be slid into the respective lock indicator opening 424, 434 through the recessed portion 422, 432. In embodiments in which the second lock indicator 324 is wider than the first lock indicator 322, the second recessed portion 432 is correspondingly wider than the first recessed portion 422. In such embodiments, the second lock indicator 324 is too large to be received in the first recessed portion 422, and the locking cuff 400 and second wand 300 can only be installed with the first lock indicator 322 being received in the first recessed portion 422 and the second lock indicator 324 being received in the second recessed portion 432. In further embodiments, the lock indicators 322, 324 are the same size and the recessed portions 422, 432 have substantially the same widths such that the locking cuff 400 can be installed with either lock indicator 322, 324 received by either recessed portion 422, 432. Once positioned within the lock indicator openings 424, 434, the lock indicators 322, 324 can move between the first and second ends 426/436, 428/438 when the locking cuff 400 is rotated relative to the second wand 300.

Figure 19:
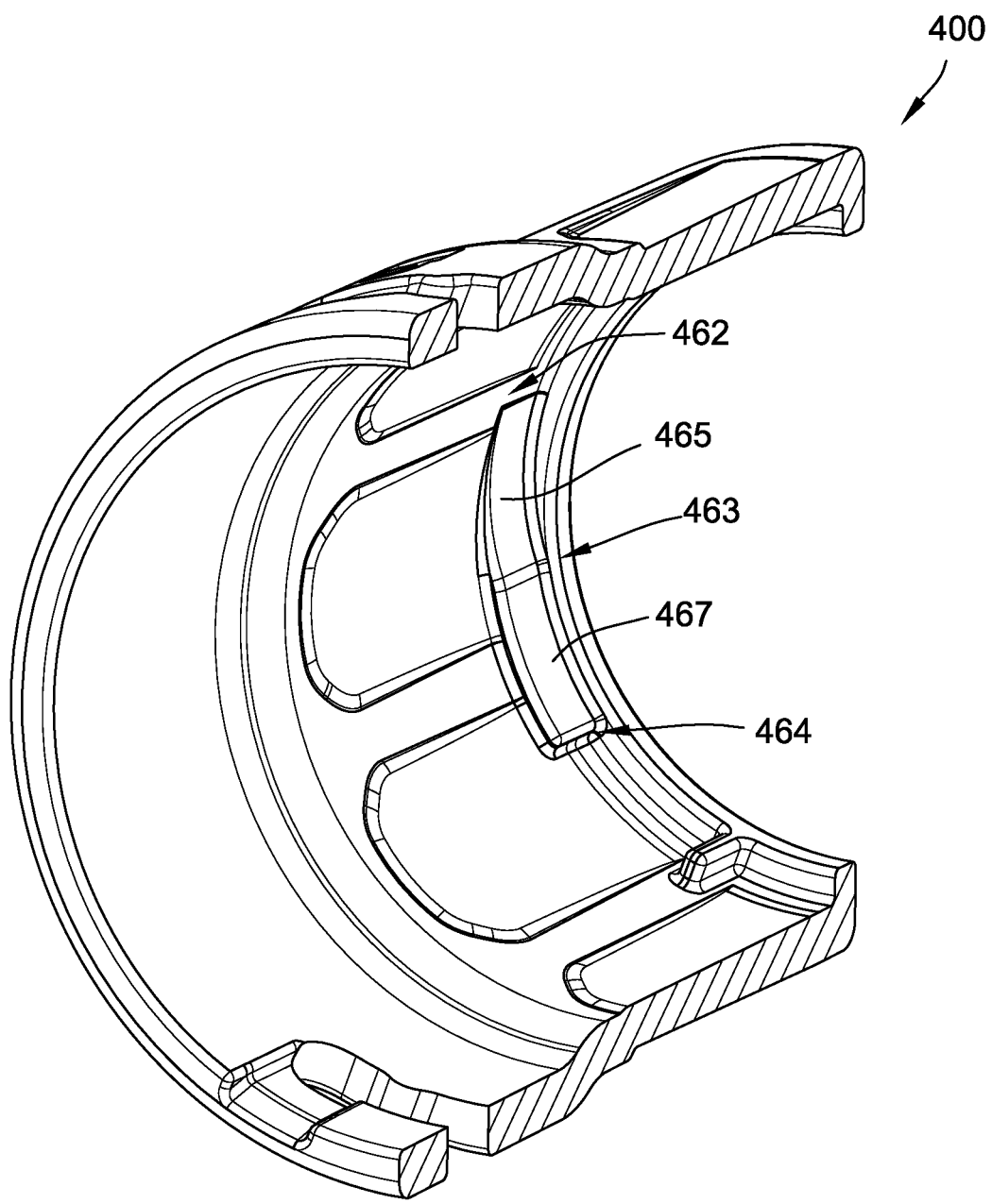
FIG. 19 is a cross-sectional perspective view of the locking cuff shown in FIG. 16.
Figure 20:
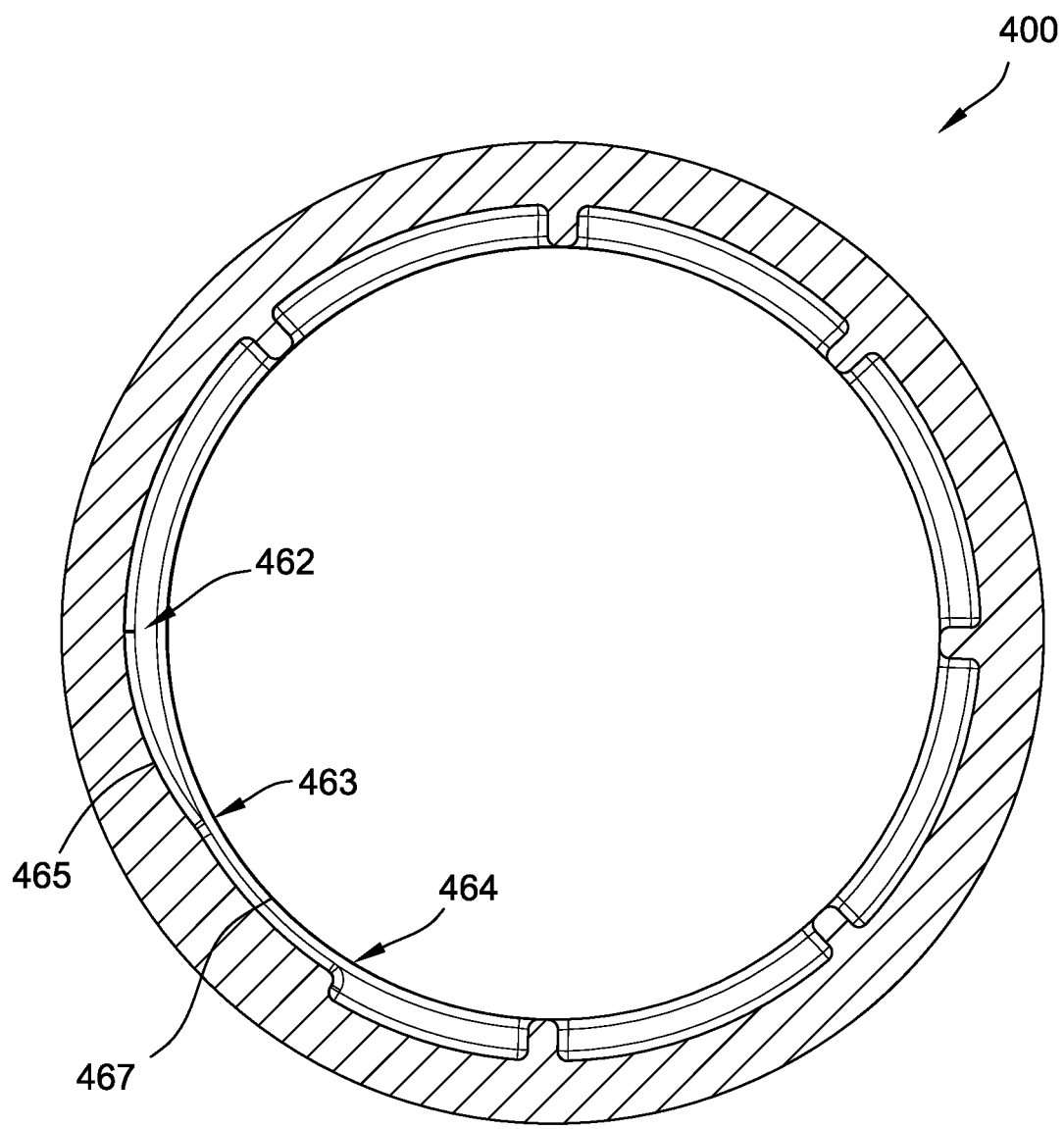
FIG. 20 is a front cross-sectional view of the locking cuff shown in FIGS. 16-17 taken along line 20-20.

The locking cuff 400 further includes a locking ramp 460 protruding radially inward from the inner surface 414 thereof. With reference to FIGS. 19-20, the locking ramp 460 extends circumferentially from a first end 462 to a second end 464. The locking ramp 460 tapers in height radially between the first end 462 and a midpoint 463 to form a tapering portion 465, and forms a plateau 467 of constant height between the midpoint 463 and the second end 464. The midpoint is approximately halfway between the first end 462 and the second end 464, such that the tapering portion 465 of the locking ramp 460 is substantially the same length as the plateau 467. In further embodiments, the plateau 467 may be shorter or longer than the tapering portion 465, or the tapering portion 465 may extend from the first end 462 to the second end 464 such that the locking ramp 460 does not include a plateau 467.

When the wand assembly 100 is assembled as shown in FIGS. 3 and 4, the alignment protrusion 340 of the second wand 300 is received within the alignment slot 230 of the first wand such that the first and second wands 200, 300 are slidable relative to one another in the longitudinal direction to adjust a total length of the wand assembly 100. Furthermore, when the widths $w_p$, $w_s$ of the alignment protrusion 340 and the alignment slot 230 are substantially the same, a relative rotational position of the first and second wands 200, 300 is fixed. That is, relative rotation between the first and second wands 200, 300 is limited or prevented. In other embodiments, the first and second wands 200, 300 may rotate relative to one another. When the alignment protrusion 340 is received within the alignment slot 230, the locking tab 360 is circumferentially aligned with the row 242 of grooves 240 such that the locking tooth 370 is selectively engageable with any of the plurality of grooves 240.

Figure 21:
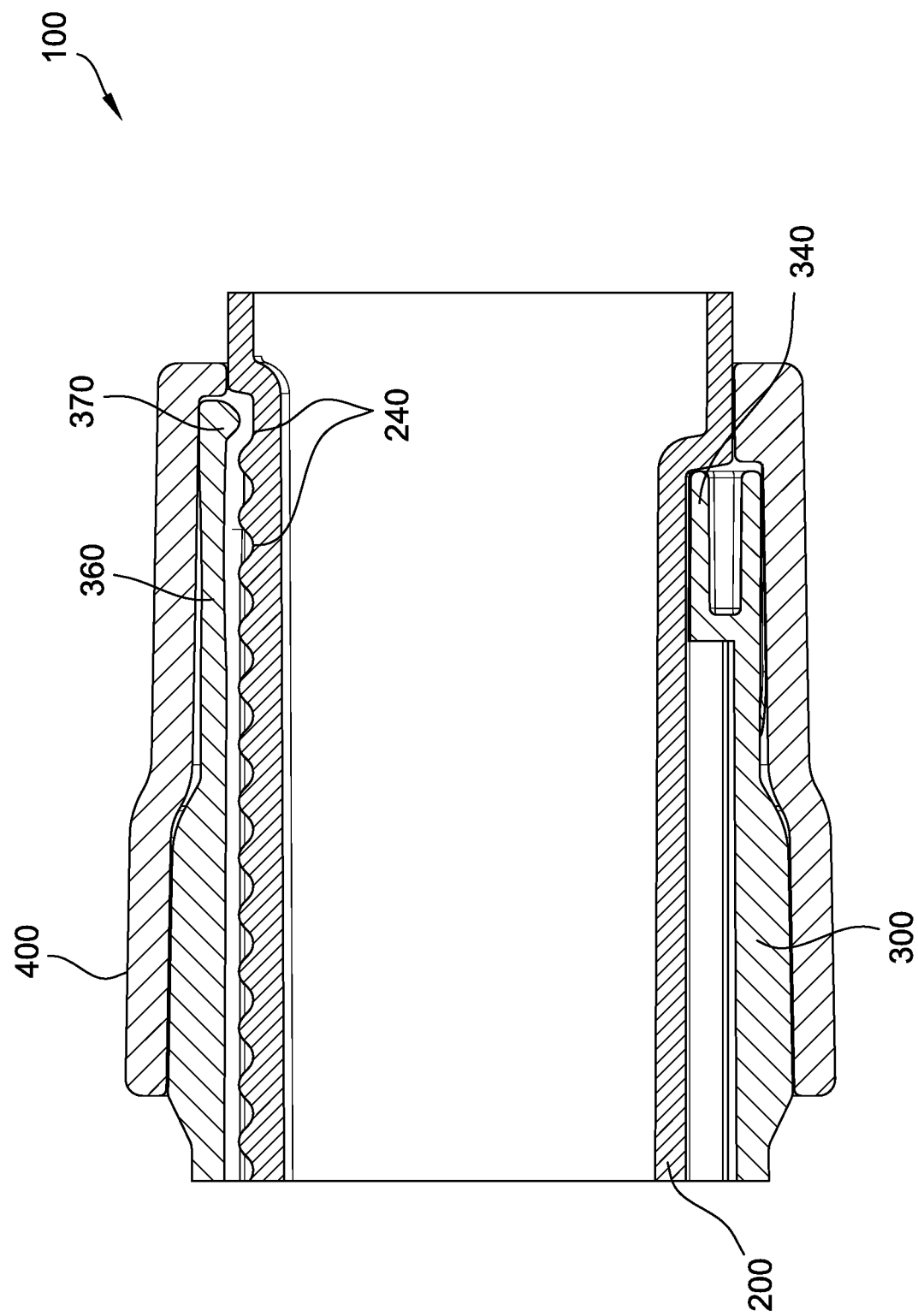
FIG. 21 is a partial side cross-sectional view of the first example wand assembly shown in FIGS. 3-4, shown in an unlocked configuration.
Figure 22:
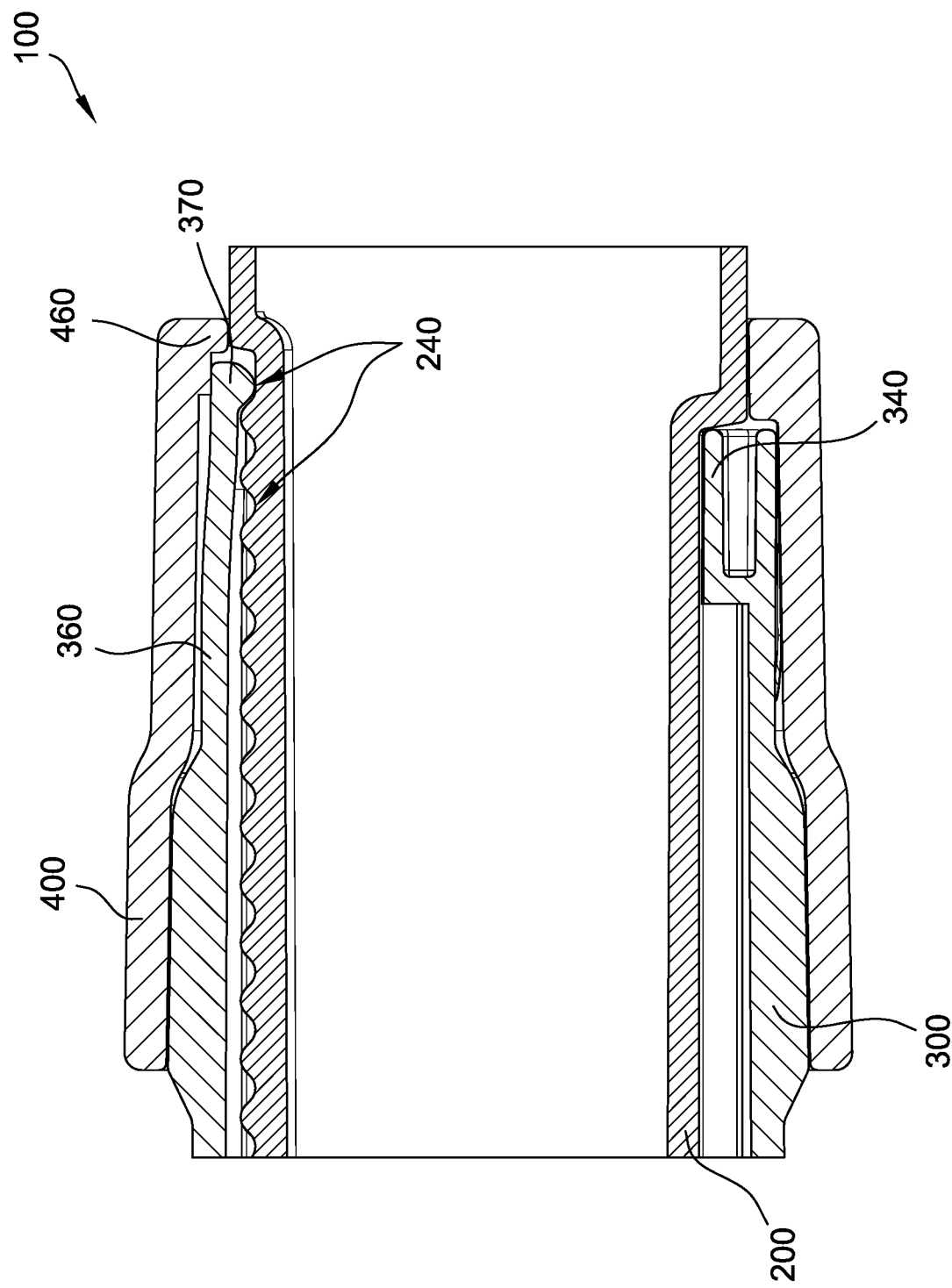
FIG. 22 is a partial side cross-sectional view of the first example wand assembly shown in FIGS. 3-4, shown in a locked configuration.
Figure 23:
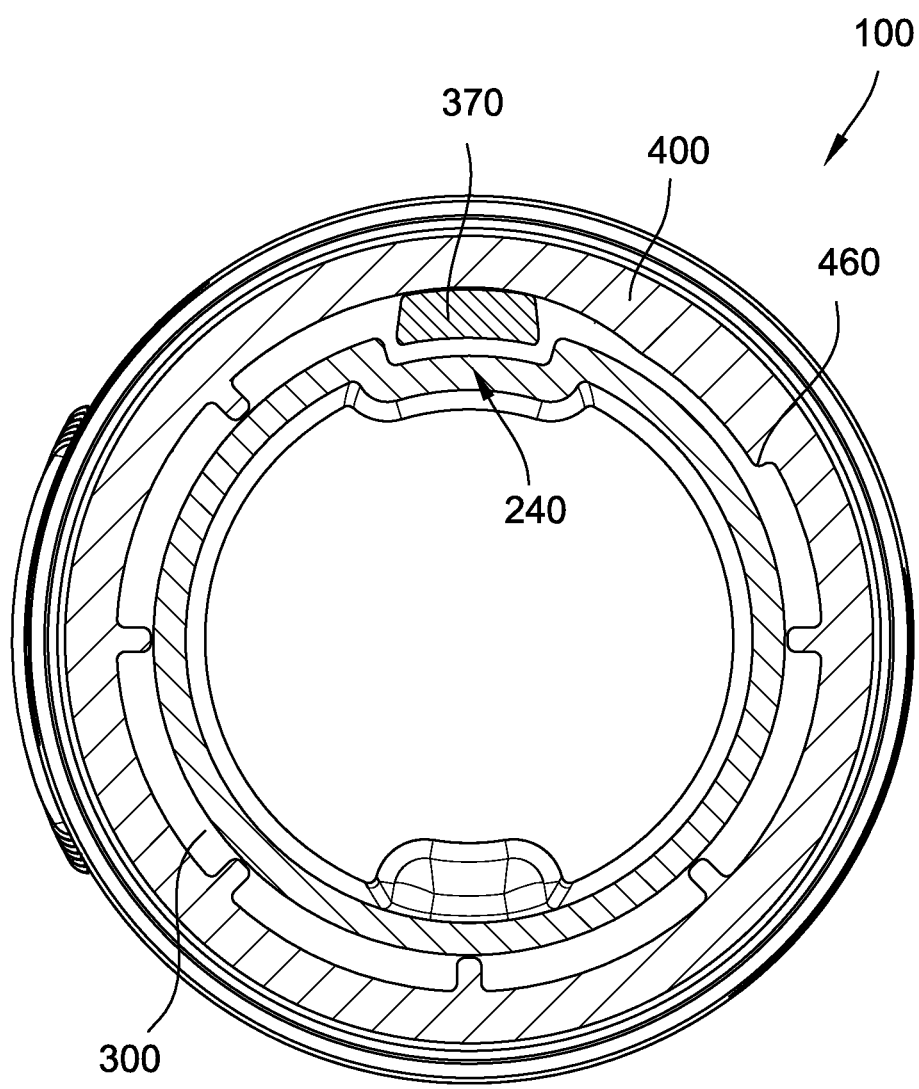
FIG. 23 is a front cross-sectional view of the first example wand assembly shown in FIGS. 3-4, shown in the unlocked configuration.
Figure 24:
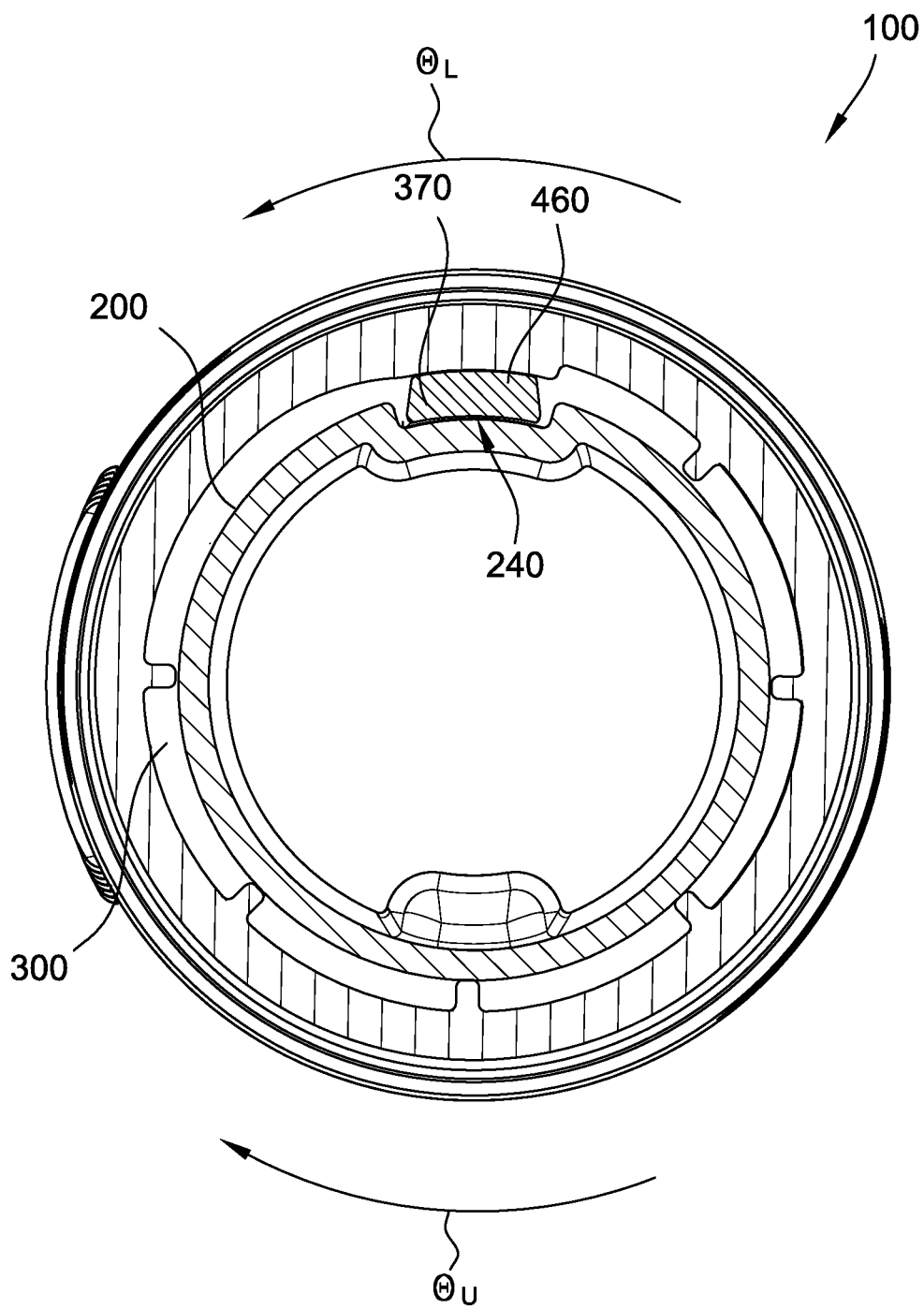
FIG. 24 is a front cross-sectional view of the first example wand assembly shown in FIGS. 3-4, shown in the locked configuration.
Figure 26:
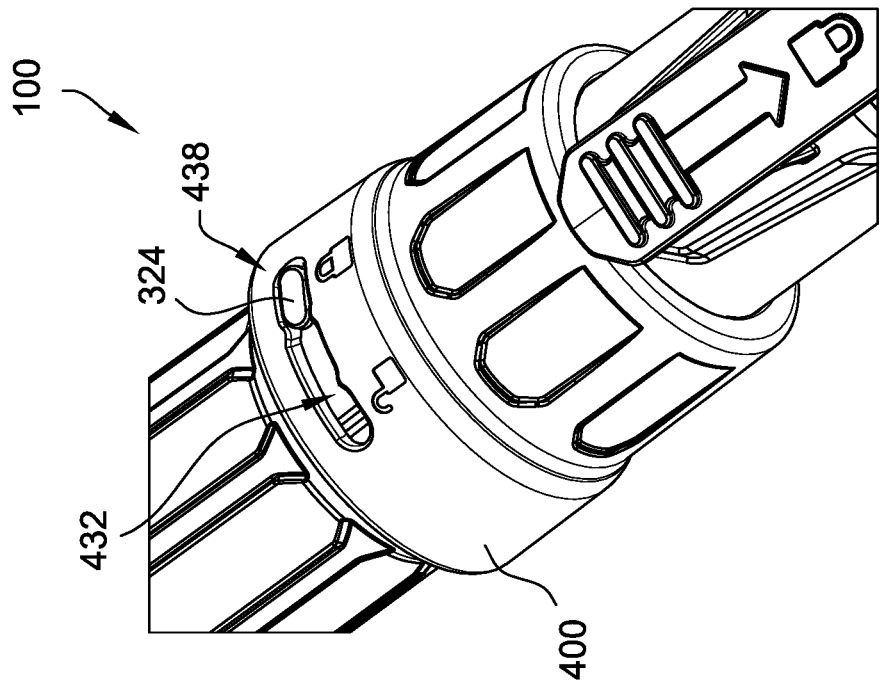
FIG. 26 is an enlarged perspective view of the first example wand assembly shown in FIGS. 3-4, shown in the locked configuration.

The wand assembly 100 is selectively configurable in an unlocked configuration (FIGS. 21, 23 and 25) and a locked configuration (FIGS. 22, 24, and 26). In the unlocked configuration, the locking cuff 400 is configured in an unlocked position (FIG. 22), in which the locking ramp 460 does not contact any part of the locking tab 360. The locking tab 360 is undeflected such that the locking tooth 370 does not lockingly engage with the row 242 of grooves 240 of the first wand 200, leaving the first and second wands 200, 300 free to move relative to one another in the longitudinal direction. Relative movement between the first and second wands may cause the locking tooth 370 to slide over the bumps 248 of the row 242 of grooves 240 one by one, creating an audible clicking sound to indicate to a user that the length of the wand assembly 100 is changing.

The wand assembly 100 may be repositioned into the locked configuration (FIG. 24) by rotating the locking cuff 400 relative to the first and second wands 200, 300 in a locking direction $\theta_L$. Rotation of the locking cuff 400 relative to the first and second wands 200, 300 causes the locking ramp 460 to deflect the locking tab 360 radially inward, pushing the locking tooth 370 into engagement with one of the grooves 240. The engagement of the locking tooth 370 and groove 240 prevents relative movement between the first and second wands 200, 300 in the longitudinal direction, thereby fixing the total length of the wand assembly. Rotation of the locking cuff 400 in an unlocking direction $\theta_U$ opposite the locking direction $\theta_L$ releases contact between the locking ramp 460 and the locking tab 360, allowing to locking tab 360 to return to its undeflected state and the locking tooth 370 to disengage from the groove 240. The first and second wands 200, 300 are then free to move relative to one another in the longitudinal direction.

Figure 25:
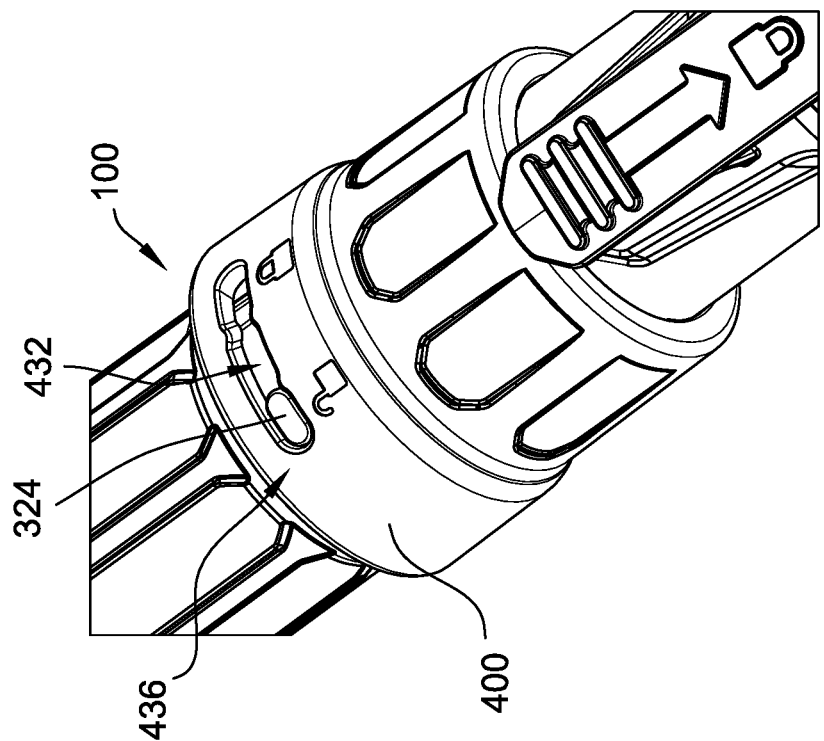
FIG. 25 is an enlarged perspective view of the first example wand assembly shown in FIGS. 3-4, shown in the unlocked configuration.

In the unlocked configuration, and with reference to FIG. 25, the first and second lock indicators 322, 324 are positioned proximate the first end 426, 436 of the respective lock indicator opening 424, 434, such that the lock indicators 322, 324 can be slid out longitudinally through the recessed surfaces 422, 432 to separate the locking cuff 400 from the second wand 300. In the locked configuration, and with reference to FIG. 26, the first and second lock indicators 322, 324 are positioned proximate the second end 428, 438 of the respective lock indicator opening 424, 434, such that relative movement in the longitudinal direction between the locking cuff 400 and the second wand 300 is prevented.

Figure 28:
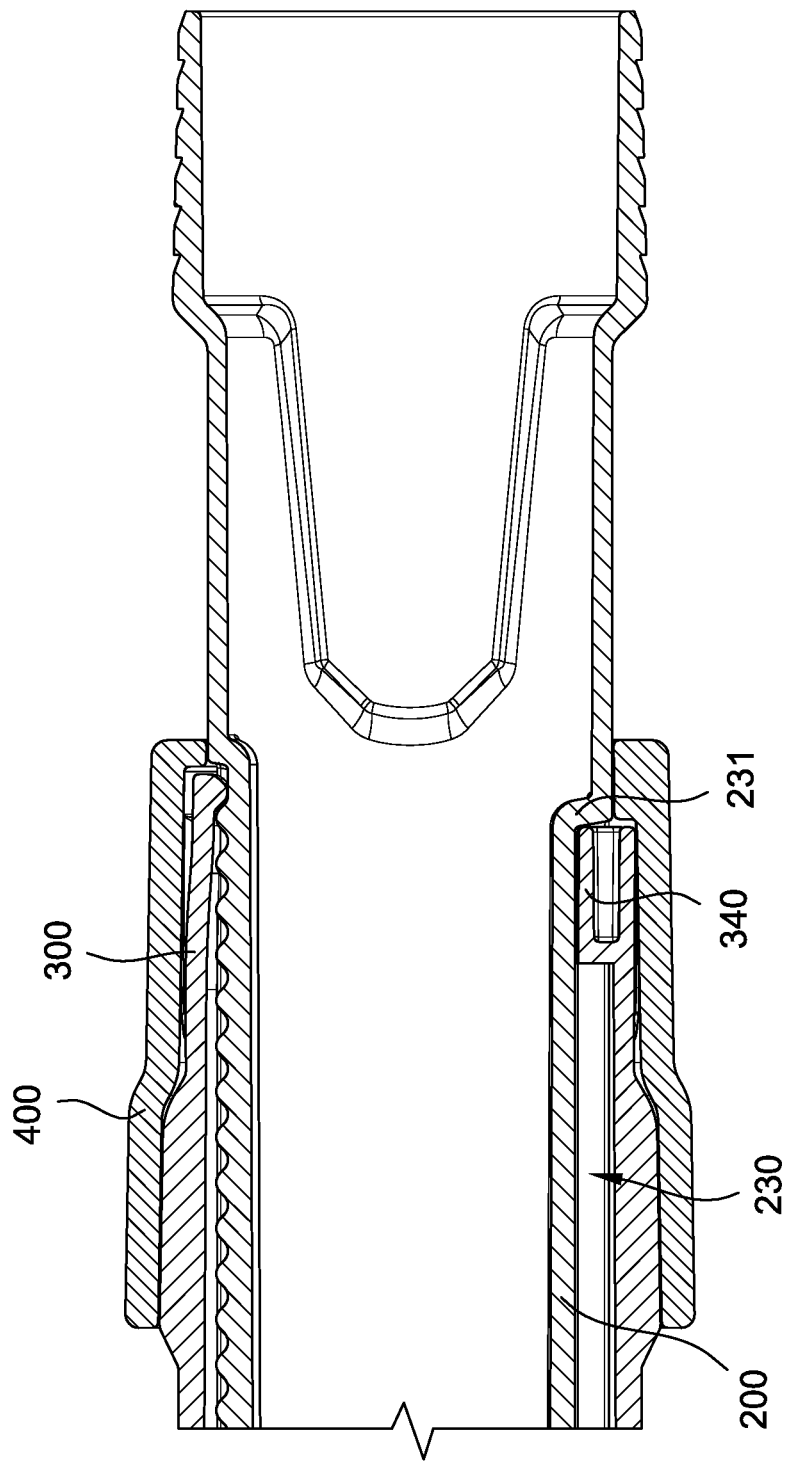
FIG. 28 is another partial side cross-sectional view of the first example wand assembly shown in FIGS. 3-4, shown in the retracted configuration.
Figure 30:
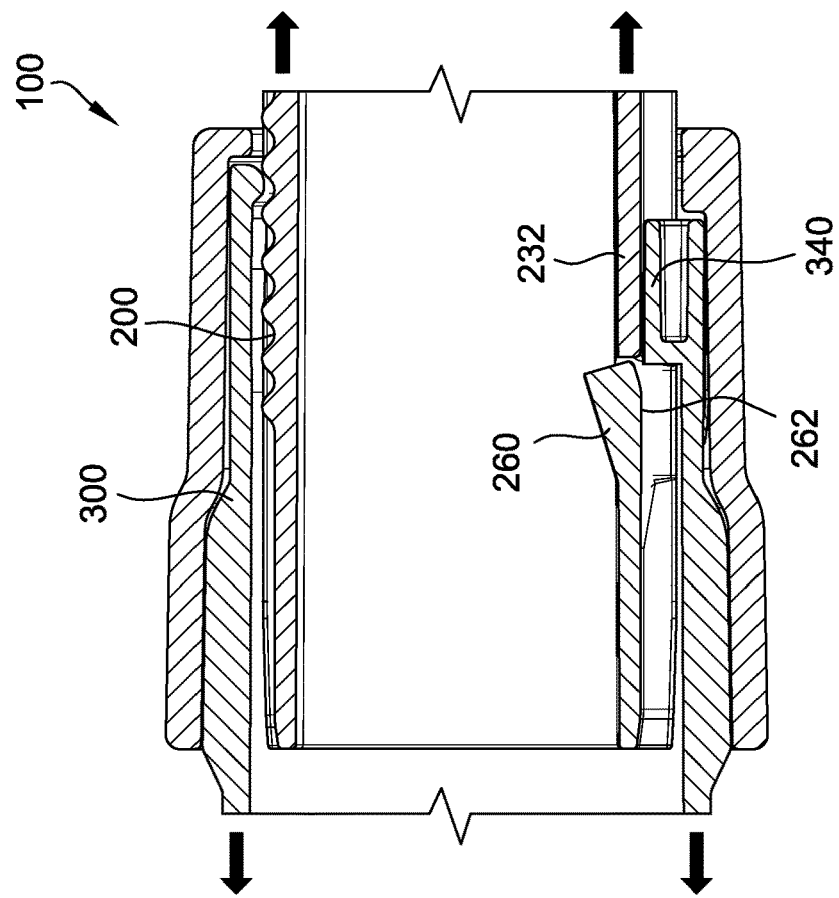
FIG. 30 is another partial side cross-sectional view of the first example wand assembly shown in FIGS. 3-4, shown in a fully extended configuration.

In the unlocked configuration, the wand assembly 100 is movable between the retracted configuration (FIG. 3) and a fully or partially extended configuration (FIG. 4). In the retracted configuration, and with additional reference to FIG. 27, the stopper bumps 228 contact a lip 451 of the second portion of the locking cuff 400 to prevent the locking cuff 400 and second wand 300 from moving past the stopper bumps 228. With additional reference to FIG. 28, the alignment protrusion 340 of the second wand 300 additionally contacts an end surface 231 of the alignment slot 230 for a similar purpose. The stopper bumps 228 and end surface 231 of the alignment slot 230 thus fix a minimum length of the wand assembly.

Figure 29:
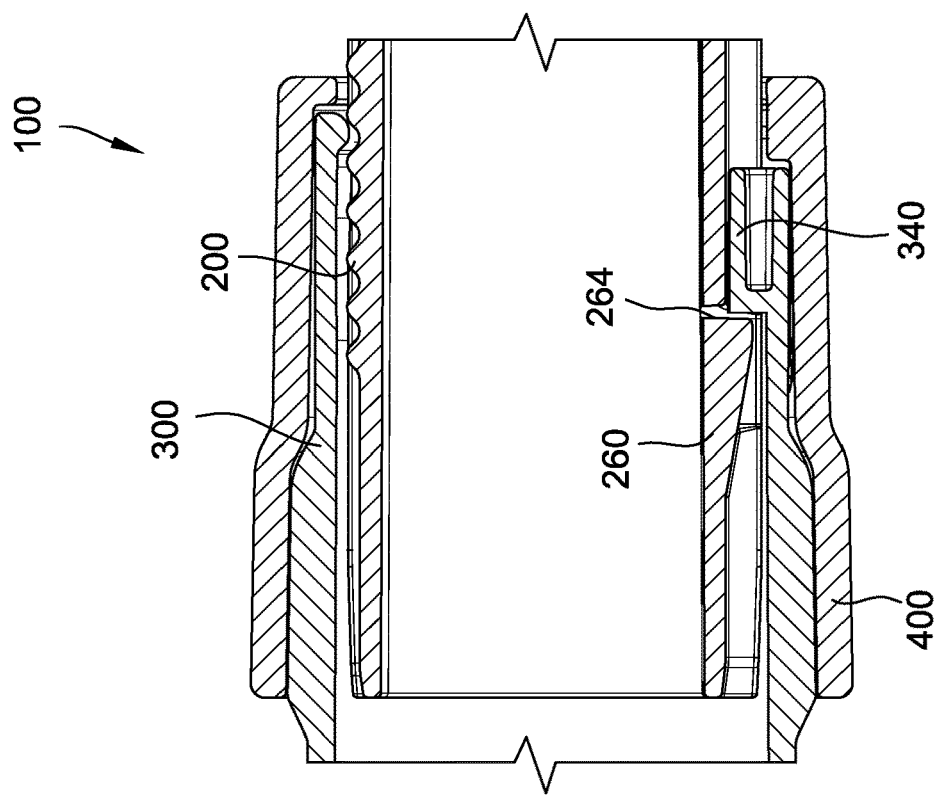
FIG. 29 is a partial side cross-sectional view of the first example wand assembly shown in FIGS. 3-4, shown in a fully extended configuration.

In the fully extended configuration, and with additional reference to FIG. 29, the axial surface 264 of the stopper 260 positioned within the alignment slot 230 of the first wand 200 engages with the alignment protrusion 340 of the second wand 300 to limit relative motion between the first and second wands 200, 300 to prevent them from being separated, thereby fixing a maximum length of the wand assembly 100. When a radially inward force is applied to the stopper 260, and with reference to FIG. 39, the stopper 260 is deflected into a configuration in which the outer surface 262 is substantially flush with the slot base 232, allowing the alignment protrusion 340 to slide past it for the wands to be separated.

A second example embodiment of a wand assembly 500 is shown in FIGS. 31-46. The second wand assembly 500 is similar to the first wand assembly 100, and the description of the first wand assembly 100 applies to the second wand assembly 500 except where indicated otherwise. Similar to the wand assembly 100 shown in FIGS. 3-4, the wand assembly 500 includes a first wand 600, a second wand 700, and a rotatable locking cuff 800 telescopically arranged about a longitudinal axis x. The second wand assembly 500 may be configured in a retracted configuration (FIG. 31) or an extended configuration (FIG. 32).

Figure 33:
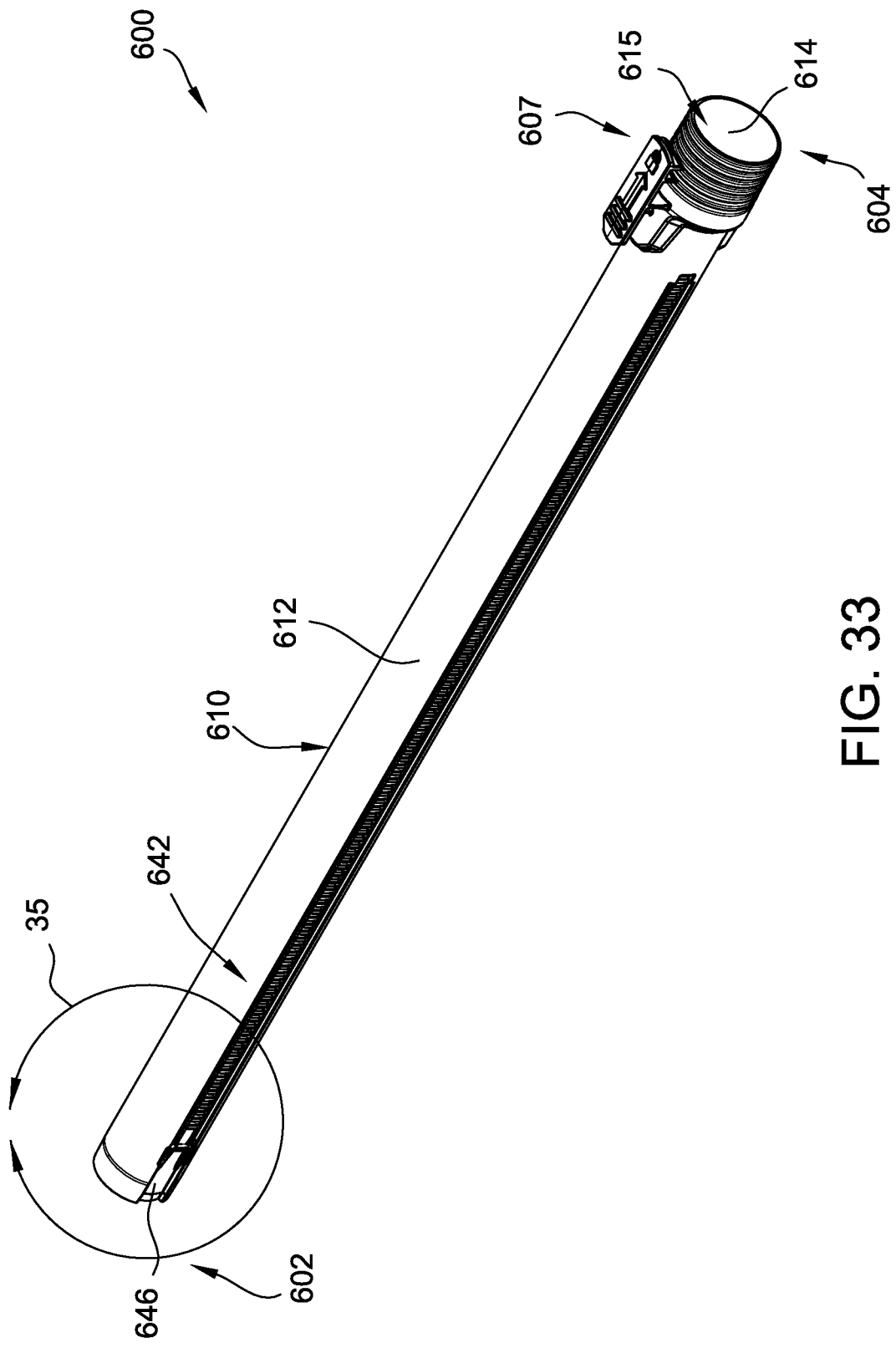
FIG. 33 is a perspective view of a first wand of the second example wand assembly shown in FIGS. 31 and 32.
Figure 34:
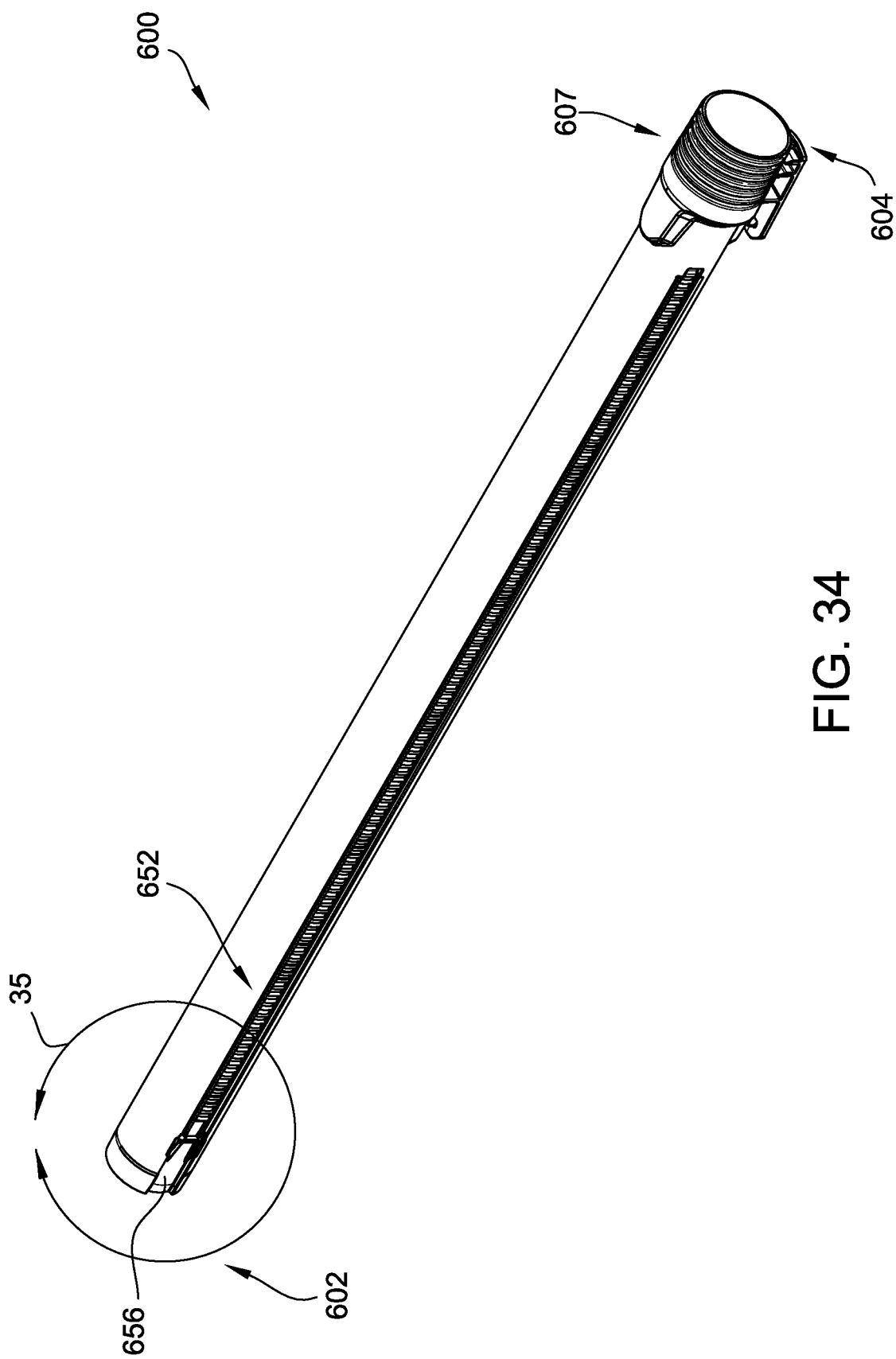
FIG. 34 is another perspective view of the first wand shown in FIG. 33.
Figure 35:
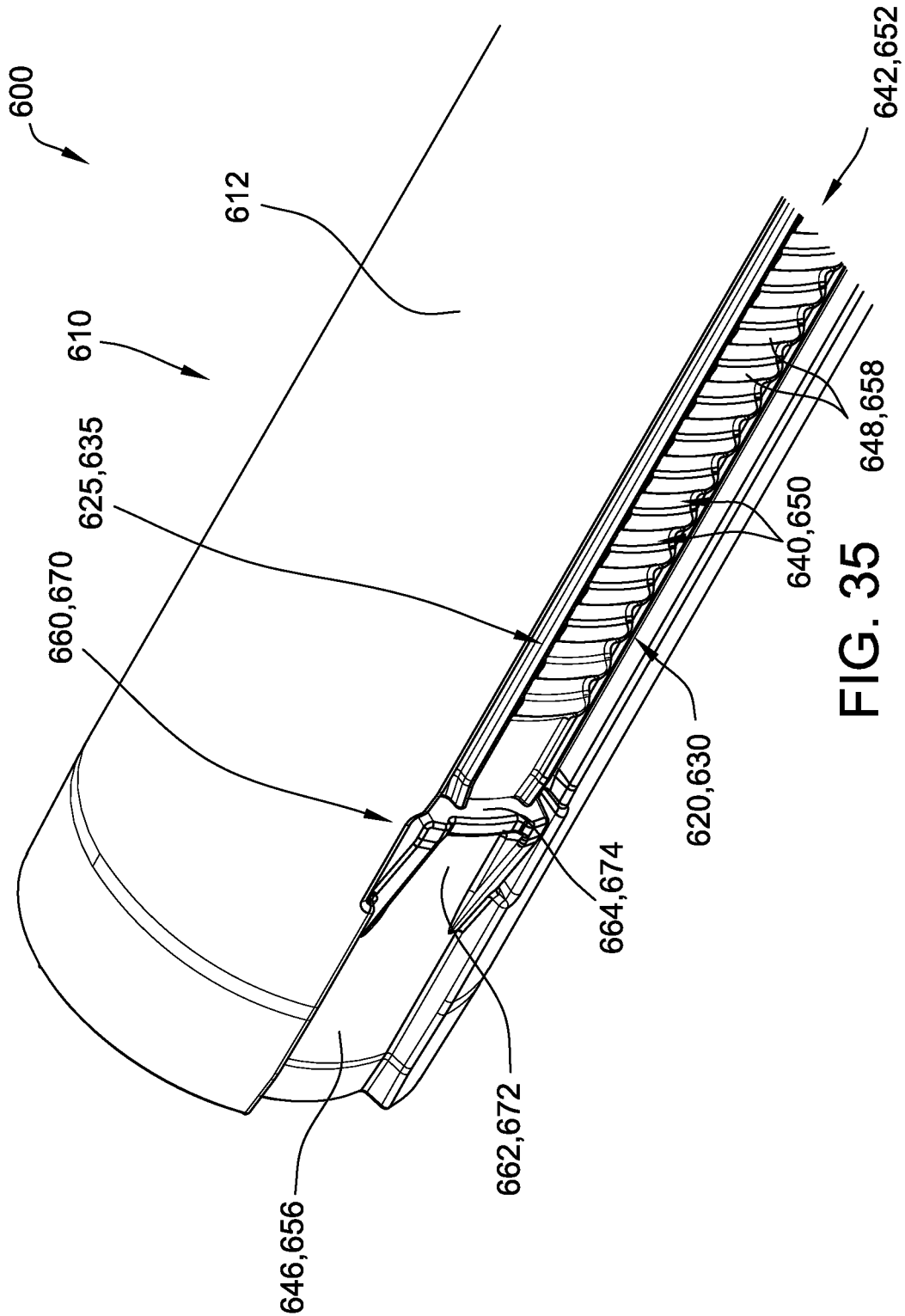
FIG. 35 is an enlarged perspective view of the first wand shown in FIGS. 33 and 34.

With reference to FIGS. 33-35, the first wand 600 extends from a first end 602 to a second end 604, and includes a first wand body 610 and an accessory attachment assembly 607. The first wand 600 has an outer surface 612 and an inner surface 614, with the inner surface 614 defining a first wand cavity 615 that forms part of the vacuum conduit 16. The first wand 600 further includes first and second groove surfaces 646, 656 extending in a longitudinal direction substantially parallel to the longitudinal axis x and positioned approximately 180 degrees from one another. In further embodiments, the first and second groove surfaces 646, 656 may be configured with any other suitable relative orientation. The groove surfaces 646, 656 are recessed from the outer surface 612 of the first wand body 610.

With reference to FIG. 35, the first wand 600 additionally includes a first plurality of grooves 640 arranged in a first row 642 along the first groove surface 646. A first plurality of bumps 648 protrude from the first groove surface 646 such that each adjacent pair of bumps 648 defines a groove 640 therebetween. The first groove surface 646 begins at the first end 602 of the first wand body 610 and terminates proximate the accessory attachment assembly 607. The first row 642 of grooves 640 terminates at the same location as the first groove surface 646 but begins at a different point along the first groove surface 646 such that a portion of the first groove surface 646 does not include any bumps. In further embodiments, the first groove surface 646 and first row 642 of grooves 640 may have any other suitable configuration.

The first wand body 610 additionally includes first and second alignment slots 620, 625 defined in the outer surface 612 that extend in the longitudinal direction. The first and second alignment slots 620, 625 are formed in the first groove surface 646 such that they are positioned circumferentially adjacent to the first row 642 of grooves 640 on either side thereof. The first and second alignment slots 620, 625 have a substantially similar construction to the alignment slot 230 of the first example wand assembly 100 described above, with a slot base and a pair of laterally opposed slot sidewalls (not labeled in FIG. 35). In further embodiments, the first and second alignment slots 620, 625 may have any other suitable construction. For example, the alignment slots 620, 625 may be defined by more or fewer base and sidewall surfaces, and/or may be defined by at least one continuous curved surface. In the illustrated embodiment, each alignment slot 620, 625 has a depth $d_s$ and a width $w_s$ (not labeled in FIG. 35).

The first and second alignment slots 620, 625 span substantially the same length as the first row 642 of grooves 640, beginning at the first end 602 of the first wand body 610 and terminating proximate the accessory attachment assembly 607. In further embodiments, the first and second alignment slots 620, 630 may have any other suitable configuration. For example, both alignment slots 620, 625 may extend along the entire length of the first wand body 610 or begin at a point other than the first end 602, or the first and second alignment slots 620, 625 may begin and terminate at different points along the length of the first wand body 610.

The first wand 600 additionally includes a second plurality of grooves 650 arranged in a second row 652 along the second groove surface 656. The first and second pluralities of grooves 640, 650 are substantially identical, and FIG. 35 is used to represent both. A second plurality of bumps 658 protrude from the second groove surface 656 such that each adjacent pair of bumps 658 defines a groove 650 therebetween. The second groove surface 656 begins at the first end 602 of the first wand body 610 and terminates proximate the accessory attachment assembly 607. The second row 652 of grooves 650 terminates at the same location as the second groove surface 656 but begins at a different point along the second groove surface 656 such that a portion of the second groove surface 656 does not include any bumps. In further embodiments, the second groove surface 656 and second row 652 of grooves 650 may have any other suitable configuration.

The first wand body 610 additionally includes third and fourth alignment slots 630, 635 defined in the outer surface 612 that extend in the longitudinal direction. The third and fourth alignment slots 630, 635 are formed in the second groove surface 656 such that they are positioned circumferentially adjacent to the second row 652 of grooves 650 on either side thereof. The third and fourth alignment slots 630, 635 have a substantially similar construction to the alignment slot 230 of the first example wand assembly 100 described above, with a slot base and a pair of laterally opposed slot sidewalls (not labeled in FIG. 35). In further embodiments, the third and fourth alignment slots 630, 635 may have any other suitable construction. For example, the alignment slots 630, 635 may be defined by more or fewer base and sidewall surfaces, and/or may be defined by at least one continuous curved surface. In the illustrated embodiment, each alignment slot 630, 635 has a depth $d_s$ and a width $w_s$ (not labeled in FIG. 35).

The third and fourth alignment slots 630, 635 span substantially the same length as the second row 652 of grooves 650, beginning at the first end 602 of the first wand body 610 and terminating proximate the accessory attachment assembly 607. In further embodiments, the third and fourth alignment slots 630, 635 may have any other suitable configuration. For example, both alignment slots 630, 635 may extend along the entire length of the first wand body 610 or begin at a point other than the first end 602, or the third and fourth alignment slots 630, 635 may begin and terminate at different points along the length of the first wand body 610. In the illustrated embodiment, the first and second rows 642, 652 of grooves 640, 650 have the same length, and all of the first second, third and fourth alignment slots 620, 625, 630, 635 have the same length. In further embodiments, the rows 642, 652 of grooves 640, 650 may have different lengths, and at least one of the alignment slots 620, 625, 630, 635 may have a different length than the others.

The first wand 600 further includes first and second stoppers 660, 670 positioned proximate the first end 602 and axially aligned with the respective first and second rows 642, 652 of grooves 640, 650. Like the stopper 260 of the first example wand assembly 100, each stopper 660, 670 extends from a first end connected to the respective first or second groove surface 646, 656 to a second, free end. Each of the first and second stoppers 660, 670 spans the width of the respective first or second groove surface 646, 656 such that it is also axially aligned with and positioned within the respective first and second alignment slots 620, 625 or third and fourth alignment slots 630, 635. Each stopper 660, 670 includes an outer surface 662, 672 extending between the first and second ends thereof, and an axial surface 664, 674 that defines the second end thereof. The outer surface 662, 672 is angled obliquely relative to the respective groove surface 646, 656 such that the stopper 670, 670 protrudes radially outward to create an obstruction in both of the first and second or third and fourth alignment slots 620, 625, 630, 635.

Like the stopper 260 of the first example wand assembly, the first and second stoppers 660, 670 have a suitably resilient construction such that the stoppers 660, 670 are capable of deflecting radially inward and/or outward in the presence of an applied force, and returning to an initial, undeflected position without undergoing permanent deformation when the force is removed. In the illustrated embodiment, for example, the stoppers 660, 670 are constructed from a resilient plastic and are connected or secured to the respective groove surface 646, 656 at only one end (i.e., at the first end of the stopper 660, 670) such that the other end of the stopper 660, 670 (i.e. the second end) is free to move or deflect radially inward and/or outward. For example, a force applied to the stopper 660, 670 in a radially inward direction may deflect the outer surface 662, 672 into a configuration in which it is substantially flush with the slot bases of the respective alignment slots 620, 625, 630, 635.

The first wand body 610 may have a substantially circular cross section, with the first and second groove surfaces 646, 656 protruding radially inward into the first wand cavity 615. The first wand body's 610 cross-section is substantially constant in shape and size between the first and second ends 602, 604 of the first wand 600. In other embodiments, the cross-section may vary in shape or size, for example but without limitation, by tapering in diameter such that the cross-sectional area of the cavity 615 increases or decreases.

The accessory attachment assembly 607 is substantially similar to the accessory attachment assembly 220 of the first example wand assembly 100 and will not be described further herein.

Figure 36:
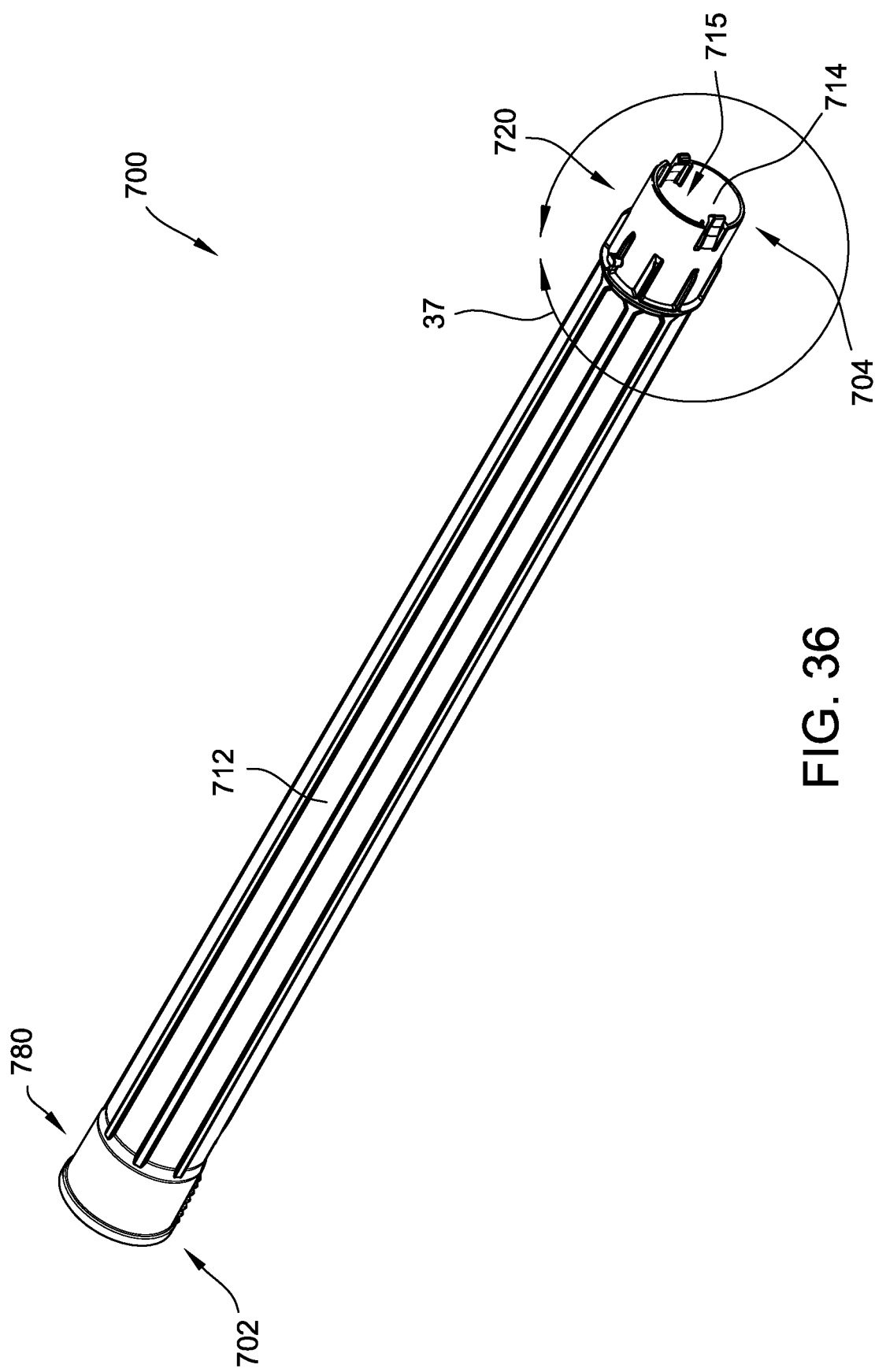
FIG. 36 is a perspective view of a second wand of the second example wand assembly shown in FIGS. 31 and 32.
Figure 37:
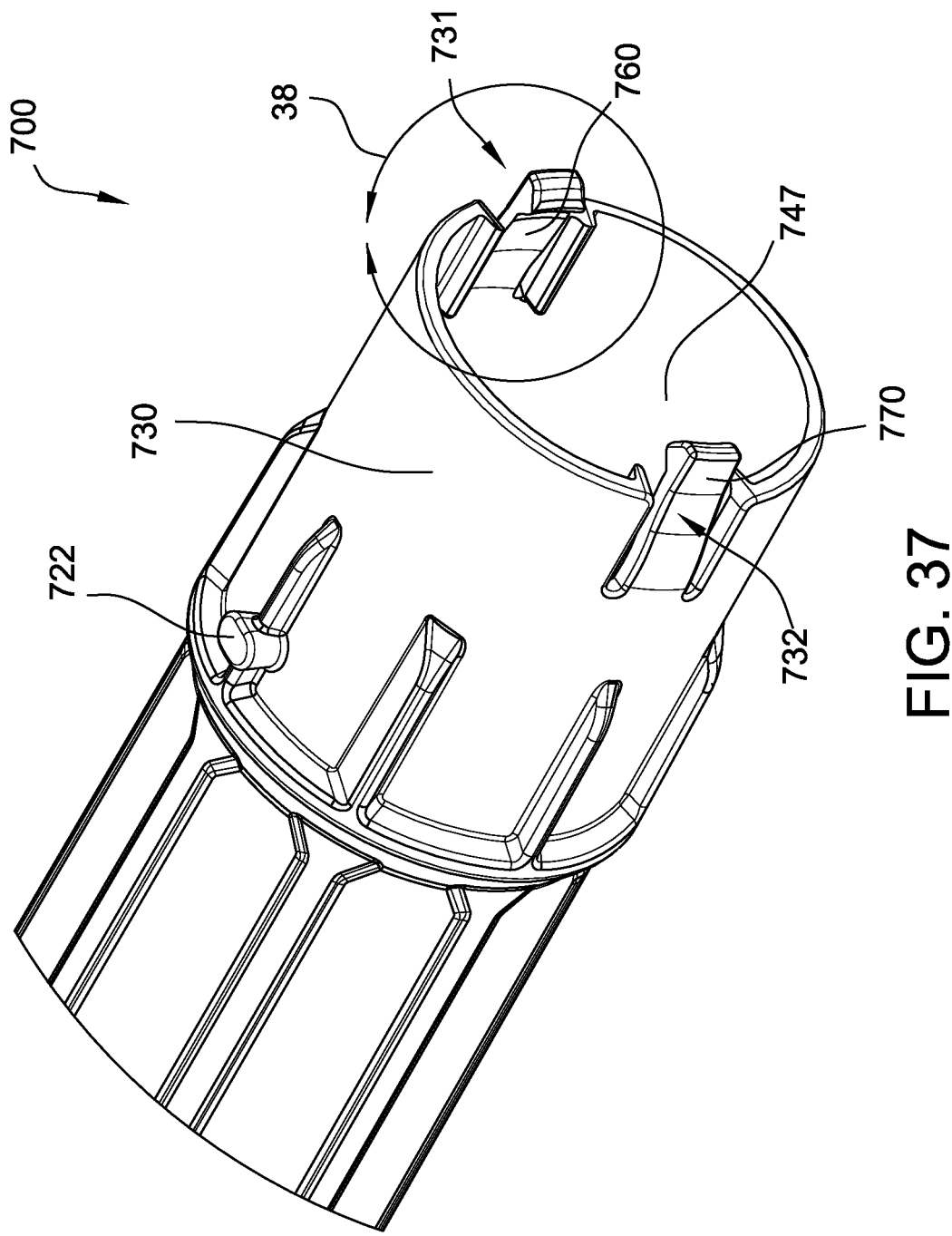
FIG. 37 is an enlarged perspective view of the second wand shown in FIG. 36, illustrating a locking assembly.

With reference to FIGS. 36-37, the second wand 700 extends from a first end 702 to a second end 704. The second wand 700 has an outer surface 712 and an inner surface 714, with the inner surface 714 defining a second wand cavity 715, at least a portion of which forms part of the vacuum conduit 16 when the wand assembly 500 is used in the extended configuration shown in FIG. 32. The outer surface 712 may include ergonomic features substantially similar to those described with respect to the second wand 300 of the first example wand assembly 100.

The second wand 700 includes a hose attachment assembly 780 positioned at the first end 702 and a locking assembly 720 positioned at a second end. The hose attachment assembly 780 is substantially similar to the hose attachment assembly 380 of the first example wand assembly described above with reference to FIG. 37, the locking assembly 720 includes a locking base 730 and first and second locking mechanisms 731, 732 spaced approximately 180 degrees from one another. In other embodiments, the first and second locking mechanisms 731, 732 may have any other suitable orientation. The first locking mechanism 731 includes a first locking tab 760 and first and second alignment protrusions 740, 745 circumferentially adjacent thereto. The second locking mechanism 732 includes a second locking tab 770 and third and fourth alignment protrusions 750, 755 circumferentially adjacent thereto.

Figure 38:
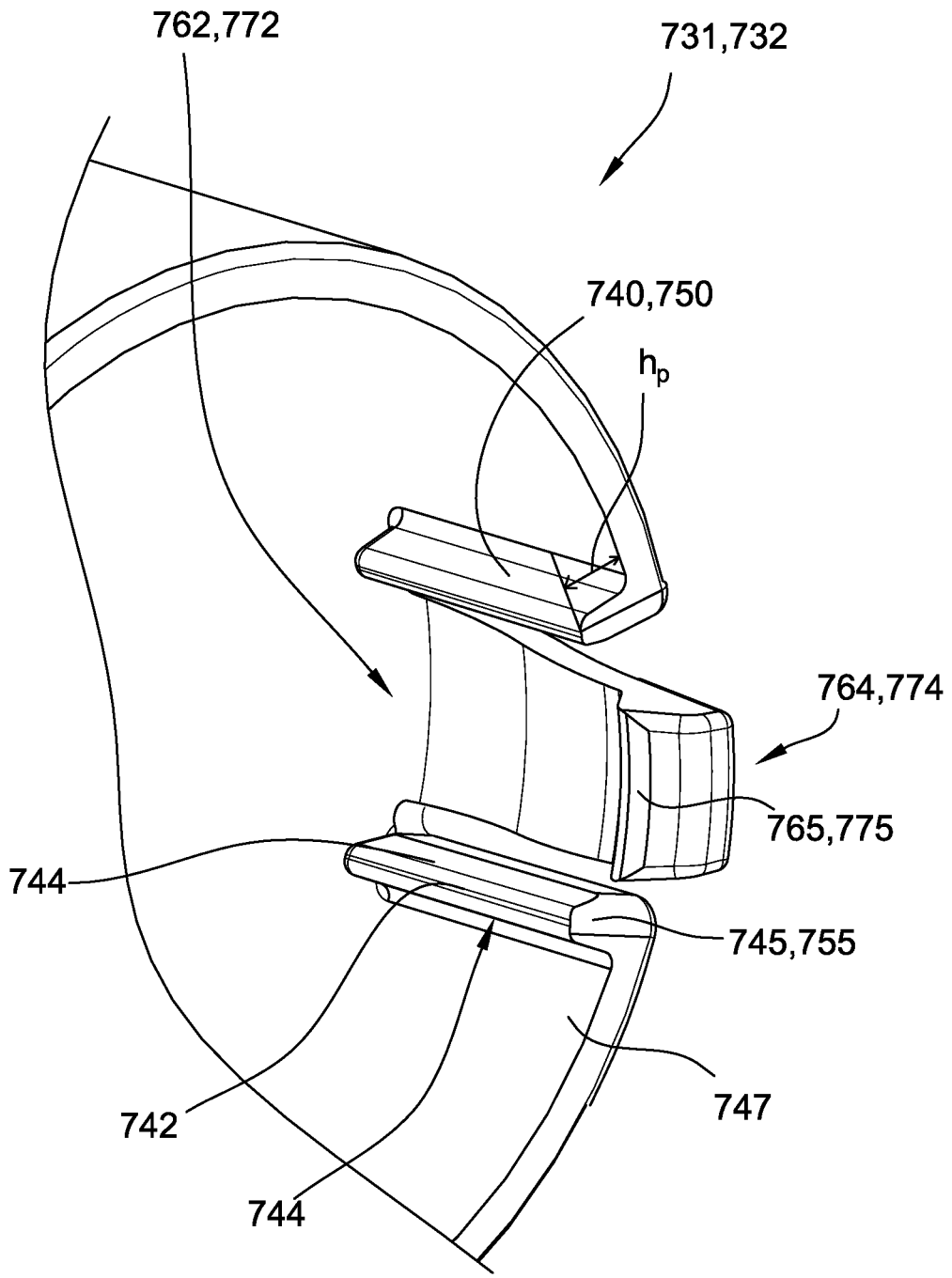
FIG. 38 is an enlarged view of the locking assembly shown in FIG. 37.

The first and second locking mechanisms 731, 732 are substantially identical, and will both be described with respect to the locking mechanism 731, 732 shown in FIG. 38. Each locking tab 760, 770 extends from a first end 762, 772 connected to the locking base 730 to a second, free end 764, 774 which extends beyond the second end 704 of the second wand 700. In further embodiments, the second end 704 of the second wand 700 may extend beyond the second end 764, 774 of the locking tab 760, 770, or the second wand 700 and the locking tab 760, 770 may terminate at the same axial length. Each locking tab 760, 770 further includes a respective first or second locking tooth 765, 775 protruding radially inward from a radial inner surface of the locking tab 760, 770. The first and second locking teeth 765, 775 are integrally formed with the second wand 700 and each have a shape substantially similar to a shape of one of the plurality of grooves 640, 650 of the first wand 600.

Each locking tab 760, 770 has a suitably resilient construction such that the locking tab 760, 770 is capable of deflecting radially inward and/or outward in the presence of an applied force, and returning to an initial, undeflected position without undergoing permanent deformation when the force is removed. In the illustrated embodiment, for example, the locking tab 760, 770 is constructed from a resilient plastic and is connected or secured to the locking base 730 at only one end (i.e., at the first end 762, 772 of the locking tab 760, 770) such that the other end of the locking tab (i.e. the second end 764, 774) is free to move or deflect radially inward and/or outward. For example, a force applied to the first or second locking tab 760, 770 in the radially inward direction may deflect the respective first or second locking tooth 765, 775 into engagement with one of the respective first or second plurality of grooves 640, 650.

The alignment protrusions 740, 745, 750, 755 are positioned circumferentially adjacent to each respective locking tab 760, 770 on either side thereof. Each alignment protrusion 740, 745, 750, 755 extends radially inward from a radial inner surface 747 of the locking base 730, and is defined in part by a radial inner surface 742 and a pair of laterally opposed protrusion sidewalls 744 oriented substantially perpendicular to the radial inner surface 742 (labeled only for second/fourth alignment protrusion 745, 755). In further embodiments, the alignment protrusions 740, 745, 750, 755 may have any other suitable construction. For example, the alignment protrusions may be defined by more or fewer inner and sidewall surfaces, and/or may be defined by at least one continuous curved surface. In further embodiments, at least one of the alignment protrusions 740, 745, 750, 755 may be constructed differently than the others.

The alignment protrusion has a height $h_p$ and a width $w_p$ (not labeled in FIG. 38). The height $h_p$ may be greater than, less than, or substantially the same as the depth $d_s$ of the alignment slots 620, 625, 630, 635 of the first wand 600. The width $w_p$ may be less than or substantially the same as the width $w_p$ of the alignment slot 230. Each alignment protrusion 740, 745, 750, 755 is shaped, sized, and positioned to be received within a respective alignment slot 620, 625, 630, 635 defined in the first wand 600 when the first and second wands 600, 700 are telescopically arranged as shown in FIGS. 31 and 32.

The locking assembly 720 further includes a first lock indicator 722 and a second lock indicator (not shown). The lock indicators are substantially similar to the lock indicators 322, 324 of the first example wand assembly 100 described above.

Figure 39:
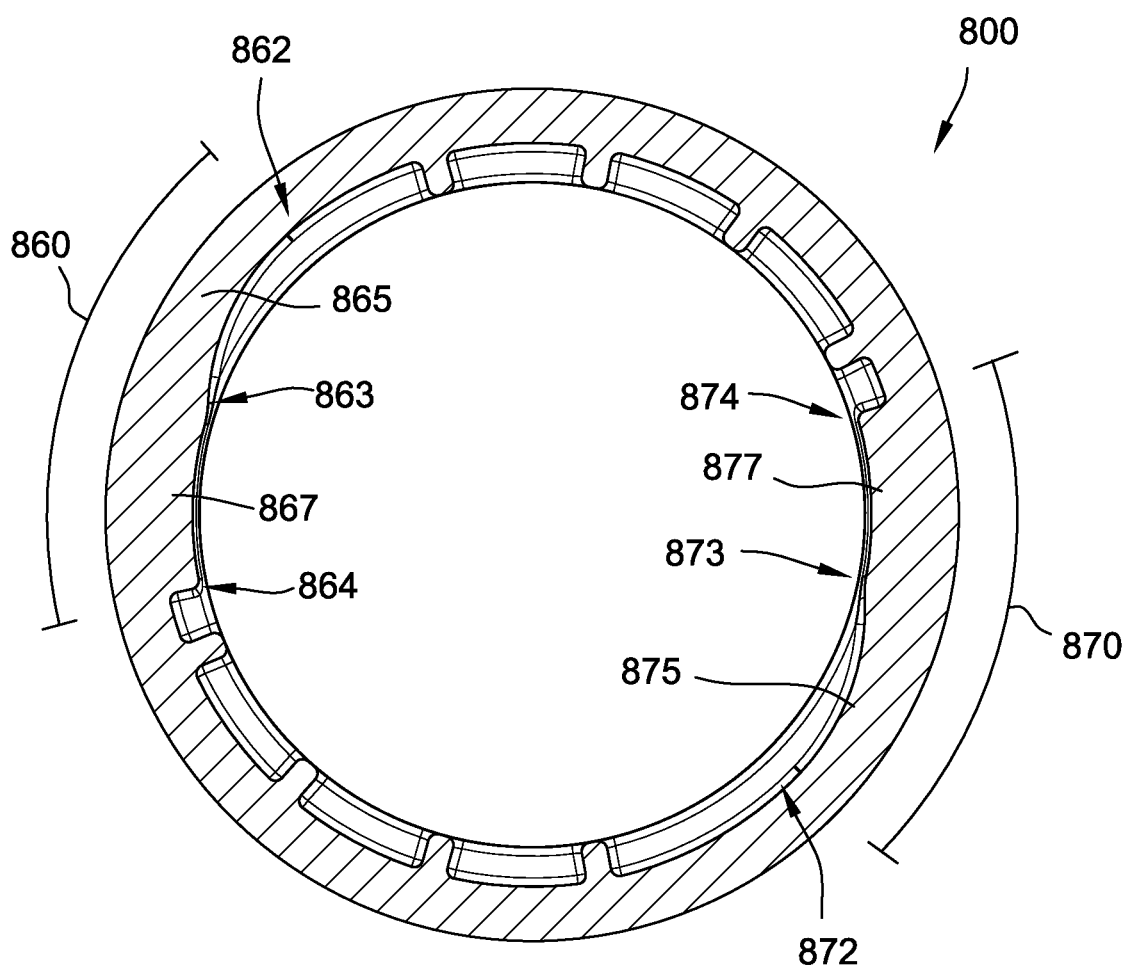
FIG. 39 is a front cross-sectional view of a locking cuff of the second example wand assembly shown in FIGS. 31 and 32.
Figure 40:
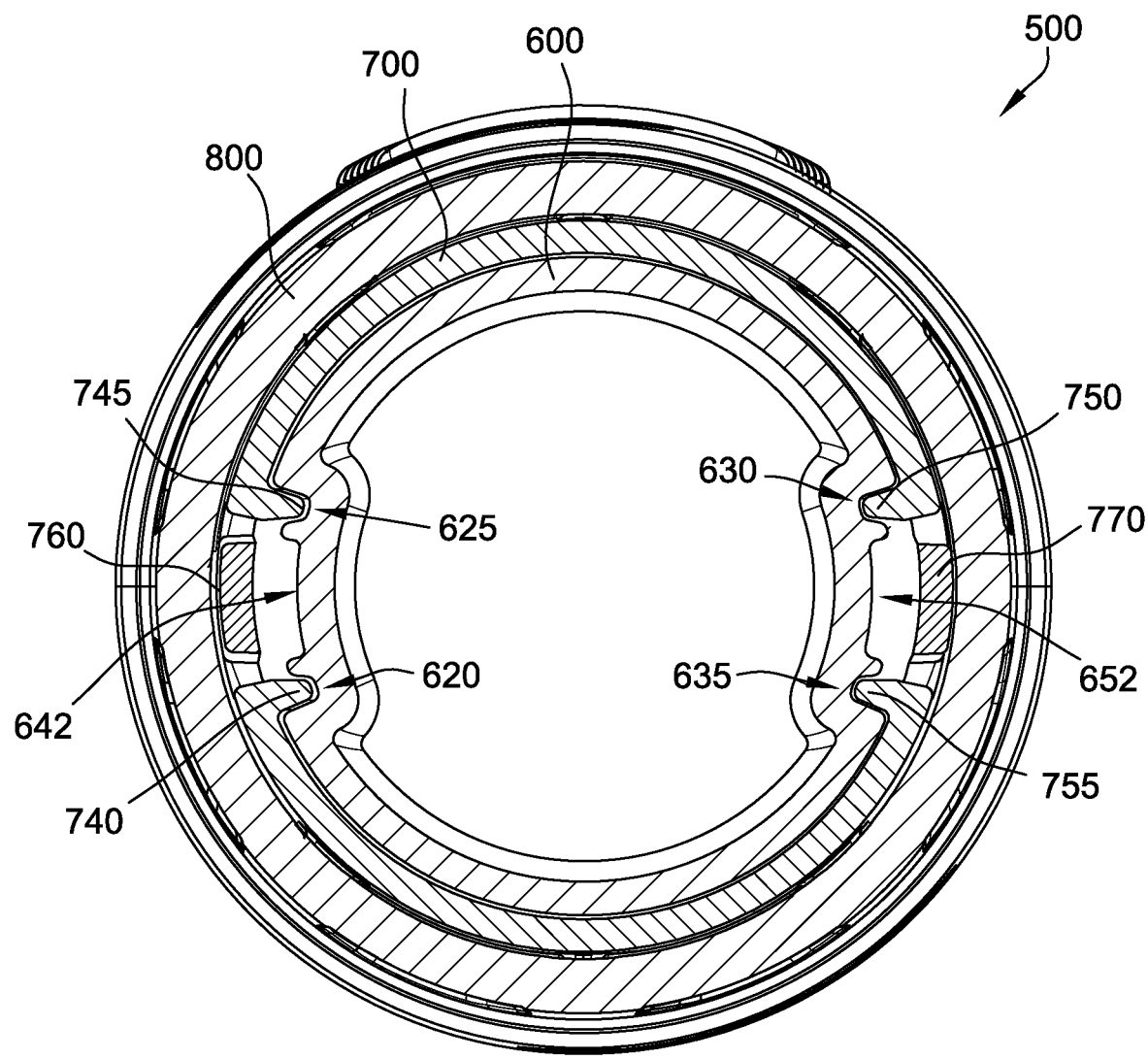
FIG. 40 is a front cross-sectional view of the second example wand assembly shown in FIGS. 31 and 32.

With reference to FIG. 39, the locking cuff 800 is substantially similar in construction to the locking cuff 400 of the first example wand assembly 100 described above. The locking cuff 800 of the second example wand assembly 500 includes first and second locking ramps 860, 870 spaced equally around a circumference of the locking cuff 800. Each locking ramp 860, 870 is constructed substantially similarly to the locking ramp 460 of the first example wand assembly 100. Each locking ramp 860, 870 tapers in height radially between a first end 862, 872 and a midpoint 863, 873 to form a tapering portion 865, 875, and forms a plateau 867, 877 of constant or substantially constant height between the midpoint 863, 873 and a second end 864, 874.

Figure 31:
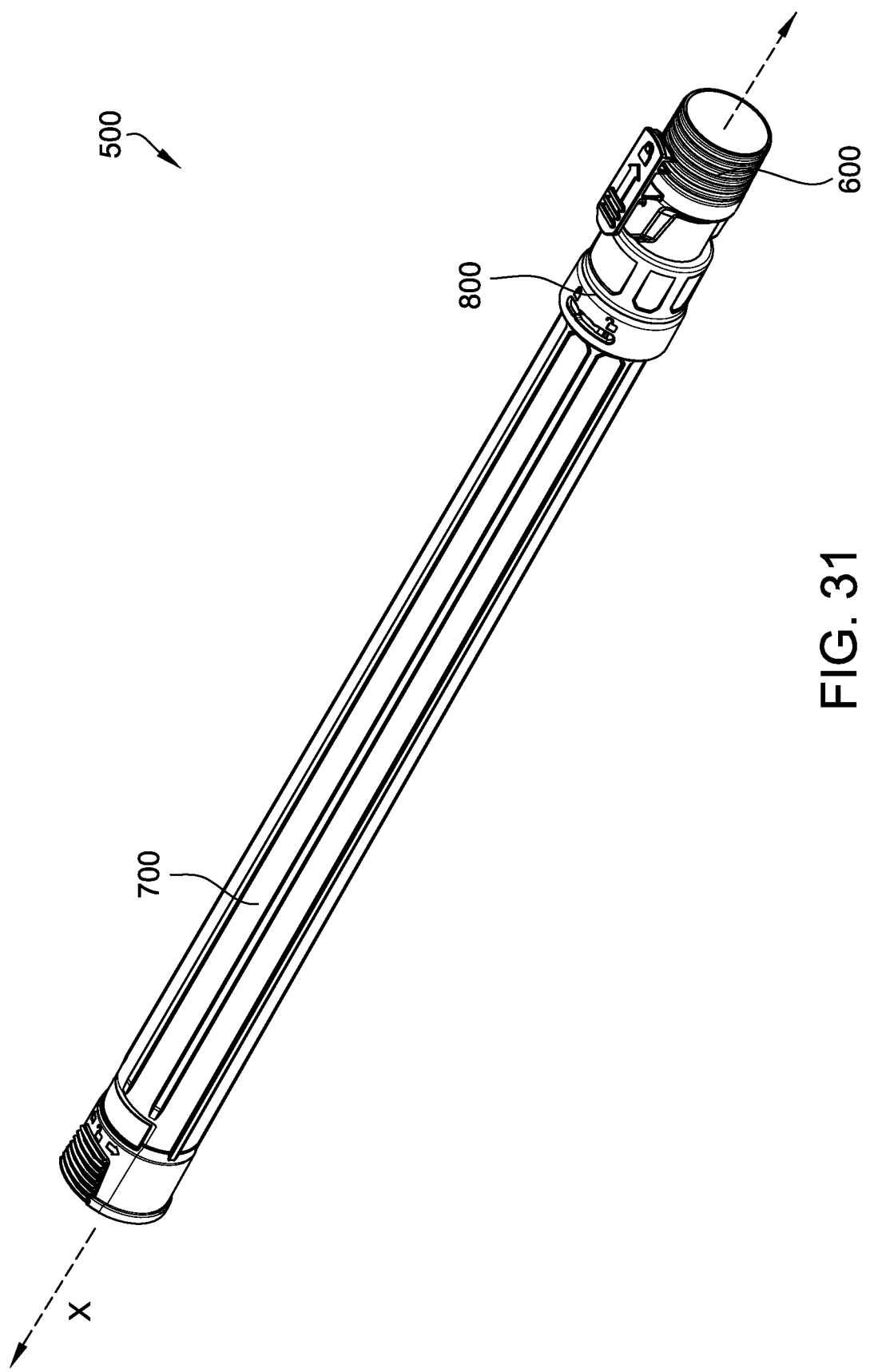
FIG. 31 is a perspective view of a second example embodiment of a wand assembly, shown in a retracted configuration.
Figure 32:
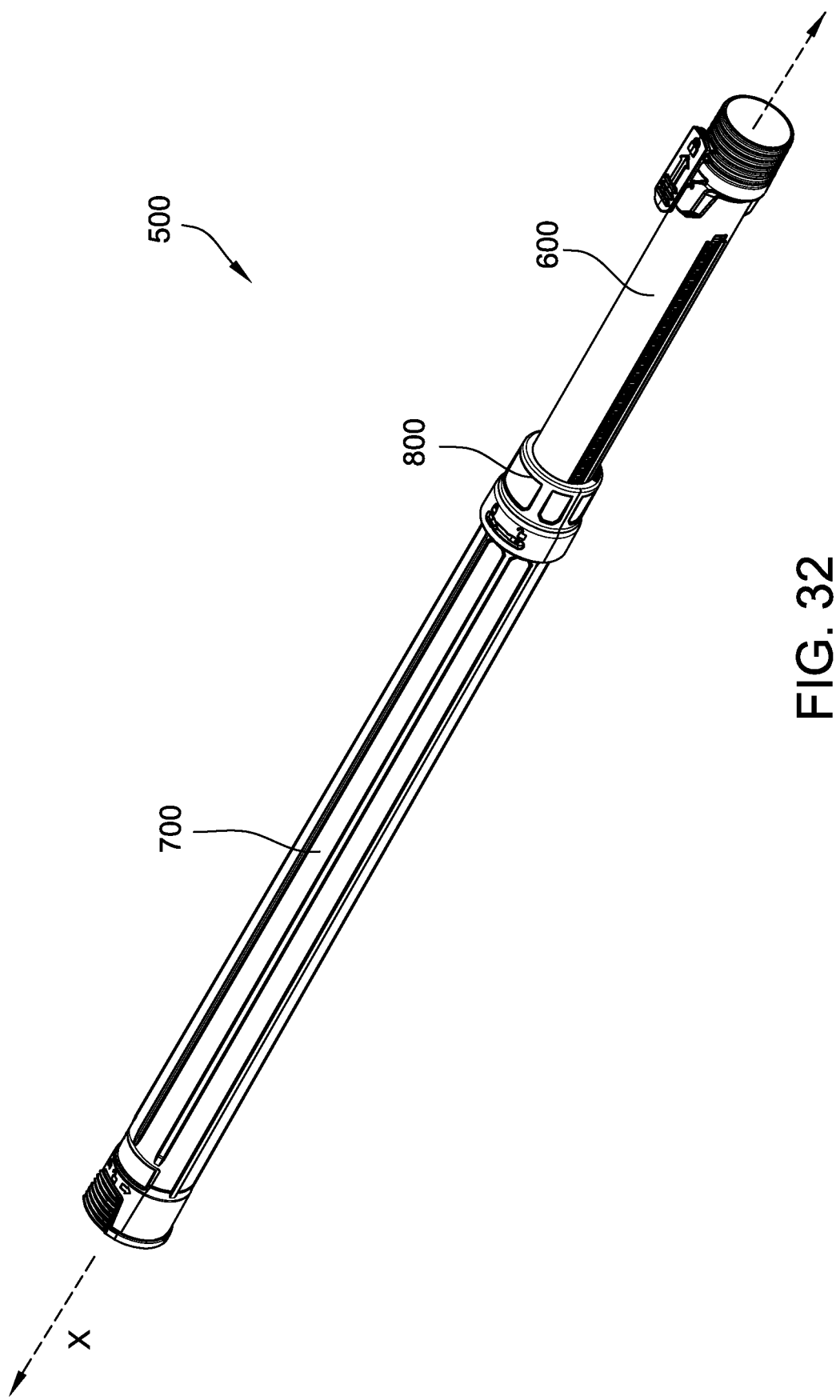
FIG. 32 is another perspective view of the second example wand assembly shown in FIG. 31, shown in an extended configuration.

When the second example wand assembly 500 is assembled as shown in FIGS. 31 and 32, the first and second alignment protrusions 740, 745 are received within the respective first and second alignment slots 620, 625, and the third and fourth alignment protrusions 750, 755 are received within the respective third and fourth alignment slots 630, 635, such that the first and second wands 600, 700 are slidable relative to one another in the longitudinal direction to adjust a total length of the wand assembly 500.

Furthermore, when the widths $w_p$, $w_s$ of the alignment protrusions 740, 745, 750, 755 and the alignment slot 620, 625, 630, 635 are substantially the same, a relative rotational position of the first and second wands 600, 700 is fixed. That is, relative rotation between the first and second wands 600, 700 is limited or prevented. In other embodiments, the first and second wands 200, 300 may rotate relative to one another. With additional reference to FIG. 40, when the alignment protrusions 740, 745, 750, 755 are received within the alignment slot 620, 625, 630, 635, the first and second locking tabs 760, 770 are circumferentially aligned with respective first or second row 642, 652 of grooves 640, 650 such that the respective first or second locking tooth 765, 775 is selectively engageable with any of the plurality of grooves 640, 650.

Figure 42:
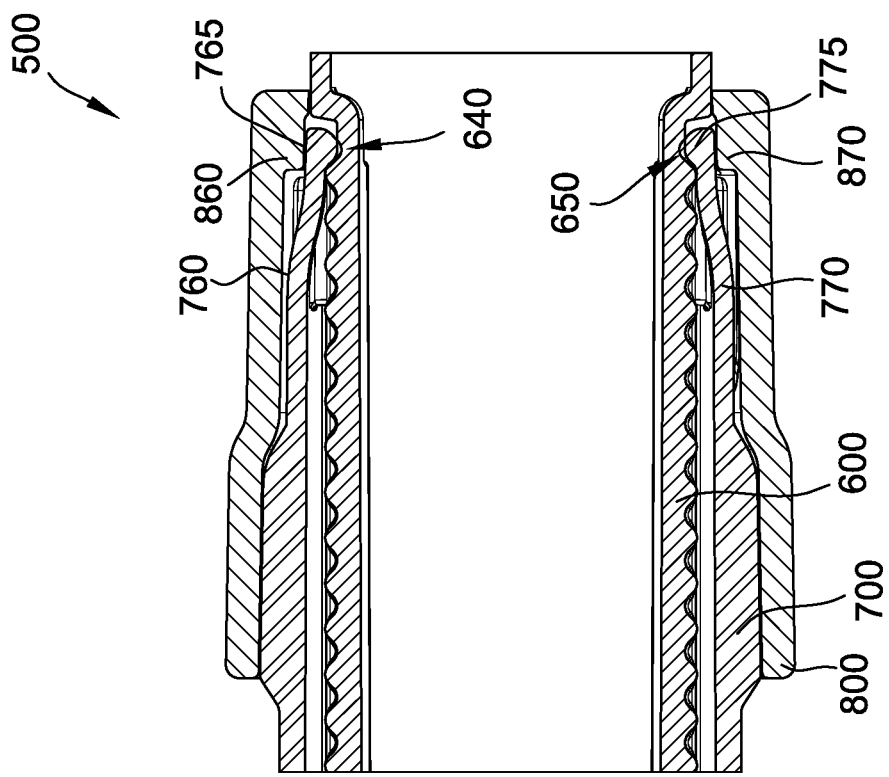
FIG. 42 is a partial side cross-sectional view of the second example wand assembly shown in FIGS. 31 and 32, shown in a locked configuration.
Figure 41:
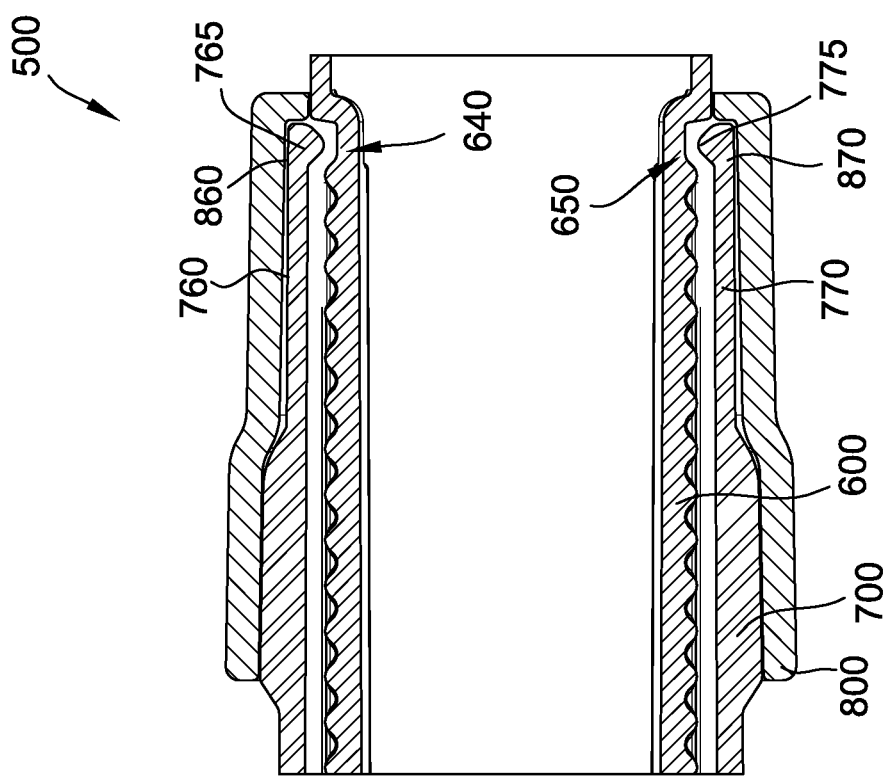
FIG. 41 is a partial side cross-sectional view of the second example wand assembly shown in FIGS. 31 and 32, shown in an unlocked configuration.
Figure 46:
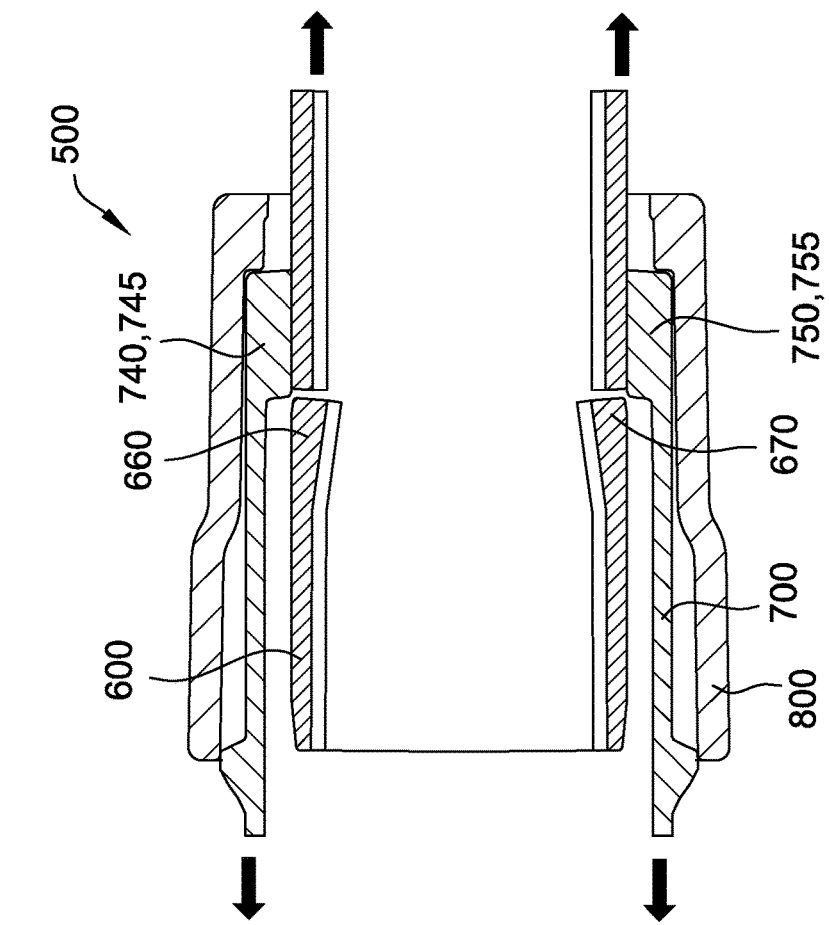
FIG. 46 is another partial side cross-sectional view of the second example wand assembly shown in FIGS. 31 and 32, shown in the fully extended configuration.

The wand assembly 500 is selectively configurable in an unlocked configuration (FIGS. 41 and 43) and a locked configuration (FIGS. 42 and 44). In the unlocked configuration, the locking cuff 800 is configured in an unlocked position (FIG. 43), in which the first and second locking ramps 860, 870 do not contact any part of the first and second locking tabs 760, 770. The locking tabs 760, 770 remain undeflected such that the first and second locking teeth 765, 775 do not contact the respective first and second rows 642, 652 of grooves 640, 650 of the first wand 600, leaving the first and second wands 600, 700 free to move relative to one another in the longitudinal direction.

The wand assembly 500 may be repositioned into the locked configuration (FIG. 44) by rotating the locking cuff 800 relative to the first and second wands 600, 700 in a locking direction $\theta_L$. Rotation of the locking cuff 800 relative to the first and second wands 600, 700 causes the first locking ramp 860 to deflect the first locking tab 760 radially inward, pushing the first locking tooth 765 into engagement with one of the first plurality of grooves 640, and causes the second locking ramp 870 to deflect the second locking tab 770 radially inward, pushing the second locking tooth 775 into engagement with one of the second plurality of grooves 650. The engagement of the respective locking teeth 765, 775 and grooves 640, 650 prevents relative movement between the first and second wands 600, 700 in the longitudinal direction, thereby fixing the total length of the wand assembly 500. Rotation of the locking cuff 800 in an unlocking direction $\theta_U$ opposite the locking direction $\theta_L$ releases contact between the first locking ramp 860 and the first locking tab 760, allowing the first locking tab 760 to return to its undeflected state and the first locking tooth 765 to disengage from the one of the first plurality of grooves 640, and further allowing the second locking tab 770 to return to its undeflected state and the second locking tooth 775 to disengage from the one of the second plurality of grooves 650. The first and second wands 600, 700 are then free to move relative to one another in the longitudinal direction.

In the unlocked configuration, the wand assembly 500 is movable between the retracted configuration (FIG. 31) and a fully or partially extended configuration (FIG. 32). In the retracted configuration, the second example wand assembly 500 is configured in the same manner as the first example wand assembly 100 shown in FIG. 27-28, with the stopper bumps and end of each row of grooves preventing movement of the locking cuff and the second wand past the stopper bumps to fix a minimum length of the wand assembly.

Figure 45:
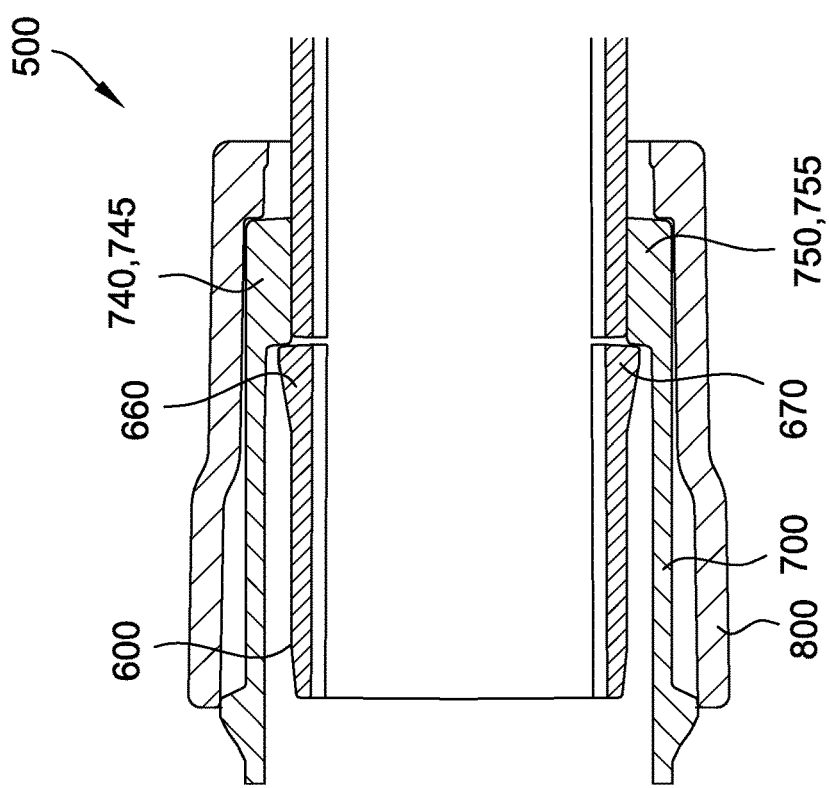
FIG. 45 is a partial side cross-sectional view of the second example wand assembly shown in FIGS. 31 and 32, shown in a fully extended configuration.

In the fully extended configuration, and with additional reference to FIG. 45, the axial surface 664 of the first stopper 660 of the first wand 600 engages with the first and second alignment protrusions 740, 745 of the second wand 700 and the axial surface 674 of the second stopper 670 of the first wand 600 engages with the third and fourth alignment protrusions 750, 755 of the second wand 700 to limit relative motion between the first and second wands 600, 700 to prevent them from being separated, thereby fixing a maximum length of the wand assembly. When a radially inward force is applied to both of the stoppers 660, 670, and with reference to FIG. 46, the stoppers 660, 670 are deflected into a configuration in which the outer surface 662, 672 is substantially flush with the respective groove surface 646, 656, allowing the alignment protrusions 740, 745, 750, 755 to slide past the stoppers 660, 670 for the wands 600, 700 to be separated.

The first and second example wand assemblies 100, 500 may both be used with a method of assembling a wand assembly for a vacuum cleaner. The method will be described with reference to the first example wand assembly 100 but may be used with the second example wand assembly 500 or a different wand assembly. The method includes positioning the first wand 200 telescopically within the second wand 300, translating the first wand 200 relative to the second wand 300 in a longitudinal direction, and rotating the locking cuff 400 relative to the first and second wands 200, 300 such that the locking ramp 460 deflects the locking tooth 370 into engagement with one of the grooves 240 of the first wand 200 to fix a length of the wand assembly 100.

In embodiments in which the second wand 200 includes an alignment protrusion 340 extending radially inward from an inner surface 334 thereof, and in which the first wand 200 includes an alignment slot 230 defined in the outer surface 212 thereof and extending in a longitudinal direction, the step of translating the first wand 200 relative to the second wand 300 suitably includes positioning the alignment protrusion 340 within the alignment slot 230 such that a relative rotational position of the first and second wands 200, 300 is fixed.

In embodiments in which the first wand 200 includes a stopper 260 positioned within the alignment slot 230 the step of translating the first wand 200 relative to the second wand 300 may also include engaging the stopper 260 with the alignment protrusion 340 to fix a maximum length of the wand assembly 100.

In embodiments in which the second wand 300 further includes a lock indicator 322, 324 protruding from an outer surface 312 thereof, in which the locking cuff 400 defines a lock indicator opening 424, 434 extending from a first end 436 to a second end 438 and shaped and sized to receive the lock indicator 322, 324 therein, the step of rotating the locking cuff 400 relative to the first and second wands 200, 300 causes the lock indicator 322, 324 to translate or move between the first and second ends 436, 438 of the lock indicator opening 424, 434.

Embodiments of the telescoping wand assemblies described provide several advantages over prior designs. For example, the telescoping wand assembly design allows the wand to be adjusted in length without additional tools or accessories, accommodating different users or different types of cleaning tasks. The three-component, retractable design also allows for ease of assembly, use, and storage. The locking tab (s) are integrally formed with the outer wand, reducing the complexity and cost of manufacturing and assembly. The stopper (s) prevent the wand assembly from being unintentionally disassembled during use, but are flexible to allow the first and second wands to be separated for cleaning or replacement. The alignment slot (s) and protrusion (s) prevent relative rotation of the first and second wands during use, improving the wand assembly's usability.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment (s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A wand assembly for a vacuum cleaner comprising:
    a first wand comprising a first plurality of grooves arranged in a first row and a second plurality of grooves arranged in a second row, the first and second rows extending in a longitudinal direction;
    a second wand telescopically arranged with the first wand, the second wand comprising a first locking tab comprising a first locking tooth engageable with the first plurality of grooves and a second locking tab comprising a second locking tooth engageable with the second plurality of grooves, the first and second locking tabs and the first and second locking teeth being integrally formed with the second wand, wherein each of the first locking tab and the second locking tab is deflectable radially inward from an initial, undeflected position to deflect the respective first or second locking tooth into engagement with one of the grooves, each of the first and second locking tabs having a resilient construction such that each of the first locking tab and the second locking tab returns to its respective initial, undeflected position in the absence of an applied force; and
    a rotatable locking cuff comprising first and second locking ramps,
    wherein rotation of the locking cuff in a first direction relative to the first and second wands causes the first locking ramp to deflect the first locking tooth radially inward from the initial, undeflected position into engagement with a groove of the first plurality of grooves, and causes the second locking ramp to deflect the second locking tooth radially inward from the initial, undeflected position into engagement with a groove of the second plurality of grooves to fix a length of the wand assembly,
    wherein rotation of the locking cuff in a second direction opposite the first direction releases contact between the first and second locking ramps and the first and second locking tabs and allows the first and second locking tabs to return to their respective initial, undeflected positions and the first and second locking teeth to disengage from the grooves.

2. The wand assembly of claim 1, wherein the first wand comprises an alignment slot defined in an outer surface thereof and extending in the longitudinal direction, wherein the second wand comprises an alignment protrusion extending radially inward from an inner surface thereof, and wherein the alignment slot is sized and shaped to receive the alignment protrusion therein to fix a relative rotational position of the first and second wands.

3. The wand assembly of claim 2, wherein the first wand further comprises a stopper positioned within the alignment slot, and wherein relative movement between the first and second wands in the longitudinal direction causes the stopper to engage with the alignment protrusion of the second wand to fix a maximum length of the wand assembly.

4. The wand assembly of claim 2,
wherein the second wand further comprises first and second alignment protrusions positioned circumferentially adjacent to the first locking tooth and extending radially inward from an inner surface of the second wand,
wherein the first wand further comprises first and second alignment slots defined in an outer surface thereof and positioned circumferentially adjacent to the first row of grooves, and
wherein the first and second alignment slots are shaped, sized, and positioned to receive the respective first and second alignment protrusions therein to fix a relative rotational position of the first and second wands.

5. The wand assembly of claim 4,
wherein the second wand further comprises third and fourth alignment protrusions positioned circumferentially adjacent to the second locking tooth and extending radially inward from the inner surface of the second wand,
wherein the first wand further comprises third and fourth alignment slots defined in the outer surface thereof and positioned circumferentially adjacent to the first row of grooves, and
wherein the third and fourth alignment slots are shaped, sized, and positioned to receive the respective third and fourth alignment protrusions therein to fix the relative rotational position of the first and second wands.

6. The wand assembly of claim 5, wherein the first wand further comprises a first stopper axially aligned with the first row of grooves at an end thereof and a second stopper axially aligned with the second row of grooves at an end thereof, wherein the first stopper engages with the first and second alignment protrusions and the second stopper engages with the third and fourth alignment protrusions to limit relative motion between the first and second wands in the longitudinal direction and fix a maximum length of the wand assembly.

7. The wand assembly of claim 1, wherein each of the first and second locking ramps protrudes radially inward from an inner surface of the locking cuff and tapers in height radially from a first end to a second end thereof.

8. The wand assembly of claim 1, wherein the second wand further comprises a lock indicator protruding from an outer surface thereof, wherein the locking cuff defines a lock indicator opening extending from a first end to a second end and shaped and sized to receive the lock indicator therein, and wherein rotation of the locking cuff relative to the second wand causes the lock indicator to translate between the first and second ends of the lock indicator opening.

9. The wand assembly of claim 8, wherein the locking cuff further defines a recessed portion extending from the first end of the lock indicator opening to a longitudinal end of the locking cuff, the recessed portion shaped and sized to receive the lock indicator therein to allow the lock indicator to be inserted into the lock indicator opening to connect the locking cuff to the second wand.

10. A wand assembly for a vacuum cleaner comprising:
a first wand comprising a plurality of grooves;
a second wand telescopically arranged with the first wand, the second wand comprising a locking tab comprising a locking tooth engageable with the plurality of grooves, the locking tab and locking tooth being integrally formed with the second wand, wherein the locking tab is deflectable radially inward from an initial, undeflected position to deflect the locking tooth into engagement with one of the grooves, the locking tab having a resilient construction such that the locking tab returns to the initial, undeflected position in the absence of an applied force; and
a rotatable locking cuff comprising a locking ramp,
wherein rotation of the locking cuff in a first direction relative to the first and second wands causes the locking ramp to deflect the locking tooth radially inward from the initial, undeflected position into engagement with one of the grooves to fix a length of the wand assembly,
wherein rotation of the locking cuff in a second direction opposite the first direction releases contact between the locking ramp and the locking tab and allows the locking tab to return to the initial, undeflected position and the locking tooth to disengage from the groove.

11. The wand assembly of claim 10, wherein the plurality of grooves are defined on an outer surface of the wand and arranged in a row extending in a longitudinal direction.

12. The wand assembly of claim 10, wherein the locking ramp protrudes radially inward from an inner surface of the locking cuff and tapers in height from a first end to a midpoint.

13. The wand assembly of claim 10, wherein the first wand comprises an alignment slot defined in an outer surface thereof and extending in a longitudinal direction, wherein the second wand comprises an alignment protrusion extending radially inward from an inner surface thereof, wherein the alignment slot is sized and shaped to receive the alignment protrusion to fix a relative rotational position of the first and second wands.

14. The wand assembly of claim 13, wherein the first wand comprises a stopper positioned within the alignment slot, wherein the stopper is engageable with the alignment protrusion of the second wand to fix a maximum length of the wand assembly.

15. The wand assembly of claim 10, wherein the second wand further comprises a lock indicator protruding from an outer surface thereof, wherein the locking cuff defines a recessed portion and a lock indicator opening, the lock indicator opening extending from a first end to a second end and shaped and sized to receive the lock indicator therein, the recessed portion extending from the first end of the lock indicator opening to a longitudinal end of the locking cuff, wherein the recessed portion is shaped and sized to receive the lock indicator therein to allow the lock indicator to be inserted into the lock indicator opening to connect the locking cuff to the second wand, wherein rotation of the locking cuff relative to the second wand causes the lock indicator to translate between the first and second ends of the lock indicator opening.

16. A method of assembling a wand assembly for a vacuum cleaner, the vacuum cleaner including a first wand and a second wand, the method comprising:
providing the first wand with a plurality of grooves,
providing the second wand with a locking tab including a locking tooth, and a locking cuff including a locking ramp, the locking tab and locking tooth being integrally formed with the second wand, wherein the locking tab is deflectable radially inward from an initial, undeflected position to deflect the locking tooth into engagement with one of the grooves, the locking tab having a resilient construction such that the locking tab returns to the initial, undeflected position in the absence of an applied force;
positioning the first wand telescopically within the second wand;

rotating the locking cuff in a first direction to release contact between the locking ramp and the locking tab and thereby allow the locking tab to return to the initial, undeflected position and the locking tooth to disengage from the groove;

translating the first wand relative to the second wand in a longitudinal direction; and rotating the locking cuff in a second direction opposite the first direction relative to the first and second wands such that the locking ramp deflects the locking tooth into engagement with one of the grooves to fix a length of the wand assembly.

17. The method of claim 16, wherein the second wand comprises an alignment protrusion extending radially inward from an inner surface thereof, wherein the first wand comprises an alignment slot defined in an outer surface thereof and extending in a longitudinal direction, and wherein translating the first wand relative to the second wand further comprises:

positioning the alignment protrusion within the alignment slot such that a relative rotational position of the first and second wands is fixed.

18. The method of claim 17, wherein the first wand comprises a stopper positioned within the alignment slot, and wherein translating the first wand relative to the second wand further comprises:

engaging the stopper with the alignment protrusion to fix a maximum length of the wand assembly.

19. The method of claim 16, wherein the second wand further comprises a lock indicator protruding from an outer surface thereof, wherein the locking cuff defines a lock indicator opening extending from a first end to a second end and shaped and sized to receive the lock indicator therein, and wherein rotating the locking cuff relative to the first and second wands further comprises:

translating the lock indicator between the first and second ends of the lock indicator opening.

20. The method of claim 19, wherein the locking cuff further defines a recessed portion extending from the first end of the lock indicator opening to a longitudinal end of the locking cuff and being shaped and sized to receive the lock indicator therein, the method further comprising:

connecting the locking cuff to the second wand by inserting the lock indicator through the recessed portion into the lock indicator opening.

\* \* \* \* \*